United States Patent
Oakley et al.

(10) Patent No.: US 10,062,053 B1
(45) Date of Patent: Aug. 28, 2018

(54) SPARE COMPONENT OWNERSHIP PLANNING SYSTEM AND METHOD

(71) Applicant: American Airlines, Inc., Fort Worth, TX (US)

(72) Inventors: Steven James Oakley, North Richland Hills, TX (US); Jose Antonio Ramirez-Hernandez, Mansfield, TX (US); Mei Zhang, Lewisville, TX (US); Alejandro Edgardo Scalise, Bedford, TX (US); Louis Matthew Pfeifer, Arlington, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 592 days.

(21) Appl. No.: 14/522,036

(22) Filed: Oct. 23, 2014

Related U.S. Application Data

(60) Provisional application No. 61/894,606, filed on Oct. 23, 2013.

(51) Int. Cl.
*G06F 17/30* (2006.01)
*G06Q 10/08* (2012.01)
*G06Q 10/00* (2012.01)

(52) U.S. Cl.
CPC ......... *G06Q 10/0875* (2013.01); *G06Q 10/20* (2013.01)

(58) Field of Classification Search
None
See application file for complete search history.

(56) References Cited

U.S. PATENT DOCUMENTS

| | | | | |
|---|---|---|---|---|
| 6,832,205 | B1 * | 12/2004 | Aragones | G06Q 10/06 703/6 |
| 2006/0047559 | A1 * | 3/2006 | Jacoby | G06Q 10/087 705/28 |
| 2009/0265118 | A1 * | 10/2009 | Guenther | G06Q 10/06 702/34 |
| 2011/0066461 | A1 * | 3/2011 | Yang | G06Q 10/06311 705/7.13 |
| 2012/0221193 | A1 * | 8/2012 | Delaye | G05B 23/0283 701/31.9 |

* cited by examiner

*Primary Examiner* — Paul Danneman
(74) *Attorney, Agent, or Firm* — Haynes and Boone, LLP

(57) ABSTRACT

A system and method according to which a recommended quantity of spare engine components is generated. In several exemplary embodiments, the components support aircraft maintenance and flight operations and are designed to be repaired periodically. In an exemplary embodiment, the recommended quantity is a number of available spare engine components that supports the aircraft maintenance operations but avoids excess spare engine components in inventory.

8 Claims, 17 Drawing Sheets

FIG. 6

Engine Spares Calculator - RB211    Run Simulation

Inputs: White Fields
Outputs: Grey Fields

| SCENARIO | REPAIR PROGRAMS TAT STATS (INTRO TO SHIPPING), ENGINE REMOVAL FORECAST & HARVESTING PARAMETERS ||||||||||||||||
|---|---|---|---|---|---|---|---|---|---|---|---|---|---|---|---|---|
| | L3/2 ||| L2 ||| L1 ||| OTHER REP. PGRM ||| LCL ||| HARVESTING PAR ||
| | Mean | Std. Dev. | Forecast (racks) | Mean | Std. Dev. | Forecast (racks) | Mean | Std. Dev. | Forecast (racks) | Mean | Std. Dev. | Forecast (racks) | Mean | Std. Dev. | Forecast (racks) | Number of Engines to Harvest (% L3/4) | Schedule B.1 Status (Mean/Std. Dev) |
| 1 | 120.0 | 28.6 | 37.0 | 85.1 | 42.3 | 13.0 | 35.2 | 22.7 | 1.0 | 0.0 | 0.0 | 0.0 | 0.0 | 0.0 | 0.0 | 0 (0%) | 30/12 |
| 2 | 120.0 | 28.6 | 37.0 | 85.1 | 42.3 | 13.0 | 35.2 | 22.7 | 1.0 | 0.0 | 0.0 | 0.0 | 0.0 | 0.0 | 0.0 | 4 (10.8%) | 30/12 |
| 3 | 120.0 | 28.6 | 37.0 | 85.1 | 42.3 | 13.0 | 35.2 | 22.7 | 1.0 | 0.0 | 0.0 | 0.0 | 0.0 | 0.0 | 0.0 | 7 (18.9%) | 30/12 |
| 4 | 120.0 | 28.6 | 37.0 | 85.1 | 42.3 | 13.0 | 35.2 | 22.7 | 1.0 | 0.0 | 0.0 | 0.0 | 0.0 | 0.0 | 0.0 | 11 (29.7%) | 30/12 |
| 5 | 120.0 | 28.6 | 37.0 | 85.1 | 42.3 | 13.0 | 35.2 | 22.7 | 1.0 | 0.0 | 0.0 | 0.0 | 0.0 | 0.0 | 0.0 | 15 (40.5%) | 30/12 |
| 6 | 120.0 | 28.6 | 37.0 | 85.1 | 42.3 | 13.0 | 35.2 | 22.7 | 1.0 | 0.0 | 0.0 | 0.0 | 0.0 | 0.0 | 0.0 | 19 (51.4%) | 30/12 |

SPARE COMPONENT OWNERSHIP PLANNING SYSTEM AND METHOD

CROSS-REFERENCE TO RELATED APPLICATION

This application claims the benefit of the filing date of, and priority to, U.S. Application No. 61/894,606, filed Oct. 23, 2013, the entire disclosure of which is hereby incorporated herein by reference.

BACKGROUND

The present disclosure relates in general to spare components and, in particular, to a spare component ownership planning system and method. In several exemplary embodiments, the components support aircraft maintenance and flight operations and are designed to be repaired periodically. In several exemplary embodiments, each component may be an engine part, an assembly such as, for example, an entire engine, or another type of component.

BRIEF DESCRIPTION OF THE DRAWINGS

FIGS. 4-6 are diagrammatic illustrations of the output device of FIG. 2, according to an exemplary embodiment.

FIG. 13 is a diagrammatic illustration of the output device of FIG. 2, according to an exemplary embodiment.

DETAILED DESCRIPTION

Figure 1:
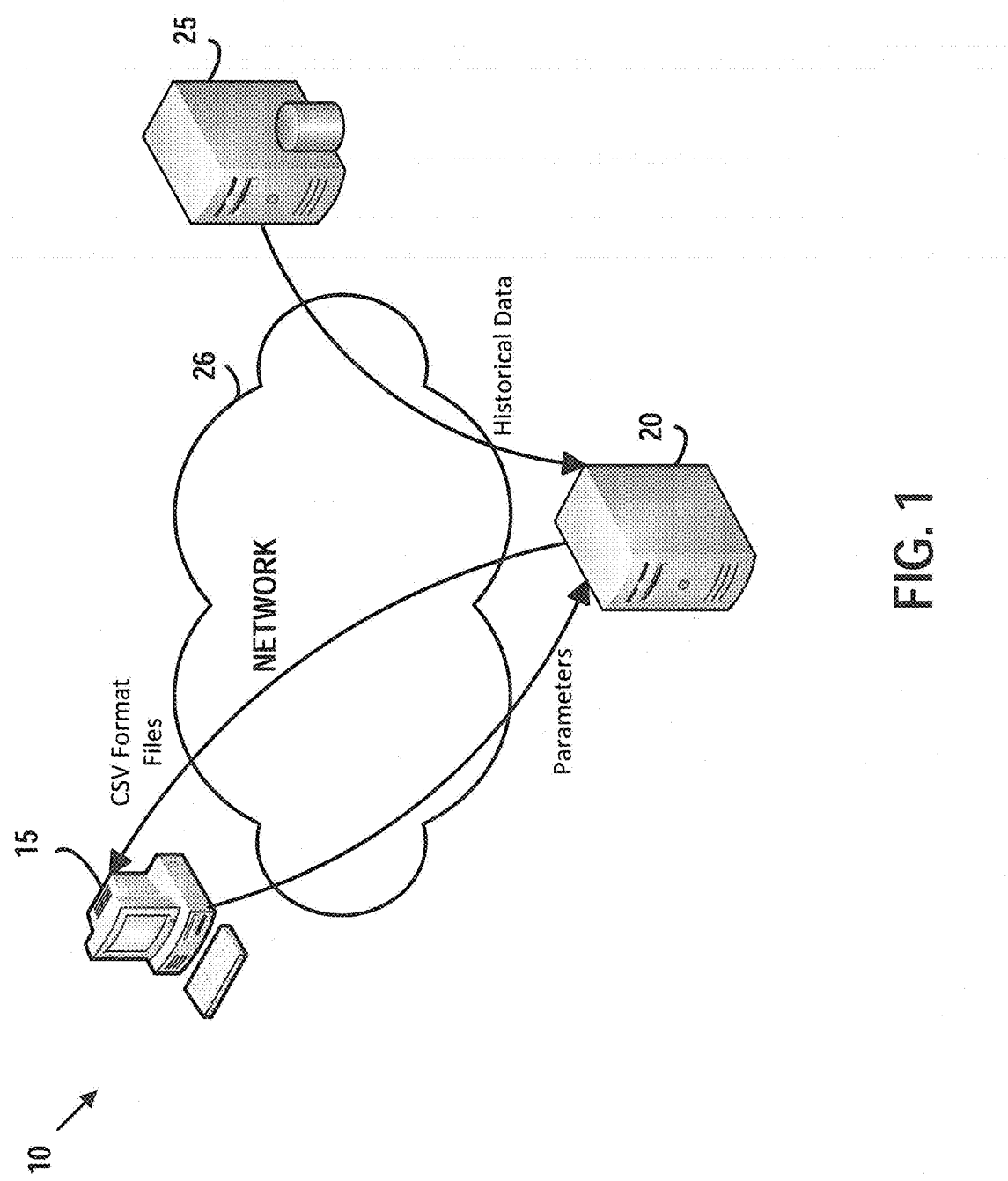
FIG. 1 is a diagrammatic illustration of a system, according to an exemplary embodiment, the system including a computer.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In several industries, it is required to determine a recommended spare ownership number, or recommended quantity, of components, or spare parts, needed to support maintenance and operations when such types of components are designed to be repaired periodically. For example, in the airline industry, a surplus of components are needed to support maintenance and flight operations when such type of components are designed to be repaired periodically. In the airline industry, for example, the components can be either a subset of a higher assembly, e.g., engine parts, or these can be complete flying equipment, e.g., an entire engine. During the repair of these components by either in-house repair shops or external vendors, the company is required to have enough a sufficient number of surplus components, or spares, that will be used to replace the components being repaired. In some cases, the components are repaired before or by the time they are reassembled, but in many cases the component is still being repaired when it is time for it to be reassembled. In those cases, having a sufficient spare ownership number of components is essential to provide an on-time delivery of the aircraft component needed to support the flight operations. When not enough spares are available, then a delay in the availability of equipment needed for flight operations is likely to occur. However, acquiring more spares than necessary will help the availability of the equipment, but it could also have a negative financial impact.

Thus, a system generally referred to by the reference numeral 10 as illustrated in FIG. 1 provides an ownership solution detailing the number of spare parts that the airline should own, or a recommended spare ownership number, such that the number of parts will be enough to support the repair and flying operations while avoiding the excess in spare inventory.

In several exemplary embodiments, the system 10 uses both simulations and mathematical models of the repair process of such components (i.e., components needed to support maintenance and operations when such type of parts/components are designed to be repaired periodically) in order to accurately calculate the recommended spare ownership number, or the recommended quantity. In an exemplary embodiment, the mathematical formula estimates the recommended spare ownership number for a traditional process, and by using a simulation it is possible to model special operational conditions that may affect the ownership, e.g., ability to borrow parts from one aircraft component to another, the scrapping process, and the shop capacity. As a result, the simulation output can be used to estimate the most likely required spare ownership number according to a prescribed reliability or service level. In an exemplary embodiment, the service level is the percent of time that at least one spare part/component will be available when there is a demand for it. In an exemplary embodiment, the system 10 includes a first tool, Shop Pool Calculator, which relates to engine components and a second tool, Engines Spares Calculator, which relates to an engine assembly as a unit. In an exemplary embodiment, an engine component may include an engine sub-assembly or combination of engine components.

In an exemplary embodiment, as illustrated in FIG. 1, the system 10 includes one or more computers 15, one or more servers 20, and one or more databases or relational database management systems 25 that are operably coupled together, and in communication via a network 26.

Figure 2:
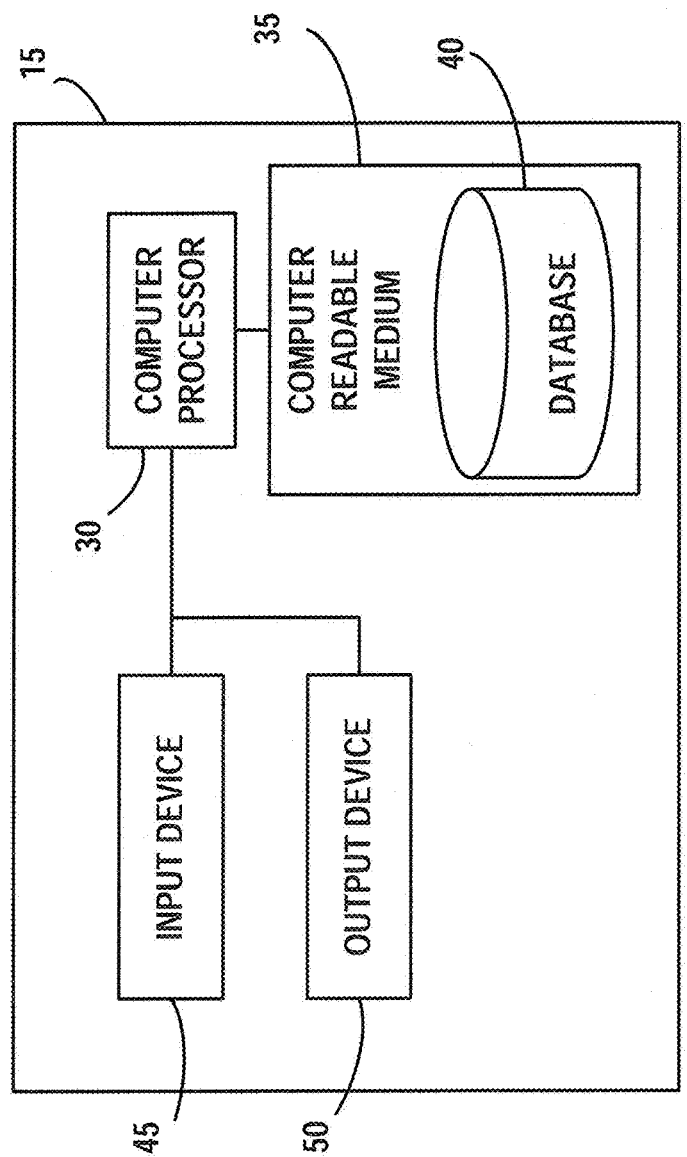
FIG. 2 is a diagrammatic illustration of the computer of FIG. 1, according to an exemplary embodiment, the computer including an output device.

In one or more exemplary embodiments and as shown in FIG. 2, the one or more computers 15 includes a computer processor 30 and a computer readable medium 35 operably coupled thereto. Instructions accessible to, and executable by, the computer processor 30 are stored on the computer readable medium 35. A database 40 is also stored in the computer readable medium 35. In an exemplary embodiment, the computer 15 also includes an input device 45 and an output device 50. In an exemplary embodiment, web browser software is stored in the computer readable medium 35. In an exemplary embodiment, the input device 45 is a keyboard, mouse, or other device coupled to the computer 15 that sends instructions to the computer 15. In an exemplary embodiment, the input device 45 and the output device 50 include a graphical display, which, in several exemplary embodiments, is in the form of, or includes, one or more digital displays, one or more liquid crystal displays, one or more cathode ray tube monitors, and/or any combination thereof. In an exemplary embodiment, the output device 50 includes a graphical display, a printer, a plotter, and/or any combination thereof. In an exemplary embodiment, the input device 45 is the output device 50, and the output device 50 is the input device 45. In several exemplary embodiments, the computer 15 is a thin client. In several exemplary embodiments, the computer 15 is a thick client. In several exemplary embodiments, the computer 15 functions as both a thin client and a thick client. In several exemplary embodiments, the computer 15 is, or includes, a telephone, a personal computer, a personal digital assistant, a cellular telephone, other types of telecommunications devices, other types of computing devices, and/or any combination thereof. In several exemplary embodiments, the computer 15 includes a plurality of remote user devices. In an exemplary embodiment, the computer 15 is capable of running or executing an application. In one or more exemplary embodiments, the application is an application server, which in several exemplary embodiments includes and/or executes one or more web-based programs, Intranet-based programs, and/or any combination thereof. In an exemplary embodiment, the application utilizes macro calls, e.g., via VBA in MS-Excel, to execute the simulation of the repair process which is implemented in Java or VBA and also provides a Graphical User Interface (GUI) on the output device 50 that a user can use to set different scenarios and change calculation parameters. The output of the simulation on the output device 50 corresponds to the recommended spare ownership number based on the parameters of the process. In an exemplary embodiment, the application integrates closed form formulas to directly and quickly compute the recommended spare ownership number, or the recommended quantity, under specific conditions. Moreover, from the GUI on the output device 50 the user can also request the update of the parameters utilized in the calculations by executing an especially designed SAS code located in the one or more servers 20. In an exemplary embodiment, the application includes a computer program including a plurality of instructions, data, and/or any combination thereof. In an exemplary embodiment, the application written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, the application a web-based application written in, for example, Java or Adobe Flex, which pulls real-time information from the server 20 and/or the relational database management system 25. In an exemplary embodiment, the application pulls real-time information from the server 20 and/or the relational database management system 25, upon the execution, opening or start-up of the application. In an exemplary embodiment, the application is stored on the computer readable medium 20 and/or in the database 25. In one or more exemplary embodiments, the data input by the user is considered user parameters.

In an exemplary embodiment, the one or more servers 20 may include a specially designed code, such as for example SAS code and/or UNIX. In an exemplary embodiment, the SAS code allows communication with an external database, such as the relational database management system 25. In an exemplary embodiment, the SAS code allows communication with the relational database management system 25, which contain historical data utilized to obtain many of the parameters used by the simulation model and closed-form formulas.

In an exemplary embodiment, the relational database management system 25 is a third party data warehouse, such as for example Teradata. In an exemplary embodiment, the relational database management system 25 includes historical data. In an exemplary embodiment, the relational database management system 25 includes historical data relating to repair time statistics per repair program, shop capacity constraint data, among other types of data.

In an exemplary embodiment, the network 26 includes the Internet, one or more local area networks, one or more wide area networks, one or more cellular networks, one or more wireless networks, one or more voice networks, one or more data networks, one or more communication systems, and/or any combination thereof.

Figure 3:
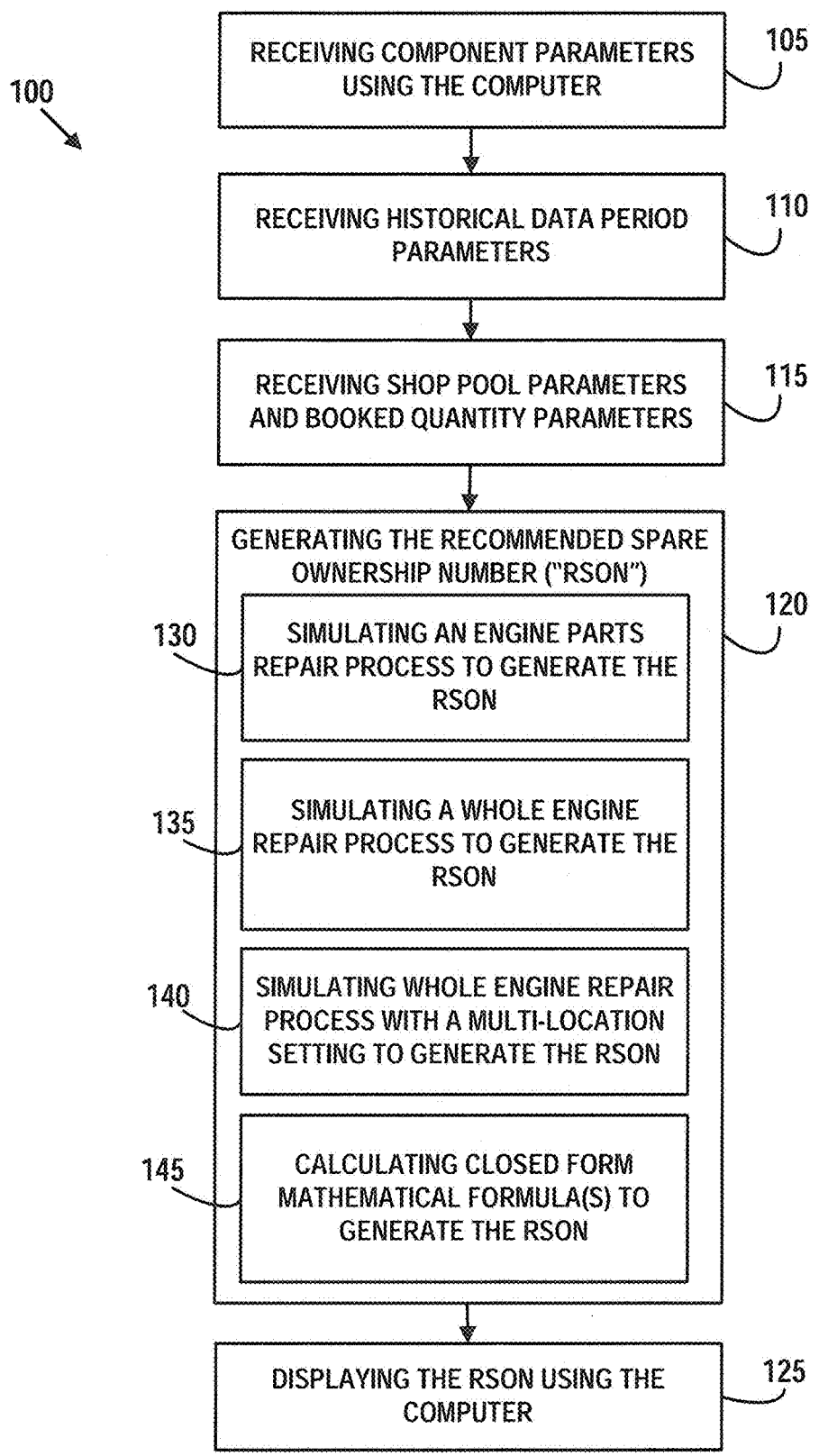
FIG. 3 is a flow chart illustration of a method implemented in whole or in part using the system of FIG. 1, according to an exemplary embodiment.

In an exemplary embodiment, as illustrated in FIG. 3 with continuing reference to FIGS. 1 and 2, a method of generating a recommended spare ownership number, by operating the system 10, is generally referred to by the reference numeral 100. In one embodiment, the method 100 includes receiving component parameters using the computer 15 at step 105; receiving historical data period parameters using the computer 15 at step 110; receiving shop pool parameters and booked quantity parameters using the computer 15 at step 115; generating the recommended spare ownership number ("RSON") at step 120; and displaying, or outputting, the RSON using the computer 15 at step 125.

Figure 4:
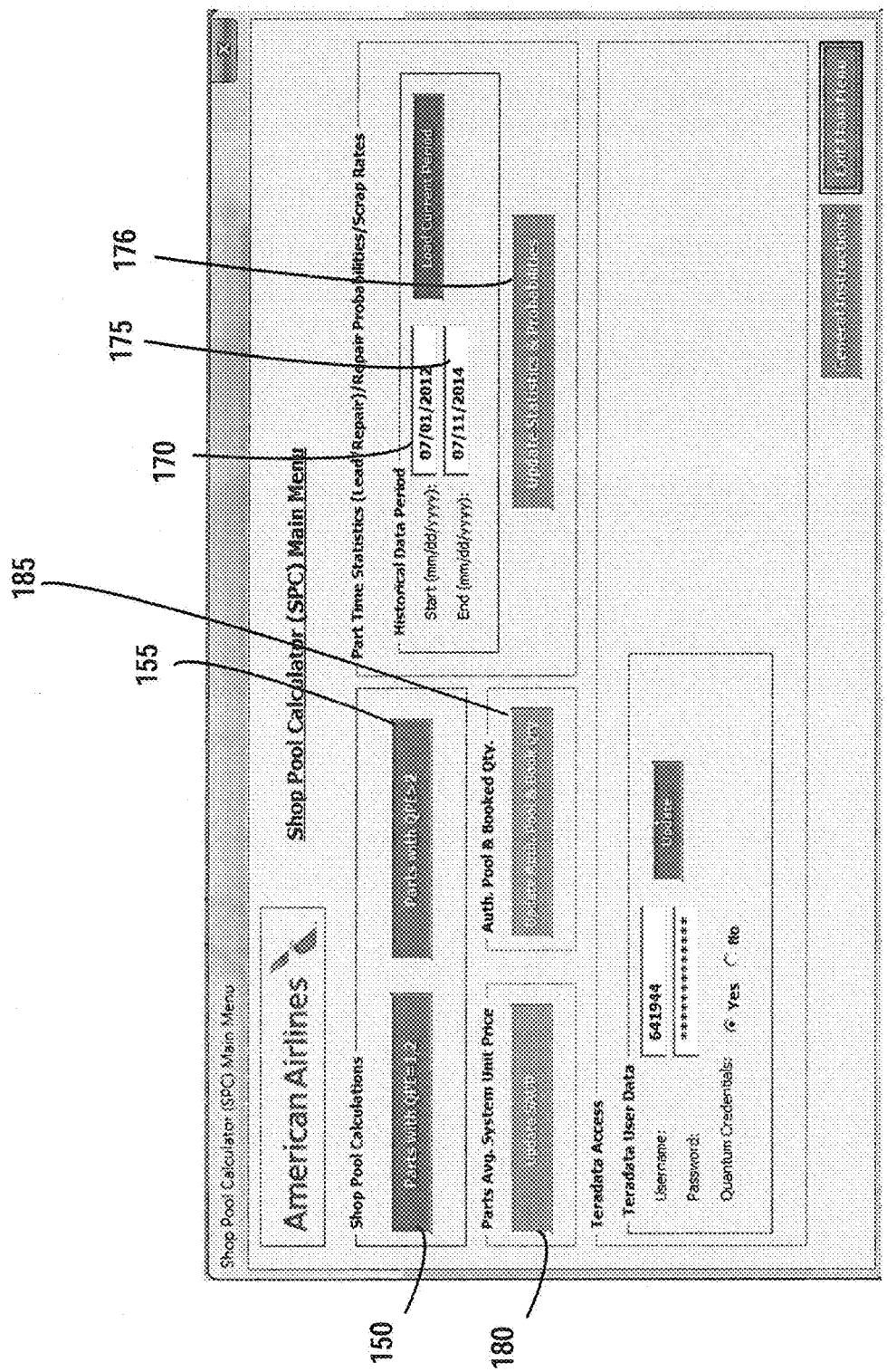
Figure 5:
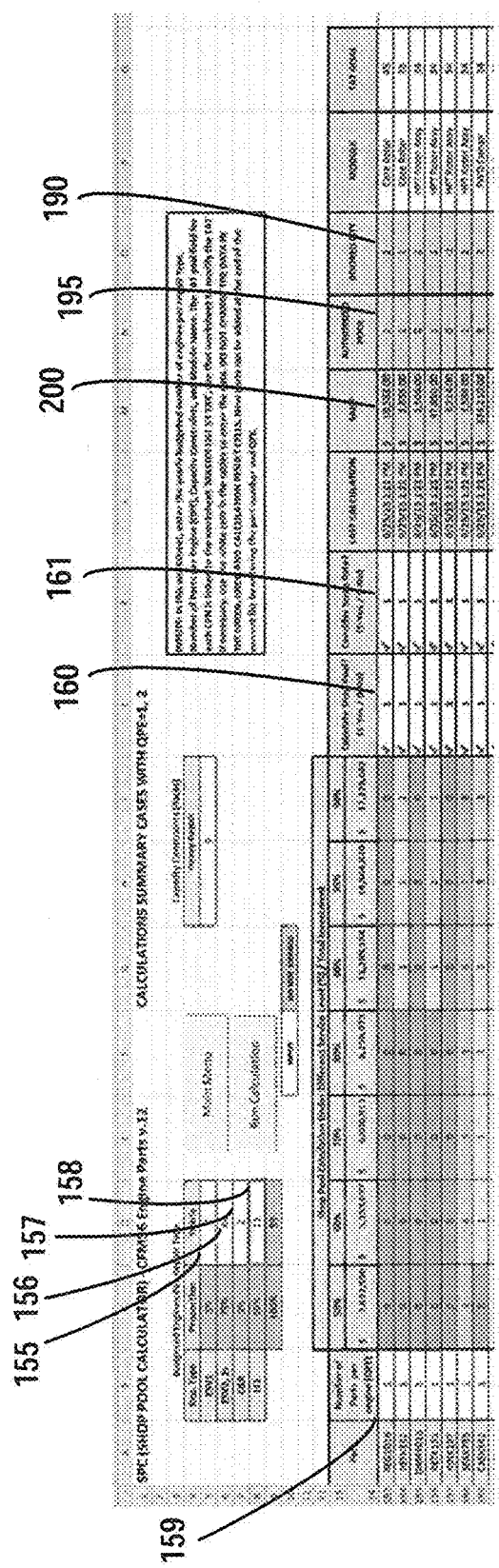

In an exemplary embodiment, the system 10 receives the component parameters using the computer 15 at the step 105. In one embodiment, the system 10 uses the output device 50 and/or the input device 45 to receive the parts parameters. In one embodiment, the system 10 receives the component parameters using a type of a text-entry box or selection box as shown in FIGS. 4 and 5, which are associated with the Shop Pool Calculator. In one embodiment, the user selects either a first part type or a second part type by selecting a button associated with the first part type 150 or a button associated with the second party type button 155 displayed on the output device 50. In an exemplary embodiment, the first part type is "Parts with QPE=1, 2" and the second part type is "Parts with QPE>2." In an exemplary embodiment, the first part type is associated with a component for which the RSON is best generated using a closed form mathematical formula. In an exemplary embodiment, the closed form mathematical formulas offer a compact and fast way to compute ownership under specific conditions. In an exemplary embodiment, the second party type is associated with a component for which the RSON is best generated using a simulation model. That is, the simulation model is used in cases where certain complex details of the repair process cannot be captured by closed form mathematical formulas. In an exemplary embodiment, both the simulation and mathematical models use different parameters of the repair process including statistics of the component repair time, repair demand rate, repair probabilities, and capacity constraints. In an exemplary embodiment, a calculation core of the application is composed of (1) a discrete event simulation model of the component demand and repair cycle, and (2) a probabilistic model of this same repair cycle, which includes formulas for spare ownership and variability of the parts/components in repair. In an exemplary embodiment, other component parameters, such an Annual Budgeted Number of Engines Per Repair type data for ESV1, ESV2, C&R, and LCL may also be received using text-entry boxes 155, 156, 157, and 158, respectively. In an exemplary embodiment, the Number of Parts per Engine ("QPE") data for each component may be received using text-boxes in the column 159. In an exemplary embodiment, data may also be received for the Engine Turn-Time-PPR Process using a text-entry box (not shown). In addition, the system 10 may receive instructions to generate the RSON for a specific component part and to generate a scrap rate by receiving a 1 or 0 in the text-entry boxes within the columns 160 and 161, respectively. In an exemplary embodiment, the system 10 receives component parameters such as repair time statistics: mean and standard deviation, given in days, expected number of removals in a planning period, among others, using a text-entry boxes or selection boxes in the columns 162, 163, and 164, respectively, as shown in FIG. 6, which is associated with the Engine Spares Calculator. In an exemplary embodiment, the system 10 may also receive component parameters such as the service level, the capacity (i.e., constraint regarding how many components can be repaired simultaneously), pre/post intro work (i.e., additional amount of days required, for the given repair types, before or after the introduction of the asset to the repair shops), engine harvesting parameters, removal forecast, planning period in days, demand forecasts for repair of the parts. Other data that could also be entered and updated by the user include: repair and scrapping probabilities of the parts/components, the planning period, and lead time statistics (mean and standard deviation) for purchasing orders of the parts/components. In several exemplary embodiments, during operation, once all the parameters are entered or set, then using the input device 45 and/or the output device 50, the user can send the request for calculating the ownership or the RSON. In the case of the Shop Pool Calculator, the GUI includes a spreadsheet where multiple parts can be listed in order to compute the required ownership for each part. Similarly, in the case of the Spare Engine Calculator, the user can list in a spreadsheet multiple scenarios by changing parameters such as turn-time statistics and desired service level. In an exemplary embodiment, the component parameters include a current ownership number of the component.

In an exemplary embodiment and referring back to FIG. 3, the system 10 receives historical data period parameters at the step 110. In one embodiment, the system 10 uses the output device 50 and/or the input device 45 to receive historical data period parameters. In one embodiment and as show in FIG. 4, the system 10 receives a start date using a text-entry box 170 or selection box (not shown). In one embodiment, the system 10 receives an end date using a text-entry box 175 or selection box (not shown). In an exemplary embodiment, the start date and end date define a relevant period of time. In an exemplary embodiment, the Shop Pool Calculator and the Spare Engine Calculator use the historical data within the relevant period of time to generate the RSON. In an exemplary embodiment, the system 10 initiates the update of the statistics and probabilities, based on the relevant period of time, upon the selection of a button 176. In an exemplary embodiment, updating statistics and probabilities includes updating or generating statistics and probabilities using the data stored in the third party warehouse 25 based on the relevant period of time.

In an exemplary embodiment, the system 10 updates the Authorized Shop Pool data, the Current Part Average System Unit price ("SAUP") data, and Booked Quantity data at the step 115. In one embodiment, the system 10 uses the output device 50 and/or the input device 45 to initiate the update of the Authorized Shop Pool data, the SAUP data, and the Booked Quantity data. In one embodiment, the SAUP for any component may be updated upon selection of an "update SAUP" button 180. In an exemplary embodiment, the Authorized Shop Pool data and the Booked Quantity data may be updated by selection of a "update Authorized Pool and Book Quantity" button 185. In an exemplary embodiment, the SAUP, the Authorized Shop Pool, and the Booked Quantity may be updated by using text-entry boxes 190, 195, and 200 respectively.

In an exemplary embodiment, the RSON is generated at the step 120. In an exemplary embodiment, generating the RSON may include one or more of the substeps of simulating an engine parts repair process to generate the RSON at step 130, simulating a whole engine repair process to generate the RSON at step 135, simulating a whole engine repair process with a multi-location setting to generate the RSON at step 140, and calculating closed form mathematical formulas to generate the RSON as step 145. In an exemplary embodiment, the Shop Pool Calculator is associated with the steps 130 and 145. In an exemplary embodiment, the Spare Engine Calculator is associated with the steps 135, 140, and 145. In an exemplary embodiment, the generating the RSON may include executing any one of a variety of simulations or closed-form mathematical formulas.

Figure 7A:
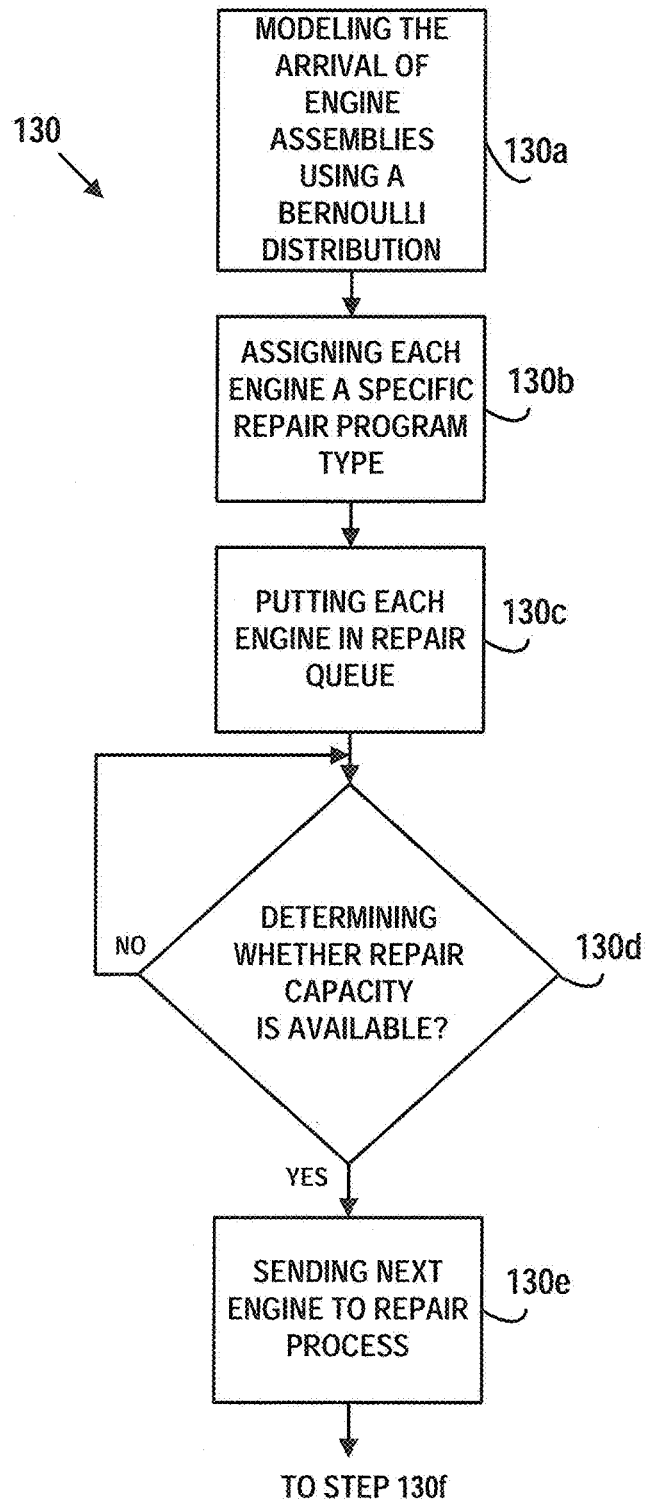
FIGS. 7a and 7b are flow chart illustrations of a step of the method of FIG. 3, according to an exemplary embodiment.
Figure 7B:
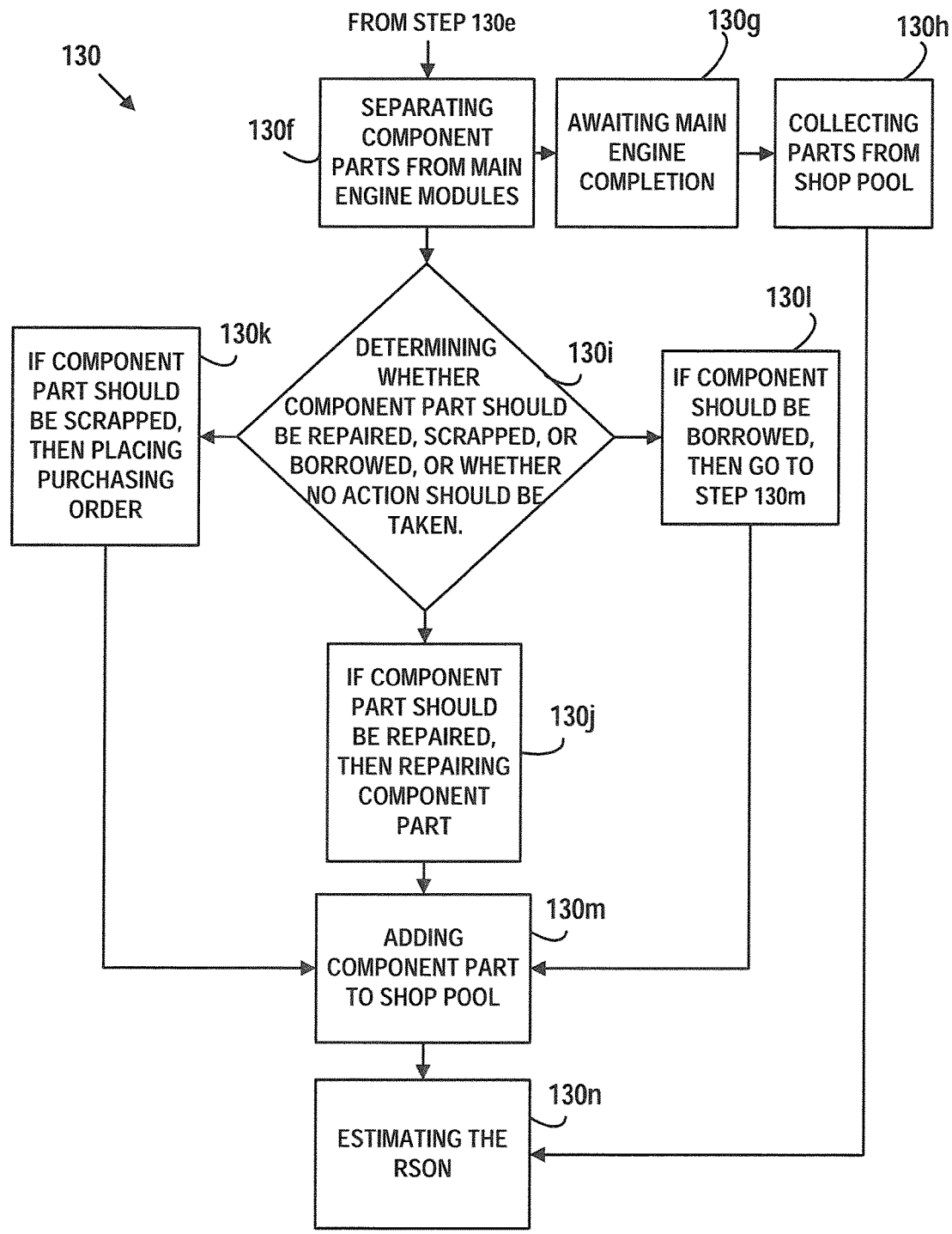

In an exemplary embodiment and referring to FIGS. 3, 7a, and 7b, the system 10 simulates the engine parts repair process to generate an ownership number at the step 130. In an exemplary embodiment, the step 130 is associated with the Shop Pool Calculator. In an exemplary embodiment, simulating the engine parts repair process to generate an ownership number may include the substeps of modeling the arrival of engine assemblies for repair using a Bernoulli distribution at step 130a; assigning each engine that arrives for repair a specific repair program type at step 130b; putting each engine in repair queue at step 130c; determining whether repair capacity is available at step 130d; if not, then performing the step 130d again; if so, then sending an engine to repair process at step 130e; separating component parts from the main engine module at step 130f; awaiting main engine completion at step 130g; collecting spare parts for the main engine from the shop pool at step 130h; after step 130f, it is determined whether the component parts separated from the main engine module can be repaired, scrapped, or borrowed, or whether no action should be taken at step 130i; if it is determined that the component part should be repaired at the step 130i, then repairing the component part at step 130j; if it is determined that the component part should be scrapped at step 130i, then placing purchasing order for an equivalent part to the component part at step 130k; if it is determined that the component part should be borrowed at the step 130i, then the next step is step 130m; after the step 130l, the step 130j, and 130k, the component part is added to the shop pool at the step 130m; after the step 130m or after the step 130h, the recommended spare ownership number is estimated at step 130n.

In an exemplary embodiment, the arrival of engine assemblies for repair is modeled using a Bernoulli distribution at the step 130a. In an exemplary embodiment, the engine assembly includes a main engine module and component parts. In an exemplary embodiment, the Shop Pool Calculator uses a forecast of the total expected demand for repair of engines to specify the arrival process. Thus, each day in the simulation process there will be a probability that an engine will arrive for repair. In an exemplary embodiment, the probability p of an engine arrival for repair is defined as:

$$p = \frac{\text{Expected Number of Removals}}{\text{Planning Period Length}} \quad (1)$$

where the planning period length is given in days and is always larger than the expected number of removals. In an exemplary embodiment, each engine that arrives for repair is assigned a specific repair program type at the step 130b. In an exemplary embodiment, the reprogram or type is: Program 1, Program 2, . . . , Program N. In an exemplary embodiment, the repair type is assigned based on a probabilistic approach and using the forecasted number of engines that will be repaired in the planning period. Thus, an engine arriving for repair will have a probability $P_i$ of being repaired under repair type i, where:

$$P_i = \frac{\text{Expected Number of Engines to be Repaired under Program } i}{\sum_{n=1}^{N} R_n} \quad (2)$$

and where $R_i$ is the expected number of engines removed to be repaired under program i, with i=1, 2, . . . , N; and $$\sum_{n=1}^{N} R_n = \text{Expected Number of Engine Removals in the Planning Period.}$$

In an exemplary embodiment, the engines are queued at the step 130c. In an exemplary embodiment, once the repair type is assigned, the engine is put in a queue where it waits until capacity in the repair process is available. In an exemplary embodiment, the queue contains the engines ordered by time of arrival.

In an exemplary embodiment, it is determined whether repair capacity is available at the step 130d. In an exemplary embodiment, the maximum capacity of the process C is defined as the number of engines of a particular repair program(s) currently under repair. Thus, if the current number of engines in Work-In-Process or WIP for the repair programs associated with the capacity definition is below C, then the first engine in the queue is moved to the next step. Otherwise, the engine waits in queue until WIP<C.

If it is determined that repair capacity is not available at the step 130d, then the next step is the step 130d.

If it is determined that repair capacity is available at the step 130d, then the next engine is sent to the repair process at the step 130e. In an exemplary embodiment, once capacity is available for the repair process, the engines leave the queue using a First-Come-First-Serve discipline. As soon as the first engine in queue is released, it is moved into the repair process.

In an exemplary embodiment, component parts used in the main engine modules are separated from the main engine module at the step 130f.

In an exemplary embodiment, the main engine module waits for a pre-specified turn-around (TAT) goal at the step 130g. In an exemplary embodiment, the engine without all the components that were separated at the step 130f waits for a pre-specified turn-around (TAT) goal $PR_{TAT}$, which is given in days. After such wait, the necessary spare parts are put back on the main engine modules in order to re-build the engine.

In an exemplary embodiment and after the step 130g, the different component parts are collected from the shop pool at the step 130h. In an exemplary embodiment, the engine part, or the component part, for which the repair process is being simulated starts with an initial stock of $SP_0$ units. The level of spare parts in the shop pool is defined as $SP_k$, where k=0, 1, 2, . . . is defined as the shop pool level change event index. Events that can change the shop pool level corresponds to the completion of the waiting time goal $PR_{TAT}$ for the engine, completion of the repair of the parts separated from the engine at the step 130f, receipt of purchasing orders with new spare parts, and the borrowing of parts from the same engine in repair. Thus, every time that the waiting time goal $PR_{TAT}$ is completed, say at time $t_k$, with k=1, 2, . . . , then the level of spare parts in the shop pool at that moment, $SP_k$, is updated as follows:

$$SP_k = SP_{k-1} - N_r, \quad (3)$$

where $N_r$ is the number of parts that were initially removed from the engine at the step 130f; and k=1, 2, . . . , and $SP_0$ is the initial stock level usually defined as a large number.

In an exemplary embodiment and after the step 130f, it is determined whether the component parts should be repaired, scrapped, or borrowed, or whether no action should be taken at the step 130i. In an exemplary embodiment, for each repair program, Program 1, Program 2, . . . , Program N, a repair probability is assigned based on historical data. Thus, each component part separated from the main engine module at the step 130f will be repaired with probability $r_i$ based on the assigned repair program i. In an exemplary embodiment and based on this probabilistic model, the component part can either be sent for repair, or can be sent to be evaluated for scrapping, or can be borrowed, or no action may be required in the part. If no action is required, then the part is assumed to be back in the engine but without changing the shop pool level $SP_k$.

In an exemplary embodiment, and if it is determined that the components parts should be repaired at the step 130i, then the parts are repaired at the step 130j. In an exemplary embodiment, a gamma distribution, which is discussed in detail below, is utilized to obtain the repair time required based on the repair program assigned. In an exemplary embodiment, historical data is utilized to obtain both average and standard deviation of the repair time for each of the repair programs considered, which are then utilized to specify the parameters of the gamma distribution. However, other probability distributions different than gamma could also be used instead if there is a better fit based on the process. In an exemplary embodiment, the other probability distributions different than gamma are discussed in further detail below.

In an exemplary embodiment, and if it is determined that the component part is to be scrapped, then a replacement part is purchased at the step 130k. In an exemplary embodiment, another probabilistic model is utilized to decide if the component part that is not repaired will be scrapped. For this, a probability/rate of scrapping the part, $s_i$, from an engine under repair program i is defined. Based on this probability, if the part is scrapped, then the next step is to send a purchasing order for a new spare part to replace the one scrapped. When a part is scrapped, then a replacement is obtained through a purchasing order (PO). In an exemplary embodiment, this is modeled as a random lead-time for the PO obtained based on a gamma distribution. Historical data is utilized to obtain average and standard deviations for the lead-time of the corresponding parts which in turn are utilized to obtain the parameters for the gamma distribution of the PO lead-time in the simulation model.

In an exemplary embodiment, and if it is determined that the component part is to be borrowed, then the next step is step 130*m* at the step 130*l*. In an exemplary embodiment and if no repair and no scrapping occur, then the component part is considered to be in good condition and it could be borrowed. However, in an exemplary embodiment, the borrowing can only be conducted for parts that belong to engines being repaired in specific repair programs.

In an exemplary embodiment, and after the steps 130*j*, 130*k*, or 130*l*, the component part is added to the shop pool at the step 130*m*. When borrowing of parts occurs, such parts are added to the shop pool level and $SP_k$ is increased as follows:

$$SP_k = SP_{k-1} + 1 \qquad (4)$$

In an exemplary embodiment, the RSON is estimated at the step 130*n*. In an exemplary embodiment, the model keeps track of the changes in time of the shop pool level $SP_k$ taking a daily snapshot of this variable. In an exemplary embodiment, the simulation process is repeated for M replications of L days each, and the daily variations of $SP_k$ after a warming-up period W days are utilized to estimate the required spare parts ownership or shop pool for a given service level. Such procedure is conducted by calculating the average percentiles of the variations in time of $SP_k$ across the M simulation replications. For a service level SL between 0 and 1 (i.e., between 0 and 100%), the needed percentile $p_{SL}$, to calculate, with $0 < p_{SL} < 1$, is given by:

$$p_{SL} = 1 - SL \qquad (5)$$

For example, to calculate the ownership at a SL=90%, then $p_{SL} = 1-0.9 = 0.1$, which indicates that the 10th percentile needs to be calculated. Thus, $(100 \times p_{SL})\%$ of the simulation replication samples are below the calculated percentile. If the average percentile for a service level SL is given by $P_{SL}$, then the corresponding ownership $O_{SL}$ is given by:

$$O_{SL} = SP_0 - P_{SL} \qquad (6)$$

where $SP_o$ is the initial ownership or stock. In an exemplary embodiment, the value $O_{SL}$, or the RSON, is the main result obtained from the simulation model. That is, the RSON by simulation is the required ownership obtained from the average 10$^{th}$ percentile across multiple simulation replications of the spare level output in steady state, and by subtracting the initial value.

Figure 8A:
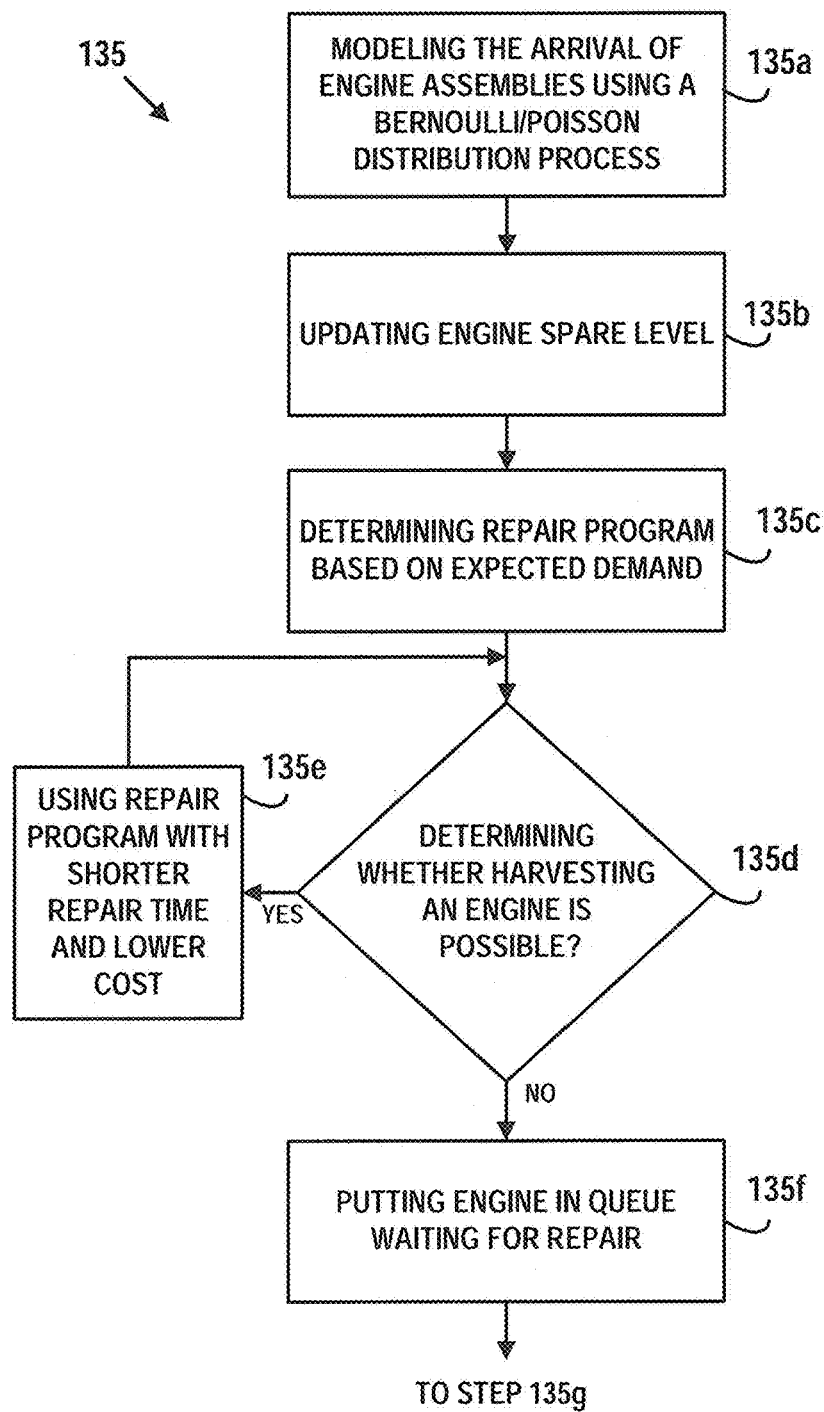
FIGS. 8a and 8b are flow chart illustrations of another step of the method of FIG. 3, according to an exemplary embodiment.
Figure 8B:
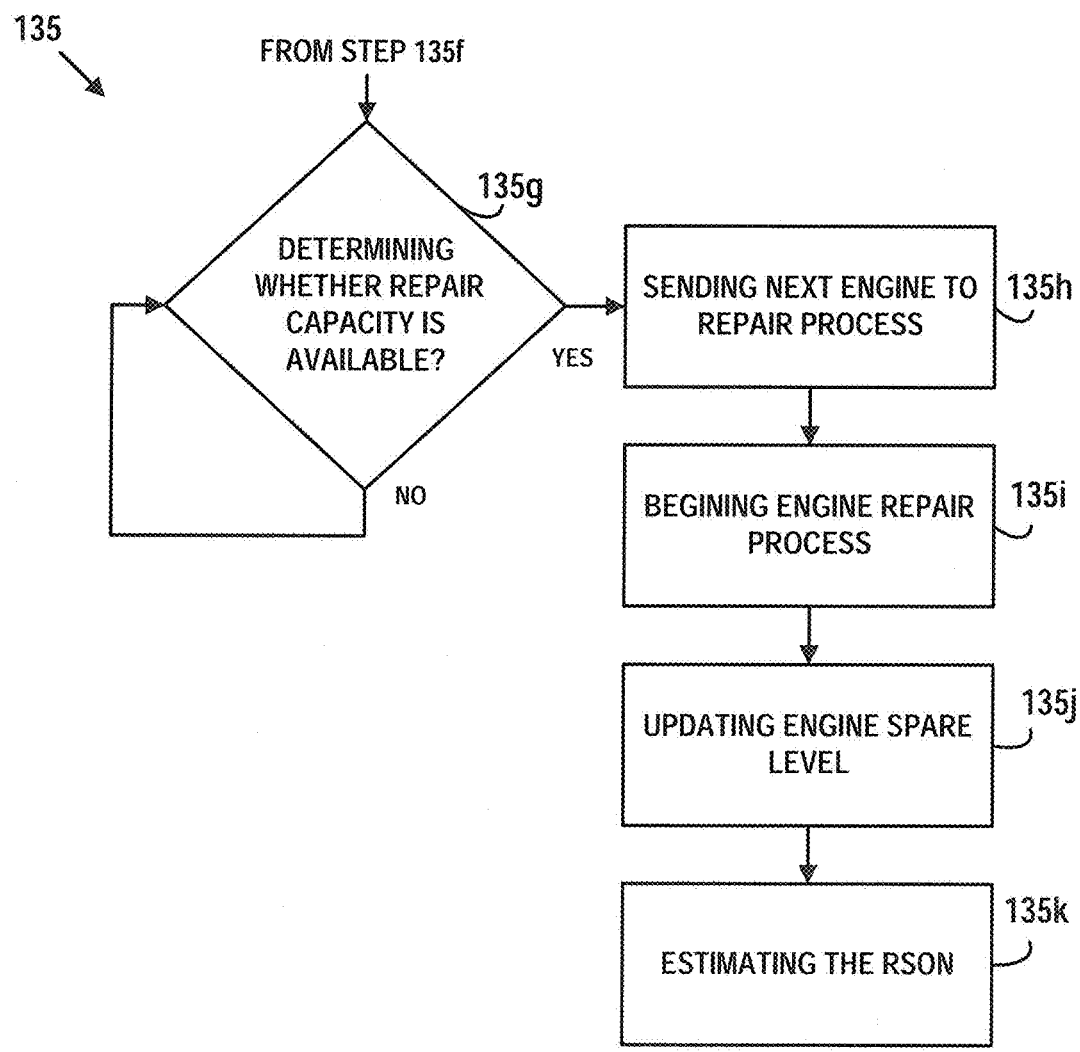

In an exemplary embodiment and referring to FIGS. 3, 8*a*, and 8*b*, the whole engine, or the engine assembly, repair process is simulated to generate the RSON at the step 135. In an exemplary embodiment, the step 135 is associated with the Spare Engine Calculator. In an exemplary embodiment, simulating the whole engine ownership may include the substeps of modeling the arrival of engines using a Bernoulli or Poisson distribution at step 135*a*; updating engine spare level at step 135*b*; determining a repair program based on expected demand at step 135*c*; determining whether harvesting an engine is possible at step 135*d*; if not, using repair program with shorter repair time and lower costs at step 135*e* and returning to step 135*d*; if so, putting engine in queue waiting for repair at step 135*f*; determining whether repair capacity is available at step 135*g*; if not, returning to step 135*g*; if so, sending a next engine to repair process at step 135*h*; beginning engine repair process at step 135*i*; updating engine spare level at step 135*j*; and estimating the RSON at step 135*k*.

In an exemplary embodiment, the arrival of engine assemblies are modeled using a Bernoulli or Poisson distribution at the step 135*a*. In an exemplary embodiment and in this case, the arrival of engines for repair can be modeled using either a Bernoulli distribution or as a Poisson process. In the first case, the model utilizes a forecast of the total expected demand for repair of engines to specify the arrival process. Thus, each day in the simulation process there will be a probability that an engine will arrive for repair. The probability p of an engine arrival for repair is defined as $$p = \frac{\text{Expected Number of Removals}}{\text{Planning Period Length}} \qquad (7)$$

where the planning period length is given in days and is always larger than the expected number of removals. If the engine arrival is modeled as a Poisson process with parameter $\lambda$, then $$\lambda = \frac{\text{Expected Number of Removals}}{\text{Planning Period Length}}. \qquad (8)$$

In an exemplary embodiment, equation (8) represents the mean number of engine arrivals (removals) per day, and the probability of having n engine arrivals in a day, P(x=n), is given by:

$$P(x=n) = \frac{\lambda^n \cdot e^{-\lambda}}{n!}. \qquad (9)$$

In an exemplary embodiment, the engine spare level is updated at the step 135*b*. The level of spare engines is defined as $S_k$, where k=1, 2, . . . is the spare level change event index, and $S_0$ is defined as the initial spare level. In an exemplary embodiment, events that can change the spare level correspond to an arrival of an engine for repair and when the repair of an engine is completed. In an exemplary embodiment, in the step 135*a* the case corresponds to the arrival of an engine for repair; therefore, a spare is taken from the previously available spare level $S_{k-1}$ to replace the one that was removed and received. At the event k of an engine arrival, the spare level is updated as follows:

$$S_k = S_{k-1} - 1. \qquad (10)$$

In an exemplary embodiment, the repair program is determined based on expected demand at the step 135*c*. In an exemplary embodiment, each engine that arrives for repair is assigned with a specific repair program or type: Program 1, Program 2, . . . , Program N. In an exemplary embodiment, the repair type is assigned based on a probabilistic approach and using the forecasted number of engines that will be repaired in the planning period. Thus, an engine arriving for repair will have a probability $P_i$ of being repaired under repair type i, where:

$$P_i = \frac{\text{Expected Number of Engines to be Repaired under Program } i}{\sum_{n=1}^{N} R_n}, \quad (11)$$

where

R<sub>i</sub> is the expected number of engines removed to be repaired under program i, with i=1, 2, . . . , N; and $\sum_{n=1}^{N} R_n$ = Expected Number of Engine Removals in the Planning Period.

In an exemplary embodiment, it is determined whether harvesting an engine is possible at the step 135d. If the repair programs assigned in the step 135c is of the so-called heavy repair type, then the system 10 checks if there is opportunity to conduct an engine harvesting. In an exemplary embodiment and during the step 135d, the system 10 uses the engine harvesting parameters received at the step 105.

In an exemplary embodiment and if a harvesting is possible, a repair program with shorter repair time and lower cost is assigned at the step 135e. If a harvesting is possible, then a store or parked engine with remaining useful life will be repaired instead of using a shorter repair time and lower cost than the initially assigned heavy repair type.

In an exemplary embodiment, and if a harvesting is not possible, then the engine is put in queue waiting for repair at the step 135f. In an exemplary embodiment and if there is no chance for harvesting engines, then the current engine is sent to the next step which put the engine in queue before repair. In an exemplary embodiment, the engine is put in a queue where it waits until capacity in the repair process is available. The queue contains the engines ordered by time of arrival. The maximum capacity of the process C is defined as the number of engines of a particular repair program(s) currently under repair. Thus, if the current number of engines in Work-In-Process or WIP for the repair programs associated with the capacity definition is below C, then the first engine in the queue is moved to the next step. Otherwise, the engine waits in queue until WIP<C.

In an exemplary embodiment, it is determined whether there is repair capacity available at the step 135g.

In an exemplary embodiment and if it is determined that there is no repair capacity available, the next step is the step 130g.

In an exemplary embodiment, if it is determined that there is repair capacity available, then the next engine is sent to the repair process at the step 135h. In an exemplary embodiment, the engines leave the queue using a First-Come-First-Serve discipline at the step 130h.

In an exemplary embodiment, the engine repair process begins at the step 135i. In an exemplary embodiment, the engine repair process indicated in the step 135i is modeled as a random delay based on a gamma distribution. For this purpose, historical data is utilized to obtain both average and standard deviation of the repair time for each of the repair programs considered. These are then used to specify the parameters of the gamma distribution. Other probability distributions different than gamma could also be used instead if there is a better fit based on the process.

In an exemplary embodiment, the engine spare level is updated at the step 135j. As soon as an engine completes the repair process it becomes an available spare. Thus, the spare level is updated to reflect the new available spare. In an exemplary embodiment and assuming that the previous spare level is $S_{k-1}$, then the update of the current level is given by $$S_k = S_{k-1} + 1, \quad (12)$$

and $$O_{SL} = S_0 - P_{SL}. \quad (13)$$

In an exemplary embodiment, the RSON is estimated at the step 135k. At the end of the simulation process, the model keeps track of the changes in time of the spare level $S_k$ taking a daily snapshot of this variable. The simulation process is repeated for M replications of L days each, and the daily variations of $S_k$ after a warming-up period W days are utilized to estimate the required spare parts ownership or shop pool for a given service level. Such procedure is conducted by calculating the average percentiles of the variations in time of $S_k$ across the M simulation replications. For a service level SL between 0 and 1 (i.e., between 0 and 100%), the needed percentile $p_{SL}$, to calculate, with $0 < p_{SL} < 1$, is given by:

$$p_{SL} = 1 - SL. \quad (14)$$

For example, to calculate the ownership at a SL=90%, then $p_{SL}=1-0.9=0.1$, which indicates that the $10^{th}$ percentile needs to be calculated. Thus, $(100 \times p_{SL})\%$ of the samples are below the calculated percentile. If the average percentile for a service level SL is given by $P_{SL}$, then the corresponding ownership $O_{SL}$ is given by:

$$O_{SL} = S_0 - P_{SL}, \quad (15)$$

where $S_o$ is the initial spare ownership level. In an exemplary embodiment, the value $O_{SL}$ is the main result obtained from the simulation model and is the RSON.

Figure 9A:
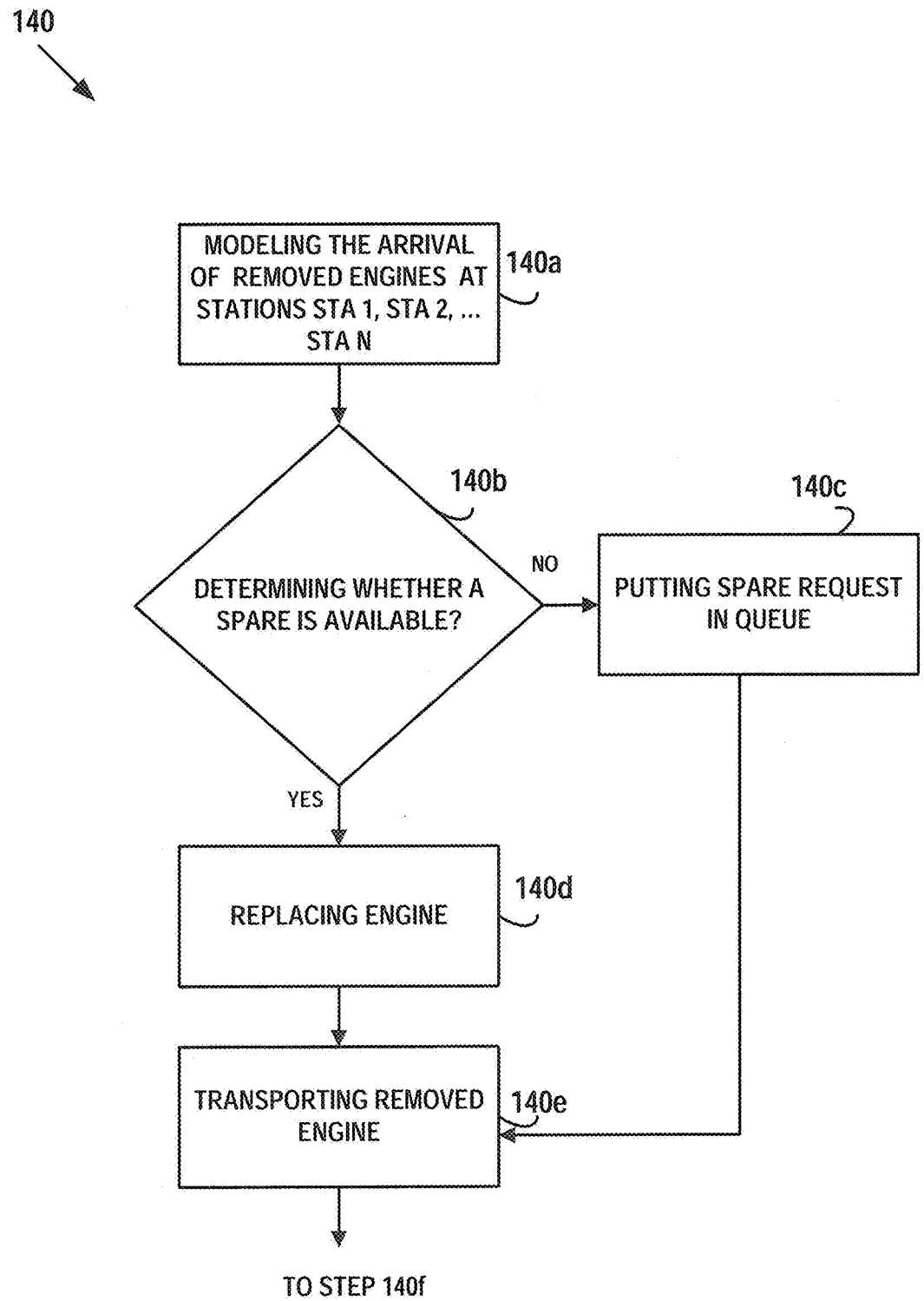
FIGS. 9a and 9b are flow chart illustrations of yet another step of the method of FIG. 3, according to an exemplary embodiment.
Figure 9B:
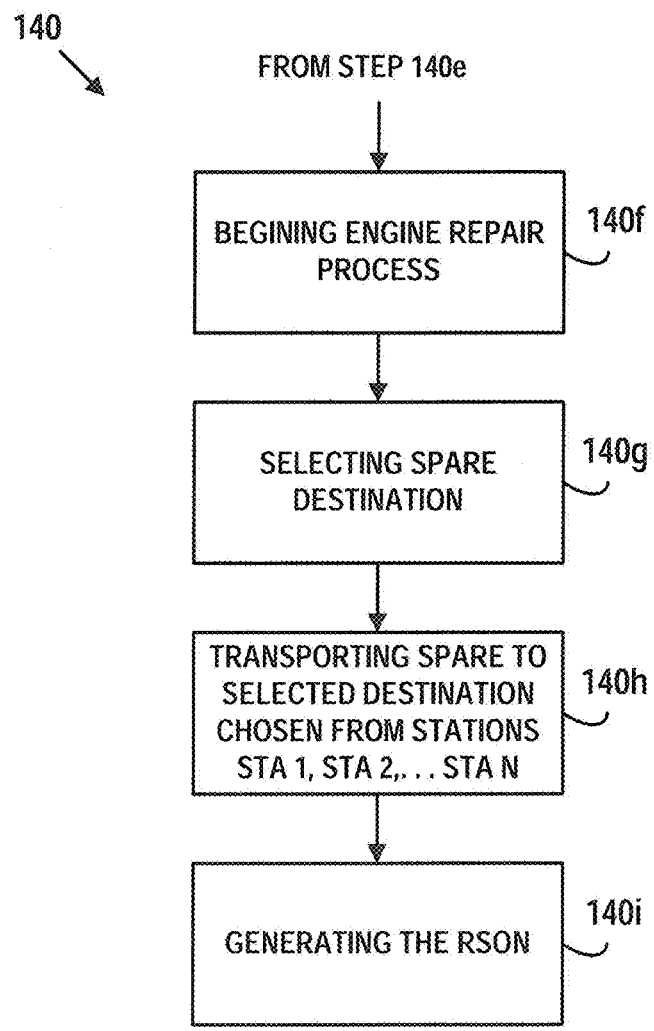

In an exemplary embodiment and referring to FIGS. 3, 9a, and 9b, the system 10 simulates a whole engine repair process with a multi-location setting to generate the recommended spare ownership number at the step 140. In an exemplary embodiment, the step 140 is associated with the Spare Engine Calculator. In an exemplary embodiment, simulating whole engine repair process with a multi-location setting to generate the RSON may include the substeps of modeling the arrival of engines received from stations at step 140a; determining whether a spare is available at the first station at step 140b; if not, then putting spare request in queue at step 140c; and if so, replacing the removed engine with the spare engine at step 140d; after the step 140d or the step 140c, transporting removed engine from the first station to a repair shop at step 140e; beginning engine repair process at the second station at step 140f; selecting spare destination at step 140g; transporting the spare to selected destination station at step 140h; and generating the RSON at step 140i.

In an exemplary embodiment, the arrival of engines for repair is modeled using a Bernoulli distribution similar to the step 130a, but applied at each of the stations included in the system at the step 140a. In an exemplary embodiment, the arrival of engines for repair can be modeled using either a Bernoulli distribution or as a Poisson process. In an exemplary embodiment and when using a Bernoulli distribution, the model utilizes a forecast of the total expected demand for repair of engines to specify the arrival process. Thus, for each station and each day in the simulation process there will be a probability that an engine will arrive for repair. The probability $p_L$ of an engine arrival at station L for repair, where $L=1 \ldots N_L$, and $N_L$ is the number of locations, is defined as:

$$p_L = \frac{\text{Expected Number of Removals at Station } L}{\text{Planning Period Length}} \quad (16)$$

where the planning period length is given in days and is always larger than the expected number of removals. If the engine arrival at station L is modeled as a Poisson process with parameter $\lambda_L$, then:

$$\lambda_L = \frac{\text{Expected Number of Removals at Station } L}{\text{Planning Period Length}}. \quad (17)$$

In an exemplary embodiment, equation (17) represents the mean number of engine arrivals (removals) per day at station L, and the probability of having n engine arrivals in a day at that station, $P_L(x=n)$, is given by:

$$P_L(x = n) = \frac{\lambda_L^n \cdot e^{-\lambda_L}}{n!}. \quad (18)$$

In an exemplary embodiment, it is determined whether a spare is available at the step 140b. In an exemplary embodiment, the possibility of checking if an spare is available for borrowing at a pre-specified station and that can be transported to the first station is actually utilized and it is useful to reduce the waiting time of outstanding spare requests. In an exemplary embodiment, this feature is also known as spare borrowing between stations. The borrowing is also conducted based on the spare level at the borrowing station. In an exemplary embodiment, a threshold point is pre-defined which is used to decide if borrowing is allowed or not. Basically, if the inventory level at the borrowing station is equal or greater than such threshold point, then the borrowing of a spare is allowed.

In an exemplary embodiment, and if no spare is available, then a request for a new spare is put in queue at the step 140c. In an exemplary embodiment, the request for a new spare is put in queue along with any other requests from other stations and the event is considered as an aircraft OuT of Service (OTS) event.

In an exemplary embodiment, and if a spare is available, then the removed engine is replaced in the aircraft with the available serviceable spare at step 140d. In an exemplary embodiment, in the model every time a spare is utilized then a replacement of the spare is requested from the shops. In an exemplary embodiment, the spare inventory level at station L is defined as $S_k^L$ where $k=1, 2, \ldots$ is the spare level change event index, and $S_0^L$ is defined as the initial spare level. In an exemplary embodiment and every time a replacement is conducted or an OTS event is generated, then the spare level is decreased. Negative values for the spare level indicates that the station has outstanding spare requests that were not satisfied and therefore generated OTS events. In general, when an engine is removed from the aircraft, either a serviceable spare is taken from the previously available spare level $S_{k-1}^L$ to replace the one that was or an OTS is generated if no serviceable spares are available. Thus, at the event k of an engine removal at the station, the spare level is updated as follows:

$$S_k^L = S_{k-1}^L - 1. \quad (19)$$

In an exemplary embodiment, and after the step 140c or the step 140d, the removed engine is transported to the repair shop at the step 140e. In an exemplary embodiment, the repair shop is a maintenance base to conduct the engine repair process. In an exemplary embodiment, the step 140e is modeled as a time delay representing the time required to transport the engine, and by using a defined probability distribution for the transportation time, e.g., gamma distribution.

In an exemplary embodiment, beginning the engine repair process at the step 140f includes the steps 135a-135j.

In an exemplary embodiment, a station destination for the available spare is determined at step 140g. For this purpose and in an exemplary embodiment, a dispatching rule is utilized for selecting the destination station. Some rules that may be utilized include: First-In-First-Out (FIFO), Longest Transportation Time (LTT)—gives highest priority to stations with longest transportation times-, and the so-called Highest Stockout Probability (HSP) rule, which gives highest priority to the stations with the biggest probability of running out of spares within a given time period based on the current level of serviceable spares at the station. In an exemplary embodiment and after selecting the destination station based on a given dispatching rule, the spare is transported to the corresponding station. Such procedure is modeled as a time delay using a defined probability distribution for the transportation time, e.g., gamma distribution.

In an exemplary embodiment, the available spare is transported to a station at the step 140h. As soon as an spare engine arrives to the selected station, the spare level is updated to reflect the new available spare. Assuming that the previous spare level at station L is $S_k^L$, then the update of the current level is given by:

$$S_k^L = S_{k-1}^L + 1. \quad (20)$$

In an exemplary embodiment, the equation (20) indicates that the current spare level is increased by 1 due to the arriving of a serviceable spare engine.

In an exemplary embodiment, and at the end of the simulation process, the RSON is generated at the step 140j. In an exemplary embodiment, and for each station L, the model keeps track of the changes in time of the spare level $S_k^L$ taking a daily snapshot of this variable. In an exemplary embodiment, the simulation process is repeated for M replications of N days each, and the daily variations of $S_k^L$ after a warming-up period W days are utilized to estimate the required spare parts ownership or shop pool for a given service level. Such procedure is conducted by calculating the average percentiles of the variations in time of $S_k^L$ across the M simulation replications. For a service level SL between 0 and 1 (i.e., between 0 and 100%), the needed percentile $p_{sl}$, to calculate, with $0 < p_{sl} < 1$, is given by $$p_{sl} = 1 - SL. \quad (21)$$

For example, to calculate the ownership at a SL=90%, then $p_{sl}=1-0.9=0.1$, which indicates that the $10^{th}$ percentile needs to be calculated. Thus, $(100 \times p_{sl})$ % of the samples are below the calculated percentile. If the average percentile for a service level SL is given by $P_{SL}$, then the corresponding ownership $O_{sl}^L$ at station L is given by $$O_{sl}^L = S_0^L - P_{sl}, \quad (22)$$

where $S_0^L$ is the initial spare ownership level. In an exemplary embodiment, the value $O_{sl}^L$ is the main result obtained from the simulation model and is the RSON. Similarly, if the system starts with defined spare levels at the defined locations, the actual service level, SL, provided by such allocation of spares can be measured by using the following formula:

$$SL = \frac{R^L}{N_R^L}, \quad (23)$$

where
R$^L$ is the number of spare request at station L properly satisfied by available spares at the station; and
N$_R^L$ is the total number of spare requests received at the station, and SL is the service level.

Other metrics obtained from the simulation output include OTS related measures: expected number of OTS events per year based on the probability distribution of daily OTS events generated by the simulation, statistics of the duration of an OTS event when it happens, e.g., average, standard deviation, and expected number of transitions from positive to zero spare level. In an exemplary embodiment, most of the measures indicated above are obtained at station level but also at system-wide level. In an exemplary embodiment, the step 140 is also considered a multi-location model for spare engines.

In an exemplary embodiment and referring to FIG. 3, closed form mathematical formulas are calculated to generate the RSON at the step 145. In an exemplary embodiment, there are closed form mathematical formulas associated with the Spare Engine Calculator and other closed form mathematical formulas associated with the Shop Pool Calculator, although some equations are used in both the Spare Engine Calculator and the Shop Pool Calculator.

Figure 10:
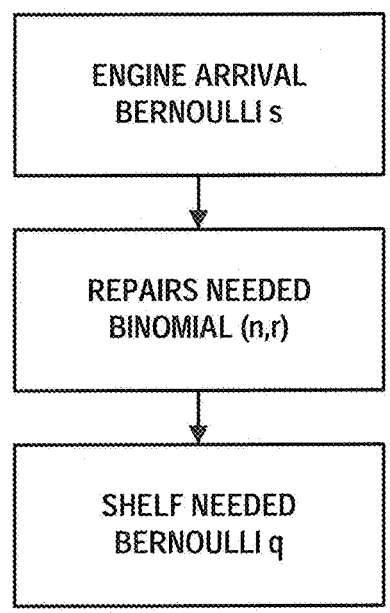
FIG. 10 is a diagrammatic illustration of a system.

In an exemplary embodiment and in regards to the Spare Engine Calculator, the Spare Engine Calculator determines the RSON for engines based on shop repair data, target turn times, and the distribution of demand. In an exemplary embodiment, the demand that needs to be supplied from the shelf is modeled as a 3-part process, as illustrated in FIG. 10. In an exemplary embodiment, the first stage is a Bernoulli process of whether or not an engine arrives to the shop. In an exemplary embodiment, the second stage is a binomial demand based on the number of parts per engine and the individual part probability of repair. In an exemplary embodiment, the final stage is the probability that the part's repair time is greater than the target turn-around-time and is also a Bernoulli process. In an exemplary embodiment, the expected value of adjusted demand is the fraction of expected parts in repair that will need to come from the shelf:

$$D' = E[\text{\# of parts to repair}] * P[\text{Engine arrives}] * P[\text{Shelf Needed}] = nrsq \quad (24)$$

The RSON, or the OWN value, is given by the following approximations:

$$OWN = D'(L' - T) + k\sqrt{\sigma_{D'}^2(L' - T) + \frac{\sigma_{L'}^2(D')^2}{DL}}, \text{ or} \quad (25)$$

$$OWN = \quad (26)$$
$$nrsq(L' - T) + k\sqrt{nrsq(1 - rq(1 - n + ns))(L' - T) + \frac{\sigma_{L'}^2 nrsq^2}{L}}$$

where
s=probability of an engine arriving to the shop and being inducted on a given day. This is modeled as a Bernoulli trial, meaning that at most one engine arrives on a day.
n=number of parts per engine. This should be an integer, but is not constrained to be one in the formula and is not always an integer in existing data sources.
r=probability that an individual part will need repair when an engine shows up to the shop.
L=mean repair time.
T=target turn-around time. Generally, this is the number of days that an engine will spend in the shop. In practice, it is only a goal and it is not always reached.
L'=expected repair time given that repair time is greater than T. Therefore L'=E[L|L>T].
q=probability that the repair time of an individual part will be greater than the target turn-around time=P[L>T].
$\sigma_L^2$=variance of the repair time.
$\sigma_{L'}^2$=conditional variance of the repair time given that repair time is greater than T. In an exemplary embodiment, this is defined by $\sigma_{L'}^2 = E[\sigma_L^2 | L>T]$.
D=expected daily number of parts that will need repair=nrs, also called daily raw demand or just demand.
D'=expected daily demand that will be supplied from the shelf, also called adjusted demand. It will be shown below that D'=nrsq.
k=one-tailed standard normal distribution factor that varies depending on the target service level as follows:

| Service Level | k |
| --- | --- |
| 90% | 1.2816 |
| 92% | 1.4051 |
| 94% | 1.5548 |
| 95% | 1.6449 |
| 96% | 1.7507 |
| 98% | 2.0537 |
| 99% | 2.3263 | with k satisfying the equation P[Z<k]=Service Level, where Z is a standard normal random variable.

Regarding the target turn-around time, and for example, assume the first demand occurs on day 1, the mean repair time is 50 days, and T is 45 days. When the engine is induced, assume part A is removed and goes into the repair process. Forty-five days later, on day 46, if part A has not completed its repair (so it cannot be re-installed), then an identical part is taken from the shelf of serviceable parts and installed on the engine. Then the fully repaired engine is shipped out. The end result is that the engine will complete its repairs in a total of 45 days despite the fact that some of its parts were not ready in that time. In an exemplary embodiment, the target turn-around time aids in determining how many parts are used off the shelf during the initialization period. The longer T is, the more time no parts are needed from the shelf. In the simple case where L>T, for the first T days nothing need come off the shelf because no engine is going out the door. But once day T+1 arrives, parts must come off the shelf. As long as there is a wait until the first repaired part is available (expected to occur on day L+1 if the first engine arrives on day 1), shelf parts must be used. So the length of this period is L+1−(T+1)=L−T and the expected shelf usage will be the expected daily demand rate times the length of time (L−T).

In an exemplary embodiment, when the OWN value is <0.5, it is rounded down to zero. In an exemplary embodiment and when P[L>T] is zero within the calculable tolerance, the OWN value is set to zero. In an exemplary embodiment, repair times are modeled with a normal distribution. Under this assumption, the formula for L' is:

$$L' = E[L | L > T] = L + \frac{\sigma_L \varphi(z)}{1 - \Phi(z)}, \qquad (27)$$

where $$z = \frac{T - L}{\sigma_L}, \qquad (28)$$

$\varphi(z)$=probability density function of a standard normal random variable, and
$\Phi(z)$=the cumulative distribution function of a standard normal random variable.

In an exemplary embodiment, to get the value of $\sigma_{L'}^2$, the conditional variance of the repair time, let:

$$\lambda = \frac{\varphi(z)}{1 - \Phi(z)}. \qquad (29)$$

Then using the definition of z given above, the formula is:

$$\sigma_{L'}^2 = \sigma_L^2 (1 - \lambda^2 + \lambda z). \qquad (30)$$

In an exemplary embodiment, a variance of mixed binomial distribution model is used during the step 140. In an exemplary embodiment, in the variance of mixed binomial distribution model, the adjusted demand is zero with probability s and takes on a binomial distribution with parameters n and r with probability (1−s). Conditioned on a positive demand, the distribution is binomial, but the unconditional distribution has a point mass at zero along with the binomial mass. In an exemplary embodiment, for the ownership formula, which results in the recommended ownership number, the variance of this unique distribution is required, which is also known as a mixed binomial. The first two moments of the adjusted demand are found by conditioning on the engine arrival:

$$E[D'] = E[D'|\text{Engine Arrives}]P[\text{Engine Arrival}] + E[D'|\text{no engine}]P[\text{no engine}] \qquad (28)$$

and $$E[D'] = nrsq + (0)(1-s) = nrsq. \qquad (31)$$

For the second moment:

$$E[(D')^2] = E[(D')^2|\text{Engine arrives}]s + E[(D')^2|\text{no engine}](1-s)]. \qquad (32)$$

In an exemplary embodiment, the binomial distribution with parameters n and p have expected value of np and variance of np(1−p). Therefore, the expected value of the binomial squared is the mean squared plus the variance, or since in this case the number of trial is n and the "success" probability or parameter is rq (because that is the probability [given that there is an engine arrival] that an individual part will need to be repaired and its repair time is longer than L.) In an exemplary embodiment, the expected value of this binomial squared will be $nrq(1-rq)+n^2r^2q^2$, or $nrq(1-rq+nrq)$, which results in:

$$E[(D')^2] = nrq(1-rq+nrq)s + (0)(1-s) \qquad (33)$$

and $$E[(D')^2] = nrqs(1-rq+nrq). \qquad (34)$$

Now the variance of the adjusted demand may be found using:

$$\sigma_{D'}^2 = nrqs(1-rq+nrq) - [nrqs]^2 \qquad (35)$$

$$\sigma_{D'}^2 = nrqs(1-rq+nrq-nrqs) \qquad (36)$$

$$\sigma_{D'}^2 = nrqs(1-rq(1-n+ns)) \qquad (37)$$

and $$\sigma_{D'}^2 = nrqs(1-rq(1-n(1-s))) \qquad (38)$$

However and in an exemplary embodiment, the ownership formula of equation (26) may be simplified if n=1, with the RSON being approximately:

$$OWN = rqs(L' - T) + k\sqrt{rqs(1 - rqs)(L' - T) + \frac{\sigma_{L'}^2 rsq^2}{L'}}. \qquad (39)$$

It can be seen that the demand variance component (the first two terms) in the radical is the variance of a Bernoulli distribution [given by p(1−p), where p is the success parameter/probability, which in this case is rqs], which matches with the demand process under this simplification. If it is further simplified to the case where T=0, then L'→L, $\sigma_{L'}^2 \to \sigma_L^2$, q→1, and then:

$$OWN = DL + k\sqrt{\sigma_D^2 L + \frac{\sigma_L^2 D^2}{DL}}. \qquad (40)$$

In an exemplary embodiment, the denominator in the last term under the radical represents the expected demand (number of items to repair) during the expected lead time. In the standard inventory model with stochastic lead times where only one order is allowed to be outstanding at any given time, all of the variance associated with the demand during a lead time is concentrated in the time waiting for the one order and the ownership number is given by:

$$OWN = DL + k\sqrt{\sigma_D^2 L + \sigma_L^2 D^2} \qquad (41)$$

But in this scenario, the variance is spread out over an average of DL items under repair simultaneously, and since in this model if all repairs are mutually independent, the variance can be divided equally among these ongoing repairs, which gives the formula with the DL in the denominator.

In an exemplary embodiment, an ARENA simulation model has been developed to test the formula and provide insight. In an exemplary embodiment, there are two stages in the simulation. In an exemplary embodiment, the first stage is initialization, where items may be used off the shelf and the shelf stock drops (in certain cases, where L is small, the shelf stock can rise during initialization). In an exemplary embodiment, this period lasts roughly until the first repair is completed and the serviceable part is put onto the shelf. Then there is the steady state period where the shelf level varies up and down around an average. In an exemplary embodiment, to find the number of parts used from the shelf during initialization, a long period of time is analyzed so steady state can be assumed. In an exemplary embodiment, there are two components. In an exemplary embodiment, the first component is repaired parts that go onto the shelf. In an exemplary embodiment, the second component is the parts that leave the shelf (and the shop) with a repaired engine. Let the time period be mL, where m is chosen to be large compared to T so that the end of the time period is during steady state. In an exemplary embodiment, to find the number of repaired parts that go onto the shelf, it is assumed that there is a demand on day 1. If instead the first demand occurs on day i, without loss of generality i−1 days is subtracted (shifting the system backward) so that the first demand is on day 1. In an exemplary embodiment, to make it onto the shelf during this time period, a part entering repair on day mL−1 must finish its repair in 1 day or less. If R is the repair time to avoid notational confusion, then the expected number of parts satisfying this condition will be:

$$E[\text{Parts starting repair on day } mL-1 \text{ that are returned to shelf}]=nrsP[R\leq 1]. \quad (42)$$

In general, for parts starting repair on day mL−j, then:

$$E[\text{Parts starting repair on day } mL-j \text{ that are returned to shelf}]=nrsP[R\leq j]. \quad (43)$$

Summing from j=1 to j=mL−1 (to cover the whole range from day 1 to mL−1), then:

$$E[\text{Parts returned to shelf}] = nrs \sum_{j=1}^{mL-1} P[R \leq j]. \quad (44)$$

In an exemplary embodiment and to evaluate the summation, an identity is needed. In an exemplary embodiment, the repair time is regarded as discrete (an integer number of days). This is consistent with the simulations, where a normally distributed repair time is rounded to a whole number of days. For a discrete nonnegative random variable, there is:

$$E[X] = \sum_{j=0}^{\infty} x P[X = j] \quad (45)$$

$$= 0P[X=0] + 1P[X=1] + 2P[X=2] + 3P[X=3] + 4P[X=4]+\ldots \quad (46)$$

$$= P[X=1] + P[X=2] + P[X=3] + P[X=4] + $$
$$P[X=2] + P[X=3] + P[X=4] + P[X=3] + $$
$$P[X=4] + P[X=4] + $$
$$\vdots$$

$$= P[X \geq 1] + P[X \geq 2] + P[X \geq 3] + P[X \geq 4] +\ldots \quad (47)$$

$$= \sum_{j=1}^{\infty} P[X \geq j]. \quad (48)$$

Now the summation may be evaluated:

$$\sum_{j=1}^{mL-1} P[R \leq j] = P[R \leq 1] + P[R \leq 2] + \ldots + P[R \leq mL-1] \quad (49)$$

$$= 1 - P[R>1] + 1 - P[R>2] + \ldots + 1 - P[R>mL-1] \quad (50)$$

$$= (mL-1) - \sum_{j=1}^{mL-1} P[R > j] \quad (51)$$

and $$= (mL-1) - \sum_{j=2}^{mL-1} P[R \geq j] \quad (52)$$

If mL−1 is large enough, then the identity will apply and:

$$\sum_{j=1}^{mL-1} P[R \leq j] = (mL-1) - (E[R] - P[R \geq 1]). \quad (53)$$

Assuming a minimum repair time of 1 day (as in the simulation), this simplifies to:

$$\sum_{j=1}^{mL-1} P[R \leq j] = (mL-1) - (L-1) = (m-1)L. \quad (54)$$

Completing the analysis of the first component, this yields:

$$E[\text{Parts returned to shelf}]=nrs(m-1)L. \quad (55)$$

Now the second component. In an exemplary embodiment, parts leave the shelf starting on day T+1 when the first engine leaves the shop and continue until day mL. Since this period lasts mL−T days and the engine arrival rate is nrs, then:

$$E[\text{Parts leaving shelf}]=nrs(mL-T). \quad (56)$$

Using both of these components, the net loss from the shelf during initialization is found:

$$E[\text{net shelf loss}]=E[\text{Parts leaving shelf}]-E[\text{Parts returned to shelf}] \quad (57)$$

$$E[\text{net shelf loss}]=nrs(mL-T)-nrs(m-1)L \quad (58)$$

and $$=nrs(L-T). \quad (59)$$

In an exemplary embodiment, the net loss from the shelf during initialization is independent of m, as it should be since it is in a steady state and the answer must be constant for any large m. Intuitively and in an exemplary embodiment, L−T is the length of the time period where there is no expected movement of repaired parts onto the shelf yet (because that is expected to start on day L+1). So the loss from the shelf is just the rate (nrs) times the length of time. The equation (38) is an approximation and the system 10 is looking for an improved version using the net shelf loss found above and some other changes. Following the same logic as when finding the variance of the adjusted demand, the system 10 can find the variance of the (unadjusted) demand:

$$E[D]=E[D|\text{Engine Arrives}]P[\text{Engine Arrival}]+E[D|\text{no engine}]P[\text{no engine}] \quad (60)$$

$$E[D]=nrs+(0)(1-s)=nrs \quad (61)$$

and $$E[D^2]=E[D^2|\text{Engine arrives}]s+E[D^2|\text{no engine}](1-s)]. \quad (62)$$

Recalling that the expected value of the binomial squared is the variance plus the squared mean, or since in this case the success parameter is r, this would be $nr(1-r)+n^2r^2$, or $nr(1-r+nr)$, then:

$$E[D^2]=nr(1-r+nr)s+(0)(1-s)] \quad (63)$$

and $$E[D^2]=nrs(1-r+nr) \quad (64)$$

Now the variance of demand is:

$$\sigma_D^2=nrs(1-r+nr)-[nrs]^2 \quad (65)$$

$$\sigma_D^2=nrs(1-r+nr-nrs) \quad (66)$$

$$\sigma_D^2=nrs(1-r(1-n+ns)) \quad (67)$$

and $$\sigma_D^2=nrs(1-r(1-n(1-s))). \quad (68)$$

Using this in the ownership formula with a few other changes, equation (38) may be simplified to:

$$OWN = nrs(L-T) + k\sqrt{nrs(1-r+nr-nrs)(L'-T) + \frac{\sigma_L^2 nrs}{L}} ; \quad (69)$$

or more compactly, as:

$$OWN = D(L-T) + k\sqrt{\sigma_D^2(L'-T) + \frac{\sigma_L^2 D}{L}} . \quad (70)$$

Another form is:

$$OWN = D(L-T) + k\sqrt{\sigma_D^2(L'-T) + \frac{\sigma_L^2 D^2}{DL}} , \quad (71)$$

which shows the similarity of this version to:

$$OWN = DL + k\sqrt{\sigma_D^2 L + \sigma_L^2 D^2} . \quad (72)$$

In an exemplary embodiment, equation (69) performs better than equation (38). In extensive simulations based on 151 CFM56 parts, equation (69) had the correct $10^{th}$ percentile 78% of the time and the rest of the time it was within 1 part. The equation (38) had a wider distribution of errors, between −1 and +6, and hit the correct value only 68% of the time.

In an exemplary embodiment, engines in the shop can be used to supply spares. For example, if there are seven engines in the shop and the seventh one is due to be shipped out today, but needs a dome, then a serviceable dome can be taken from any of the other engines currently in the shop that have a serviceable dome. In an exemplary embodiment, this borrowing procedure will decrease the number of serviceable spares needed as compared to a model that does not allow borrowing. In this particular model, it is assumed that borrowing can occur from any of the inducted engines: those of ESV1, ESV2, or Check and Repair type. As above, it is analyzed how many shelf items will be needed in the initialization period for this borrowing model. In an exemplary embodiment, it is assumed that serviceable items from an inducted engine will go directly to the shelf when the induction occurs. Again, there are two main components. In an exemplary embodiment, the first is the items that go onto the shelf. In an exemplary embodiment and in this model, this main component is now the sum of (1) repaired parts, and (2) serviceable parts from inducted engines. In an exemplary embodiment, these serviceable parts can be thought of as having a repair time of zero. In an exemplary embodiment, the second main component is the parts that leave the shelf (and the shop) when an engine is shipped out. As before, a time period of length mL is used, where m is chosen to be large compared to T so that the end of the time period is during steady state. In an exemplary embodiment and to find the number of repaired parts that go onto the shelf, it is assumed that there is a demand on day 1 that requires a repair time strictly >0. In an exemplary embodiment, if instead the first such demand occurs on day i, without loss of generality i−1 days is subtracted (shifting the system backward) so that the first demand is on day 1. In an exemplary embodiment, to make it onto the shelf during this time period, a part entering repair on day mL−1 must finish its repair in 1 day or less. If R be the repair time to avoid notational confusion, then the expected number of parts satisfying this condition will be:

$$E[\text{Parts starting repair on day } mL-1 \text{ that are returned to shelf}]=nrsP[R\le 1]. \quad (73)$$

This is identical to the previous model, and thus this component will be:

$$E[\text{Repaired Parts returned to shelf}]=nrs(m-1)L. \quad (74)$$

Now the second part of this first component: the expected number of parts going to the shelf from serviceable engines. In an exemplary embodiment, in the time period of mL days, it is expected that there would be $n(1-r)smL$ serviceable parts coming from inducted engines. Completing the analysis of the first component, this yields:

$$E[\text{Serviceable Parts sent to shelf}]=nrs(m-1)L+n(1-r)smL=nsL(r(m-1)+m(1-r))=nsL(m-r). \quad (75)$$

Proceeding to the second component, parts leave the shelf starting on day T+1 when the first engine leaves the shop and continue until day mL. In an exemplary embodiment, since this period lasts mL−T days and the engine arrival rate is ns, then:

$$E[\text{Parts leaving shelf}]=ns(mL-T). \quad (76)$$

Using both of these components, the net loss from the shelf during initialization is found:

$$E[\text{net shelf loss}]=E[\text{Parts leaving shelf}]-E[\text{Parts returned to shelf}] \quad (77)$$

and $$E[\text{net shelf loss}]=ns(mL-T)-nsL(m-r)=ns(Lr-T). \quad (78)$$

In an exemplary embodiment, the application also includes a borrowing model. In an exemplary embodiment and with the borrowing model, it is assumed that every part needs to be repaired, but some (the fraction 1−r) have a repair time of zero. Thus, the mean repair time can then be found by conditioning.

Using equation (69) and:

$$E[R]=E[R|R=0]P[R=0]+E[R|R>0]P[R>0] \qquad (74)$$

and $$E[R]=[0](1-r)+Lr=Lr. \qquad (75)$$

The variance also should be found, thus:

$$E[R^2]=E[R^2|R=0]P[R=0]+E[R^2|R>0]P[R>0] \qquad (76)$$

$$E[R^2]=[0](1-r)+(\sigma_L^2+L^2)r \qquad (77)$$

and $$\sigma_R^2=(\sigma_L^2+L^2)r-(Lr)^2. \qquad (78)$$

Using equation (69), allowing r to go to 1, using the equations (74)-(78) for the moments of R, and using $\sigma_R^2$ for $\sigma_L^2$, and replacing L by Lr, the equation (69) becomes:

$$OWN = ns(Lr-T) + k\sqrt{nrs(1-r+nr-nrs)(L'-T) + \frac{\sigma_R^2 nrs}{L}}. \qquad (79)$$

This can be written as:

$$OWN = ns(Lr-T) + k\sqrt{\sigma_D^2(L'-T) + \frac{r(\sigma_L^2 + L^2(1-r))ns}{L}}, \qquad (80)$$

which is also known as the "Borrow Formula,"
where
(1) r has the same numerical value as before, but now represents the probability of a part repair taking longer than zero time (similar to before, but now technically all parts get repaired, some with a repair time of zero);
(2) $\sigma_D^2$=nrs(1−r+nr−nrs);
(3) All other quantities remain the same as in the previous model; and
(4) The value computed from the formula above is then assumed to be rounded down to the nearest integer.

In an exemplary embodiment, the application also includes a partial borrowing model, in which ESV can be borrowed, but check and repair cannot. In this case, equation (80) is changed slightly. In an exemplary embodiment, the borrowing model allows borrowing from any engine. But in actuality the shops are discouraged from borrowing serviceable parts from a check and repair type engine. Thus, same derivation is performed as before where only the ESV engines can be borrowed from, or "cannibalized." To find the net shelf loss during initialization, now there are five components: (1 Serviceable ESV parts; (2 Repaired parts from Check and Repair; (3 Repaired parts from ESV; (4 ESV engines; (5 Check and Repair engines. In an exemplary embodiment, the components 1-3 are flow onto the shelf components and the components 4-5 are flow off the shelf components. In this exemplary embodiment:
$s_1$=probability of an ESV engine arriving to the shop on a given day. This is modeled as a Bernoulli trial, meaning that at most one engine arrives on a day;
$s_c$=probability of a check and repair engine arriving to the shop on a given day. This is modeled as a Bernoulli trial, meaning that at most one engine arrives on a day;
$r_1$=probability that an individual part needs repair when an ESV engine shows up to the shop; and
$r_c$=probability that an individual part needs repair when a check and repair engine shows up to the shop.

Using the above-listed logic and same time frame of mL results in:

$$n(1-r_1)s_1 mL \qquad (81)$$

$$nr_c s_c(m-1)L \qquad (82)$$

$$nr_1 s_1(m-1)L \qquad (83)$$

$$ns_1(mL-T) \qquad (84)$$

and $$nr_c s_c(mL-T) \qquad (85)$$

After combining equations (81)-(85), it is:

$$E[\text{net shelf loss}]=n(1-r_1)s_1 mL+nr_c s_c(m-1)L+nr_1 s_1(m-1)L-ns_1(mL-T)-nr_c s_c(mL-T). \qquad (86)$$

After simplifying:

$$E[\text{net shelf loss}]=nr_c s_c(L-T)+ns_1(Lr_1-T). \qquad (87)$$

Figure 11:
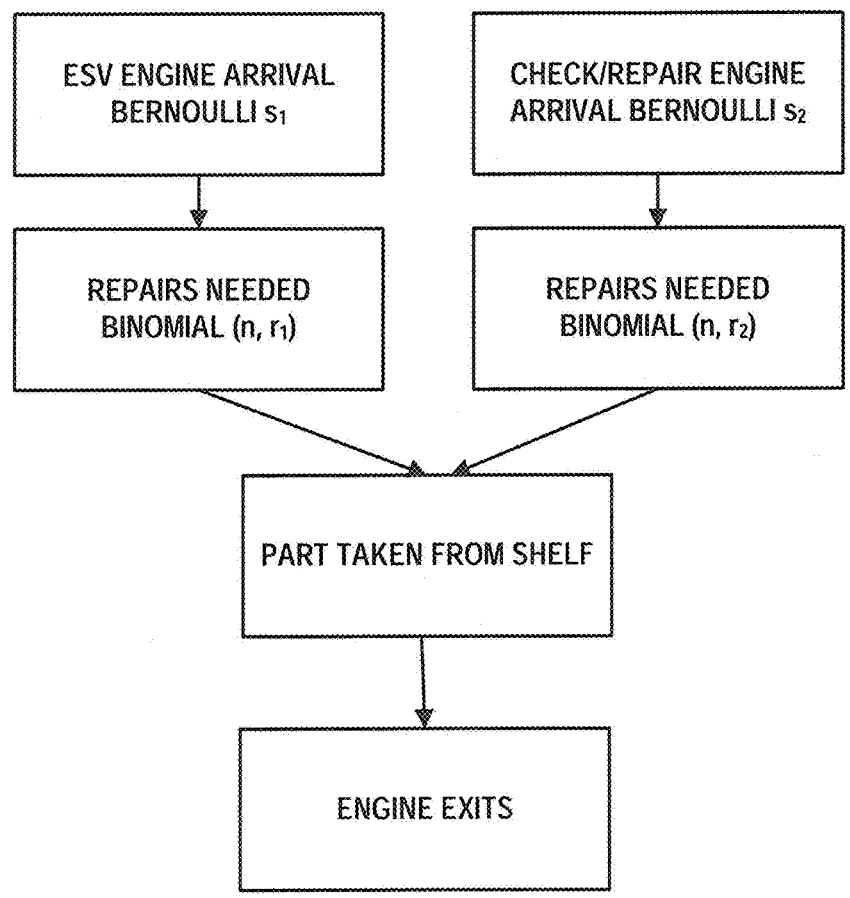
FIG. 11 is a diagrammatic illustration of another system.

In an exemplary embodiment, the application also includes a comprehensive model, where the model separates demand processes for ESV versus check and repair, with WIP as spares for the ESV process only. In an exemplary embodiment and to further model the true shop process, borrowing is allowed only from engines in the shop that are ESV. In an exemplary embodiment, to handle the borrowing, it is assumed that any good part from an arriving ESV engine goes to the shelf (as in the first borrowing model, the repair time is zero for the good parts.) In an exemplary embodiment, the comprehensive model is illustrated in FIG. 11. In an exemplary embodiment, there are options relating to the comprehensive model. In an exemplary embodiment, the first option for the comprehensive model is to essentially ignore the check and repair demand process and create a formula based only on the ESV process. Intuitively, check and repair activity should add to the variability of the serviceable items on the shelf, so this approach should tend to be liberal. If this effect of underestimating the variance is not large, it could be at least partially counteracted by rounding normally or rounding up. In an exemplary embodiment and in this exemplary embodiment, the definitions include:
$s_1$=probability of an ESV engine arriving to the shop on a given day. This is modeled as a Bernoulli trial, meaning that at most one engine arrives on a day.
$r_1$=probability that an individual part needs repair when an ESV engine shows up to the shop.
$D_1$=expected daily number of ESV parts that will need repair=$nr_1 s_1$, also called daily ESV demand.
$\sigma_1^2$=variance of the ESV demand process.

Ignoring the check and repair process, then there is:

$$OWN = ns_1(Lr_1-T) + k\sqrt{\sigma_1^2(L'-T) + \frac{r_1(\sigma_L^2 + L^2(1-r_1))ns_1}{L}}, \qquad (88)$$

which is considered "Option 1",
where $$\sigma_1^2=nr_1 s_1(1-r_1+nr_1-nr_1 s_1) \qquad (89)$$

In an exemplary embodiment, the second option involves supposing the ESV and Check and Repair process are independent. In this exemplary embodiment, the variance of the shelf can be estimated as the sum of two different models. In an exemplary embodiment and for the first model, for ESV, will allow borrowing. In an exemplary embodiment and for the second model, for Check and Repair, will not allow borrowing. So the borrow formula for ESV and the equation (69) for check and repair will be combined. The same parameters are used as in the partial borrowing model, and:

$s_c$=probability of check and repair engine arriving to the shop on a given day. This is modeled as a Bernoulli trial, meaning that at most one engine arrives on a day;

$r_c$=probability that an individual part needs repair when a check and repair engine shows up to the shop;

$D_c$=expected daily number of check and repair parts that will need repair=$nr_c s_c$, also called daily ESV demand;

$\sigma_c^2$=variance of the check and repair demand process; and $$\sigma_c^2 = nr_c s_c(1 - r_c + nr_c - nr_c s_c). \quad (90)$$

The formula for the second option is:

$$OWN = ns_1(Lr_1 - T) + nr_c s_c(L - T) + \quad (91)$$
$$k \sqrt{\sigma_1^2(L' - T) + \frac{r_1(\sigma_L^2 + L^2(1 - r_1))ns_1}{L} + nr_c s_c(1 - r_c + nr_c - nr_c s_c)(L' - T) + \frac{\sigma_L^2 nr_c s_c}{L}},$$

Or, as simplified:

$$OWN = ns_1(Lr_1 - T) + nr_c s_c(L - T) + \quad (92)$$
$$k \sqrt{(\sigma_1^2 + \sigma_c^2)(L' - T) + \frac{r_1(\sigma_L^2 + L^2(1 - r_1))ns_1}{L} + \frac{\sigma_L^2 nr_c s_c}{L}}$$

In an exemplary embodiment, the third option is a combination of the first option and the second options. In an exemplary embodiment, the mean term is used from Option 2, but the variance term is used from Option 1. Thus, the formula for option three is:

$$OWN = ns_1(Lr_1 - T) + nr_c s_c(L - T) + \quad (93)$$
$$k \sqrt{\sigma_1^2(L' - T) + \frac{r_1(\sigma_L^2 + L^2(1 - r_1))ns_1}{L}}$$

In an exemplary embodiment, equation (93) will produce larger ownership values than Option 1 since an extra term relating to the check and repair usage during initialization has been added.

Figure 12:
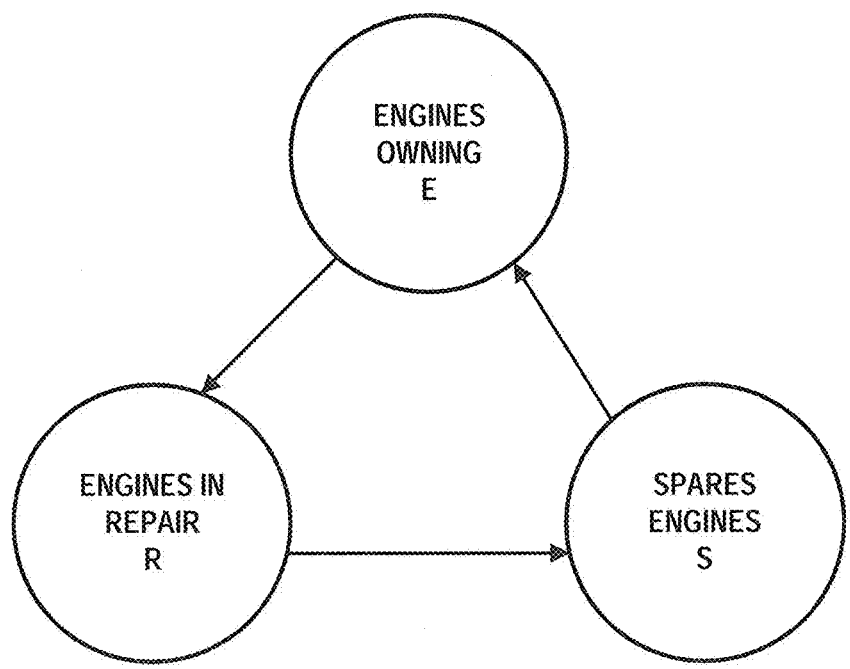
FIG. 12 is a diagrammatic illustration of yet another system.

In an exemplary embodiment, the Spare Engine Calculator includes an engine spares model, with a diagram of the system illustrated in FIG. 12. In an exemplary embodiment, the engine spares model determines the number of spare engines that should be owned, or the RSON, based on forecasts of different types of repairs that will be needed. In an exemplary embodiment and for the engine spares model, the application uses the following notations:

s=probability of an engine arriving to the shop and being inducted on a given day. This is modeled as a Bernoulli trial, meaning that at most one engine arrives on a day.

D=mean daily demand=s.

L=repair time for the entire engine (sometimes L is also used to be the mean repair time.

This should be apparent from the context, but will also occasionally be stated again).

$\sigma_L^2$=variance of the repair time.

R=number of engines in the repair process.

E=number of serviceable engines on the fleet.

S=number of engines being used as spares (serviceable).

$\sigma_R^2$=variance of the number of engines in repair.

$\sigma_E^2$=variance of the number of engines on the fleet.

$\sigma_S^2$=variance of the number of spare engines.

$\rho_{RE}$, $\rho_{RS}$, $\rho_{ES}$=correlation coefficients between engines in repair, spares, and on the fleet.

k=one-tailed standard normal distribution factor that varies depending on the target service level as follows:

| Service Level | k |
|---|---|
| 90% | 1.2816 |
| 92% | 1.4051 |
| 94% | 1.5548 |
| 95% | 1.6449 |
| 96% | 1.7507 |
| 98% | 2.0537 |
| 99% | 2.3263 | k satisfies the equation P[Z<k]=Service Level, where Z is a standard normal random variable.

In an exemplary embodiment and for the engines spares model, it is assumed that the total number of engines, R+S+E, is constant. This means the system variance is zero and there must be correlation between some components. In an exemplary embodiment, the general equation for the variance of the 3-component system is therefore:

$$\sigma_R^2 + \sigma_S^2 + \sigma_E^2 + 2\rho_{RE}\sigma_R\sigma_E + 2\rho_{RS}\sigma_R\sigma_S + 2\rho_{ES}\sigma_E\sigma_S = 0. \quad (94)$$

It is assumed that whenever there is an engine failure in the field, the engine is immediately replaced by a spare engine. Given that this implies the number of serviceable engines E in the field is constant, there is no variance for E. In an exemplary embodiment, the system equation then becomes:

$$\sigma_R^2 + \sigma_S^2 + 2\rho_{RS}\sigma_R\sigma_S = 0. \quad (95)$$

Thus, if an engine fails, R increases by 1 since the engine goes into repair, and S decreases by 1 since the spare is immediately put into service. Conversely, when a repair completes, R decreases by 1 and S increases by 1. R and S appear to be perfectly negatively correlated. There are other possibilities of events, but they also show the perfect correlation. For example, suppose an engine failure and a completed repair happen on the same day. Then R has no net change since it gains and loses 1 engine. Similarly, S has no net change since it supplies a spare and also gains one from the completed repair. Or suppose two repairs are completed in one day. Then R drops by 2 and S increases by 2. In all cases, an increase (decrease) in R is matched by a corresponding decrease (increase) in S. This must occur since an increase in R is caused by an engine failure (which immediately causes a decrease in S) and any decrease in R comes from a repair completion, which automatically goes to S. As long as there is enough engines in every category (i.e., no stockouts), the correlation is perfect and their correlation coefficient is −1. This then simplifies the equation (95) further to:

$$\sigma_R^2 + \sigma_S^2 - 2\sigma_R\sigma_S = 0. \quad (96)$$

In an exemplary embodiment, $$(\sigma_R - \sigma_S)^2 = 0. \quad (97)$$

And the identity:

$$\sigma_R = \sigma_S. \quad (98)$$

This is a convenient simplification—R and S have the same variance. Using the mean and variance of R, it is possible to estimate the $90^{th}$ percentile and determine the spare engine requirement to meet a 90% service level.

In an exemplary embodiment, the engine spare mean formula is:

$$E[R] = \sum_{i=0}^{\infty} sP[L > i] = s\sum_{i=1}^{\infty} P[L \geq i] = sE[L] = DL \quad (99)$$

In an exemplary embodiment, the number of engines in repair is the sum of the engines that fail today and those that failed in the past that have not yet completed repair.

In an exemplary embodiment and for the variance of the number of engines in repair, let:

$A_i$ = Engines still in repair today that went into repair i days ago.

Under this scenario, the number of engines in repair is given by:

$$R = \sum_{i=0}^{\infty} A_i. \quad (100)$$

In an exemplary embodiment and since the engine failures as being modeled independent of each other, the variance of R is the sum of the variances of the $A_i$. In an exemplary embodiment, each of the $A_i$ is itself a realization of a Bernoulli trial with success probability given by $sP[L \geq i]$. In an exemplary embodiment, the variance of a Bernoulli trial with success parameter p is given by $p(1-p)$. So the variance of R is then:

$$\sigma_R^2 = \sum_{i=0}^{\infty} sP[L \geq i]\{1 - sP[L \geq i]\}. \quad (101)$$

In an exemplary embodiment, this summation can be evaluated for the special case of a geometric repair time distribution. A geometric random variable L with success probability p and domain i=1, 2, 3, . . . , is described by the probability mass function:

$$P[L=i] = (1-p)^{i-1}p. \quad (102)$$

The cumulative distribution function is:

$$P[L \leq i] = 1 - (1-p)^i. \quad (103)$$

From this, the complement of the cumulative distribution function is found to be:

$$P[L \geq i] = (1-p)^{i-1}. \quad (104)$$

Key moments of this distribution are:

$$E[L] = \frac{1}{p}, \quad E[L^2] = \frac{2-p}{p^2}, \quad \sigma_L^2 = \frac{1-p}{p^2}. \quad (105)$$

Since L cannot be zero for this characterization of the geometric distribution, the expression is written as:

$$\sigma_R^2 = \sum_{i=1}^{\infty} sP[L \geq i] - s^2 \sum_{i=1}^{\infty} (P[L \geq i])^2. \quad (106)$$

In an exemplary embodiment, the first summation is:

$$\sum_{i=1}^{\infty} sP[L \geq i] = s\sum_{i=1}^{\infty} s[L \geq i] = sE[L] = DL. \quad (107)$$

Now from the formula for the complement of the cdf:

$$\sum_{i=1}^{\infty} (P[L \geq i])^2 = \sum_{i=1}^{\infty} (1-p)^{2(i-1)} \quad (108)$$

and $$\sum_{i=1}^{\infty} (P[L \geq i])^2 = [1 + (1-p)^2 + (1-p)^4 + \ldots]. \quad (109)$$

These terms form a geometric series, thus:

$$\sum_{i=1}^{\infty} (P[L \geq i])^2 = \frac{1}{(1-(1-p)^2)} = \frac{1}{p(2-p)}. \quad (110)$$

In an exemplary embodiment, the moment formulas are:

$$\frac{(E[L])^3}{E[L^2]} = \frac{(1/p^3)}{\frac{2-p}{p^2}} = \frac{1}{p(2-p)}. \quad (110)$$

Considering:

$$E[L^2] = \sigma_L^2 + (E[L])^2, \quad (111)$$

and using equation (106) and the shorthand $E[s] = D$ and $E[L] = L$, $$\sigma_R^2 = DL - D^2\left(\frac{L^3}{\sigma_L^2 + L^2}\right) = DL\left(1 - \frac{DL^2}{\sigma_L^2 + L^2}\right) \quad (112)$$

and $$\sigma_R = \sqrt{DL\left(1 - \frac{DL^2}{\sigma_L^2 + L^2}\right)}. \quad (113)$$

In an exemplary embodiment, the equation (113) is the engine spare variance formula. In an exemplary embodiment, using the expected number of engines used in initialization, DL, the ownership formula for engines with geometric repair times is:

$$\text{OWNERSHIP} \cong DL + k\sqrt{DL\left(1 - \frac{DL^2}{\sigma_L^2 + L^2}\right)}, \quad (114)$$

In an exemplary embodiment, the equation (114) is referenced as the Geometric Repair Time. In an exemplary embodiment, the value of the equation (114) is the RSON. In an exemplary embodiment, this entire approach can be generalized to a continuous version using integrals instead of sums. This is analogous to the demand process occurring in continuous time (like a Poisson process) rather than being discrete Bernoulli trials. Then equation (106) becomes:

$$\sigma_R^2 = \int_0^\infty sP[L \geq x]dx - s^2 \int_0^\infty (P[L \geq x])^2 dx. \quad (115)$$

For continuous random variables defined on the positive axis the familiar identity is slightly different than the discrete formula:

$$\int_0^\infty P[X \geq x]dx = E[X]. \quad (116)$$

Now the continuous analogue to the geometric distribution is used, which is the exponential, for repair times. For an exponential random variable with parameter $\lambda$ the mean is $L = 1/\lambda$, and the complement of the cumulative distribution function is:

$$p[X \geq x] = e^{-\lambda x}. \quad (117)$$

Thus, $$\sigma_R^2 = sE[L] - s^2 \int_0^\infty e^{-2\lambda x} dx. \quad (118)$$

Using shorthand for expectations and integrating, this simplifies to:

$$\sigma_R^2 = DL - D^2 \frac{1}{2\lambda} = DL\left(1 - \frac{D}{2}\right). \quad (119)$$

The ownership formula, which is associated with the RSON, is then:

$$\text{OWNERSHIP} \cong DL + k\sqrt{DL\left(1 - \frac{D}{2}\right)}. \quad (120)$$

In an exemplary embodiment, the equation (120) is referenced as the Exponential Repair Time. While not exact for other distributions, equations (114) and (120) produce results that are in close agreement with values generated using simulation and gamma-distributed repair times. In terms of a gamma repair time distribution with shape parameter $\alpha$, scale parameter $\beta$, and mean of $\alpha\beta$, then equation (114) becomes:

$$\text{OWNERSHIP} \cong D\alpha\beta + k\sqrt{D(1-D) + D\alpha\beta\left(\frac{1+\alpha(1-D)}{1+\alpha}\right)}, \quad (121)$$

and equation (120) becomes:

$$\text{OWNERSHIP} \cong D\alpha\beta + k\sqrt{D\alpha\beta\left(1 - \frac{D}{2}\right)}. \quad (122)$$

In an exemplary embodiment, the gamma parameters $\alpha$ and $\beta$ can be found using the method of moments. In an exemplary embodiment, maximum likelihood could also be used.

In an exemplary embodiment, the application includes modeling the distribution of the number of engines in repair as a gamma distribution. In an exemplary embodiment, modeling the distribution of the number of engines in repair as a gamma distribution includes estimates the mean and variance of the items in repair by using equations (99) and (113). If a gamma distribution is fit to the mean and variance using the method of moments, then the percentiles can be calculated directly using the gamma inverse cumulative distribution function. For example, in Excel, for the 90% service level, the ownership would be calculated as:

OWNERSHIP=GAMMA.INV(0.90,$\alpha$,$\beta$) (123)

This model, then, uses a gamma distribution for repair times, and another gamma distribution for the number of items in repair.

In an exemplary embodiment, the application includes modeling the distribution of number of engines in repair as a Weibull repair time. In an exemplary embodiment, a Weibull distribution has a reasonable shape and can do a better job fitting to the distributions that are used in the simulation (gamma). In an exemplary embodiment and using a Weibull fit, a formula for the variance of the items in repair is derived similarly as the geometric and exponential repair times. In an exemplary embodiment, the Weibull cumulative distribution function is:

$$P[L \leq x] = 1 - e^{-\left(\frac{x}{\beta}\right)^\alpha} \quad (124)$$

and $$\int_0^\infty (P[L \geq x])^2 dx = \int_0^\infty e^{-2\left(\frac{x}{\beta}\right)^\alpha} dx. \quad (125)$$

In an exemplary embodiment, the equation (125) is integrated to:

$$\int_0^\infty e^{-2\left(\frac{x}{\beta}\right)^\alpha} dx = \left[2^{\left(\frac{-1}{\alpha}\right)}\right][x]\left(\left[\frac{x}{\beta}\right]^\alpha\right)^{-1/\alpha}\left[\Gamma\left(\frac{1}{\alpha}, 2\left(\frac{x}{\beta}\right)^\alpha\right)\right]\left[\frac{-1}{\alpha}\right]\bigg|_0^\infty, \quad (126)$$

where the incomplete gamma function is defined as:

$$\Gamma(\alpha, x) = \int_x^\infty t^{\alpha-1} e^{-t} dt. \quad (127)$$

Simplifying, $$\int_0^\infty e^{-2\left(\frac{x}{\beta}\right)^\alpha} dx = \left[\frac{-\beta}{\alpha}\right]\left[2^{\left(\frac{-1}{\alpha}\right)}\right]\left[\Gamma\left(\frac{1}{\alpha}, 2\left(\frac{x}{\beta}\right)^\alpha\right)\right]\Big|_0^\infty. \quad (128)$$

In an exemplary embodiment, $$\lim_{x\to\infty}\Gamma(\alpha,x) = \lim_{x\to\infty} x^{\alpha-1} e^{-x} = 0. \quad (129)$$

Using this and evaluating the integral, then:

$$\int_0^\infty e^{-2\left(\frac{x}{\beta}\right)^\alpha} dx = 0 - \left[\frac{-\beta}{\alpha}\right]\left[2^{\left(\frac{-1}{\alpha}\right)}\right]\left[\Gamma\left(\frac{1}{\alpha}, 0\right)\right]. \quad (130)$$

In an exemplary embodiment, $\Gamma(\alpha, 0) = \Gamma(\alpha)$, so:

$$\int_0^\infty e^{-2\left(\frac{x}{\beta}\right)^\alpha} dx = \left[\frac{\beta}{\alpha}\right]\left[2^{\left(\frac{-1}{\alpha}\right)}\right]\left[\Gamma\left(\frac{1}{\alpha}\right)\right]. \quad (131)$$

The mean of a Weibull distribution is:

$$E[L] = \left[\frac{\beta}{\alpha}\right]\left[\Gamma\left(\frac{1}{\alpha}\right)\right]. \quad (132)$$

So the integral can be rewritten as:

$$\int_0^\infty (P[L \ge x])^2 dx = \int_0^\infty e^{-2\left(\frac{x}{\beta}\right)^\alpha} dx = \frac{L}{2^{\left(\frac{1}{\alpha}\right)}}. \quad (133)$$

In an exemplary embodiment and as a check, let $\alpha=1$, which simplifies the Weibull to an exponential, and the integral simplifies to L/2, which agrees with the exponential equation. This formula has also been tested for the more general case in Excel using numerical integration, and it gives accurate results, validating it. At this point, if repair times can be modeled with a Weibull, it can be estimates that the variance of the items in repair with equation (115):

$$\sigma_R^2 = \int_0^\infty s P[L \ge x] dx - s^2 \int_0^\infty (P[L \ge x])^2 dx = \\ DL - \frac{D^2 L}{2^{\left(\frac{1}{\alpha}\right)}} = DL\left(1 - \frac{D}{2^{\left(\frac{1}{\alpha}\right)}}\right) \quad (134)$$

Then the RSON, or ownership, is:

$$\text{OWNERSHIP} \cong DL + k\sqrt{DL\left(1 - \frac{D}{2^{\left(\frac{1}{\alpha}\right)}}\right)}. \quad (135)$$

In an exemplary embodiment, the equation (135) is also known as a Weibull ownership number equation. In an exemplary embodiment, the easiest way to fit a Weibull is by matching percentiles. If the median is matched with and an upper percentile (say, the 95$^{th}$), then an appropriate variance estimator should result. Let the median be m and the 95$^{th}$ percentile be u.

$$P[L \le x] = 1 - e^{-\left(\frac{x}{\beta}\right)^\alpha} \quad (136)$$

With two percentiles equations (137) and (138) must be satisfied:

$$0.5 = 1 - e^{-\left(\frac{m}{\beta}\right)^\alpha} \quad (137)$$

and $$0.95 = 1 - e^{-\left(\frac{u}{\beta}\right)^\alpha}. \quad (138)$$

Isolating the exponential term and then taking natural logarithms, $$e^{-\left(\frac{m}{\beta}\right)^\alpha} = 0.5 \text{ and } e^{-\left(\frac{u}{\beta}\right)^\alpha} = 0.05 \quad (139)$$

$$-\left(\frac{m}{\beta}\right)^\alpha = \ln\left(\frac{1}{2}\right) = -\ln(2) \text{ and } -\left(\frac{u}{\beta}\right)^\alpha = \ln(0.05) = -\ln(20) \quad (140)$$

and $$\frac{m}{\beta} = [\ln(2)]^{\left(\frac{1}{\alpha}\right)} \text{ and } \frac{u}{\beta} = [\ln(20)]^{\left(\frac{1}{\alpha}\right)}. \quad (140)$$

Solving for $\beta$ in the first equation:

$$\beta = \frac{m}{[\ln(2)]^{\left(\frac{1}{\alpha}\right)}}. \quad (141)$$

Plugging this into the second equation gives:

$$\frac{u[\ln(2)]^{\left(\frac{1}{\alpha}\right)}}{m} = [\ln(20)]^{\left(\frac{1}{\alpha}\right)} \quad (142)$$

and $$\frac{u}{m} = \frac{[\ln(20)]^{\left(\frac{1}{\alpha}\right)}}{[\ln(2)]^{\left(\frac{1}{\alpha}\right)}} = \left(\frac{\ln(20)}{\ln(2)}\right)^{\left(\frac{1}{\alpha}\right)}. \quad (143)$$

Taking the natural logs again:

$$\left(\frac{1}{\alpha}\right)\ln\left[\frac{\ln(20)}{\ln(2)}\right] = \ln\left(\frac{u}{m}\right). \quad (144)$$

Now the estimator for the shape parameter is:

$$\hat{\alpha} = \frac{\ln\left[\frac{\ln 20}{\ln 2}\right]}{\ln\left(\frac{u}{m}\right)}. \tag{145}$$

From above the scale estimator will be:

$$\hat{\beta} = \frac{m}{[\ln 2]^{\left(\frac{1}{\hat{\alpha}}\right)}}. \tag{146}$$

In an exemplary embodiment, the procedure for the Weibull approach can then be summarized as: compute $\hat{\alpha}$ from the formula above using the median repair time and the 95$^{th}$ percentile of repair time; and plug into the equation (135) to get the ownership. Thus, this can be written as:

$$\text{OWNERSHIP} \cong DL + k\sqrt{DL\left(1 - \frac{D}{2^{\left(\frac{\ln(u/m)}{\ln(\ln 20/\ln 2)}\right)}}\right)}, \tag{147}$$

or $$\text{OWNERSHIP} \cong DL + k\sqrt{DL\left(1 - D(2)^{\left[\frac{-\ln(u/m)}{\ln(\ln 20/\ln 2)}\right]}\right)}. \tag{148}$$

Note that this formulation models the number of offwing engines as having a normal distribution.

In an exemplary embodiment, the application models normal repair times. In an exemplary embodiment, it is not reasonable to model repair times with normal distributions unless the standard deviation is small in comparison to the mean repair time. This is because negative repair times can be generated if the standard deviation is too large. In an exemplary embodiment, a reasonable criteria might be $\mu > 4\sigma$, which would give a probability of realizing a negative variate as less than 1 in 31,500. For continuous random variables, the variance equation from the previous development is:

$$\sigma_R^2 = \int_0^\infty s P[L \geq x] dx - s^2 \int_0^\infty (P[L \geq x])^2 dx, \, [4b] \tag{149}$$

In an exemplary embodiment, the first integral is known (for all distributions) to be DL. In an exemplary embodiment, the second integral is tedious to evaluate, but is presented below. Let the standard normal cumulative distribution function be defined by the usual notation:

$$P[Z \leq z] = \Phi(z) = \frac{1}{\sqrt{2\pi}} \int_{-\infty}^z e^{-t^2/2} dt = \frac{1}{2}\left[1 + \text{erf}\left(\frac{z}{\sqrt{2}}\right)\right], \tag{150}$$

where $$\text{erf}(x) = \frac{2}{\sqrt{\pi}} \int_0^x e^{-t^2} dt. \tag{151}$$

The complementary error function is defined by:

$$\text{Erfc}(x) = 1 - \text{erf}(x) = \frac{2}{\sqrt{\pi}} \int_x^\infty e^{-t^2} dt. \tag{152}$$

If $P[Z \geq z]$ is defined to be $T(z)$, then:

$$T(z) = 1 - \Phi(z) = 1 - \left(\frac{1}{2}\left[1 + \text{erf}\left(\frac{z}{\sqrt{2}}\right)\right]\right) = \tag{153}$$

$$\frac{1}{2} - \frac{1}{2}\text{erf}\left(\frac{z}{\sqrt{2}}\right) = \frac{1}{2}\left(1 - \text{erf}\left(\frac{z}{\sqrt{2}}\right)\right) = \frac{1}{2}\text{erfc}\left(\frac{z}{\sqrt{2}}\right).$$

Considering:

$$\int_0^\infty \text{erfc}^2(x) dx = \frac{2 - \sqrt{2}}{\sqrt{\pi}}, \tag{154}$$

And $$\int_0^\infty [T(z)]^2 dz = \int_0^\infty (P[Z \geq z])^2 dz = \int_0^\infty \left(\frac{1}{2}\text{erfc}\left(\frac{x}{\sqrt{2}}\right)\right)^2 dx, \tag{155}$$

With the transformation $y = x/\sqrt{2}$, then $dy/dx = 1/\sqrt{2}$ and the integral becomes:

$$\int_0^\infty [T(z)]^2 dz = \frac{\sqrt{2}}{4} \int_0^\infty \text{erfc}^2(y) dy = \frac{\sqrt{2}}{4}\left(\frac{2 - \sqrt{2}}{\sqrt{\pi}}\right) = \frac{\sqrt{2} - 1}{2\sqrt{\pi}}. \tag{156}$$

In an exemplary embodiment, this is for a standard normal random variable. In an exemplary embodiment, it must be generalized for the nonstandard normal case. If $X \sim N(\mu, \sigma^2)$, then ideally:

$$\int_0^\infty P[X \geq x]^2 dx. \tag{157}$$

If it is standardized with the transformation $$z = \frac{X - \mu}{\sigma},$$

then $dz/dx = 1/\sigma$ and then:

$$\int_0^\infty P[X \geq x]^2 dx = \tag{158}$$

$$\int_{-\frac{\mu}{\sigma}}^\infty P[Z \geq z]^2 \sigma dz = \sigma \int_{-\mu/\sigma}^0 P[Z \geq z]^2 dz + \sigma \int_0^\infty P[Z \geq z]^2 dz.$$

As the last integral is known from the standard normal, then:

$$\int_0^\infty P[X \geq x]^2 dx = \sigma \int_{-\mu/\sigma}^0 P[Z \geq z]^2 dz + \sigma\left[\frac{\sqrt{2}-1}{2\sqrt{\pi}}\right] = \quad (159)$$

$$\sigma \int_{-\mu/\sigma}^0 (1 - P[Z \leq z])^2 dz + \sigma\left[\frac{\sqrt{2}-1}{2\sqrt{\pi}}\right]$$

and $$\int_0^\infty P[X \geq x]^2 dx = \quad (160)$$

$$\sigma\left[\int_{-\mu/\sigma}^0 dz - 2\int_{-\mu/\sigma}^0 P[Z \leq z]dz + \int_{-\mu/\sigma}^0 P[Z \leq z]^2 dz\right] +$$

$$\sigma\left[\frac{\sqrt{2}-1}{2\sqrt{\pi}}\right]$$

In an exemplary embodiment, $$\int \Phi(z) dz = z\Phi(z) + \phi(z), \quad (161)$$

where $\phi(z)$ is the probability density function for a standard normal random variable, and $$\int [\Phi(z)]^2 dz = z[\Phi(z)]^2 + 2\Phi(z)\phi(z) - \frac{\Phi(z\sqrt{2})}{\sqrt{\pi}}. \quad (162)$$

As such:

$$\int_0^\infty P[X \geq x]^2 dx = \sigma\left[\frac{\mu}{\sigma} - 2[z\Phi(z) + \phi(z)]\Big|_{-\mu/\sigma}^0\right] + \quad (163)$$

$$\sigma\left[z[\Phi(z)]^2 + 2\Phi(z)\phi(z) - \frac{\Phi(z\sqrt{2})}{\sqrt{\pi}}\right]\Big|_{-\mu/\sigma}^0 + \sigma\left[\frac{\sqrt{2}-1}{2\sqrt{\pi}}\right]$$

$$\int_0^\infty P[X \geq x]^2 dx = \mu - 2\sigma\left[\phi(0) - \left[\frac{-\mu}{\sigma}\Phi\left(\frac{-\mu}{\sigma}\right)\right] + \phi\left(\frac{-\mu}{\sigma}\right)\right] + \quad (164)$$

$$\sigma\left[0 + 2\left(\frac{1}{2}\right)\phi(0) - \frac{1}{2\sqrt{\pi}} - \left\{\frac{-\mu}{\sigma}\left[\Phi\left(\frac{-\mu}{\sigma}\right)\right]^2 + 2\Phi\left(\frac{-\mu}{\sigma}\right)\phi\left(\frac{-\mu}{\sigma}\right) - \frac{1}{\sqrt{\pi}}\Phi\left(\frac{-\mu\sqrt{2}}{\sigma}\right)\right\}\right] + \sigma\left[\frac{\sqrt{2}-1}{2\sqrt{\pi}}\right]$$

$$\int_0^\infty P[X \geq x]^2 dx = \mu - 2\sigma\left[\phi(0) + \frac{\mu}{\sigma}\Phi\left(\frac{-\mu}{\sigma}\right) + \phi\left(\frac{-\mu}{\sigma}\right)\right] + \quad (165)$$

$$\sigma\left[\left(\phi(0) - \frac{1}{2\sqrt{\pi}}\right) - \left(\frac{-\mu}{\sigma}\left[\Phi\left(\frac{-\mu}{\sigma}\right)\right]^2 + 2\Phi\left(\frac{-\mu}{\sigma}\right)\phi\left(\frac{-\mu}{\sigma}\right) - \frac{1}{\sqrt{\pi}}\Phi\left(\frac{-\mu\sqrt{2}}{\sigma}\right)\right)\right] + \sigma\left[\frac{\sqrt{2}-1}{2\sqrt{\pi}}\right]$$

and $$\int_0^\infty P[X \geq x]^2 dx = \quad (166)$$

$$\mu - 2\sigma\phi(0) - 2\mu\Phi\left(\frac{-\mu}{\sigma}\right) - 2\sigma\phi\left(\frac{-\mu}{\sigma}\right) + \sigma\phi(0) - \frac{\sigma}{2\sqrt{\pi}} +$$

-continued $$\mu\left[\Phi\left(\frac{-\mu}{\sigma}\right)\right]^2 - 2\sigma\Phi\left(\frac{-\mu}{\sigma}\right)\phi\left(\frac{-\mu}{\sigma}\right) + \frac{\sigma}{\sqrt{\pi}}\Phi\left(\frac{-\mu\sqrt{2}}{\sigma}\right) + \sigma\left[\frac{\sqrt{2}-1}{2\sqrt{\pi}}\right].$$

In an exemplary embodiment, $$\phi(0) = \frac{1}{\sqrt{2\pi}} \text{ and } \phi\left(\frac{-\mu}{\sigma}\right) = \frac{1}{\sqrt{2\pi}} e^{-\frac{\mu^2}{2\sigma^2}}, \quad (167)$$

so $$\int_0^\infty P[X \geq x]^2 dx = \mu - \frac{\sigma}{\sqrt{2\pi}} - 2\mu\Phi\left(\frac{-\mu}{\sigma}\right) - \frac{2\sigma}{\sqrt{2\pi}} e^{-\frac{\mu^2}{2\sigma^2}} - \frac{\sigma}{\sqrt{\pi}} + \quad (168)$$

$$\frac{\sigma\sqrt{2}}{2\sqrt{\pi}} + \mu\left[\Phi\left(\frac{-\mu}{\sigma}\right)\right]^2 - 2\sigma\Phi\left(\frac{-\mu}{\sigma}\right)\frac{1}{\sqrt{2\pi}} e^{-\frac{\mu^2}{2\sigma^2}} + \frac{\sigma}{\sqrt{\pi}}\Phi\left(\frac{-\mu\sqrt{2}}{\sigma}\right)$$

$$\int_0^\infty P[X \geq x]^2 dx = \mu + \frac{\sigma}{\sqrt{\pi}}\left[\Phi\left(\frac{-\mu\sqrt{2}}{\sigma}\right) - 1\right] - \quad (169)$$

$$\frac{2\sigma}{\sqrt{2\pi}} e^{-\frac{\mu^2}{2\sigma^2}}\left[1 + \Phi\left(\frac{-\mu}{\sigma}\right)\right] - 2\mu\Phi\left(\frac{-\mu}{\sigma}\right) + \mu\left[\Phi\left(\frac{-\mu}{\sigma}\right)\right]^2$$

and $$\int_0^\infty P[X \geq x]^2 dx = \mu - \frac{\sigma}{\sqrt{\pi}}\left[1 - \Phi\left(\frac{-\mu\sqrt{2}}{\sigma}\right)\right] - \quad (170)$$

$$\frac{2\sigma}{\sqrt{2\pi}} e^{-\frac{\mu^2}{2\sigma^2}}\left[\Phi\left(\frac{-\mu}{\sigma}\right) + 1\right] - \mu\Phi\left(\frac{-\mu}{\sigma}\right)\left[2 - \Phi\left(\frac{-\mu}{\sigma}\right)\right].$$

Now under the assumption that $\mu > 4\sigma$:

$$\Phi\left(\frac{-\mu}{\sigma}\right) \approx 0, \; \Phi\left(\frac{-\mu\sqrt{2}}{\sigma}\right) \approx 0, \text{ and } e^{-\frac{\mu^2}{2\sigma^2}} \approx 0, \quad (171)$$

which gives $$\int_0^\infty P[X \geq x]^2 dx \approx \mu - \frac{\sigma}{\sqrt{\pi}}. \quad (172)$$

Then for the variance:

$$\sigma_R^2 = \int_0^\infty s P[L \geq x] dx - s^2 \int_0^\infty (P[L \geq x])^2 dx. \quad (173)$$

Since s is the expected demand (D), then the variance is:

$$\sigma_R^2 = DL - D^2\left(\mu - \frac{\sigma_L}{\sqrt{\pi}}\right) = \quad (174)$$

$$DL - D^2\left(L - \frac{\sigma_L}{\sqrt{\pi}}\right) = DL - D^2L + \frac{\sigma_L}{\sqrt{\pi}} = DL(1-D) + \frac{D^2\sigma_L}{\sqrt{\pi}},$$

or $$\sigma_R = \sqrt{D(1-D)L + \frac{D^2\sigma_L}{\sqrt{\pi}}}. \quad (175)$$

In a test with an Excel simulation of over 2,000,000 variates using D=75/365, L=50, $\sigma_L$=4 a standard deviation of 2.8699 while the above equation gives 2.8778 was observed. The ownership equation, which results in the RSON, is then:

$$\text{OWNERSHIP} \cong DL + k\sqrt{D(1-D)L + \frac{D^2\sigma_L}{\sqrt{\pi}}}. \quad (176)$$

In an exemplary embodiment, the application models Lognormal Repair Times. In an exemplary embodiment, the cumulative distribution function of a lognormal random variable:

$$P(L \le x) = \frac{1}{2} + \frac{1}{2}Erf\left(\frac{\ln x - \mu}{\sqrt{2}\sigma}\right), \quad (177)$$

where the error function is defined as:

$$Erf(x) = \frac{2}{\sqrt{\pi}}\int_0^x e^{-t^2}dt. \quad (178)$$

Also useful is the complementary error function which satisfies this relation:

$$Erf(x) = 1 - Erfc(x). \quad (179)$$

Therefore, $$P(L \ge x) = 1 - \left(\frac{1}{2} + \frac{1}{2}Erf\left(\frac{\ln x - \mu}{\sqrt{2}\sigma}\right)\right) = \quad (180)$$

$$\frac{1}{2}\left(1 - Erf\left(\frac{\ln x - \mu}{\sqrt{2}\sigma}\right)\right) = \frac{1}{2}Erfc\left(\frac{\ln x - \mu}{\sqrt{2}\sigma}\right)$$

and $$(P[L \ge x])^2 = \frac{1}{4}Erfc^2\left(\frac{\ln x - \mu}{\sqrt{2}\sigma}\right). \quad (181)$$

Using the substitution:

$$y = \frac{\ln x - \mu}{\sqrt{2}\sigma}, \quad x = e^{\mu + \sqrt{2}\sigma y}, \quad (182)$$

then $$\frac{dy}{dx} = \frac{1}{\sqrt{2}\sigma x} \text{ or } dx = \sqrt{2}\sigma x dy = \sqrt{2}\sigma e^{\mu + \sqrt{2}\sigma y}, \quad (183)$$

then, noting that the limits of integration have changed based:

$$\int_0^\infty (P[L \ge x])^2 dx = \quad (184)$$

$$\frac{1}{4}\int_{-\infty}^\infty Erfc^2(y)e^{\mu+\sqrt{2}\sigma y}\sqrt{2}\sigma dy = \frac{\sqrt{2}\sigma}{4}\int_{-\infty}^\infty Erfc^2(y)e^{\mu+\sqrt{2}\sigma y}dy.$$

Let I be defined by:

$$I = \int_{-\infty}^\infty Erfc^2(y)e^{b+ay}dy. \quad (185)$$

In an exemplary embodiment, the "Related Functions" section is:

$$Erfc(x) = 2(1 - \Phi(x\sqrt{2})) = 2\Phi(-x\sqrt{2}), \quad (186)$$

where $\Phi(x)$ is the cdf of the standard normal distribution. Using this, the integral is rewritten as:

$$I = \int_{-\infty}^\infty Erfc^2(y)e^{a+by}dy = 4e^b\int_{-\infty}^\infty [\Phi(-y\sqrt{2})]^2 e^{ay}dy. \quad (187)$$

Integrate by parts—let:

$$u = [\Phi(-y\sqrt{2})]^2, \quad dv = e^{ay} \quad (188)$$

and $$du = -2\sqrt{2}\,\Phi(-y\sqrt{2})\varphi(-y\sqrt{2}), \quad v = \frac{e^{ay}}{a}, \quad (189)$$

where $\varphi(y)$ is the probability density function for a standard normal random variable.

Then the integral becomes:

$$I = \quad (190)$$

$$\frac{4e^b e^{ay}}{a}[\Phi(-y\sqrt{2})]^2\Big|_{-\infty}^\infty - \frac{4\sqrt{2}\,e^b}{a}\int_{-\infty}^\infty 2e^{ay}\Phi(-y\sqrt{2})\varphi(-y\sqrt{2})dy.$$

By evaluation (left term) and the symmetry of the normal distribution (terms in the integral), $$I = 0 - 0 + \frac{4\sqrt{2}\,e^b}{a}\int_{-\infty}^{\infty} 2e^{ay}[1-\Phi(y\sqrt{2})]\varphi(y\sqrt{2})dy \qquad (191)$$

$$I = 0 - 0 + \frac{4\sqrt{2}\,e^b}{a}\int_{-\infty}^{\infty} 2e^{ay}[1-\Phi(y\sqrt{2})]\varphi(y\sqrt{2})dy \qquad (192)$$

and $$I = \frac{4\sqrt{2}\,e^b}{a}\int_{-\infty}^{\infty} 2e^{ay}\varphi(y\sqrt{2})dy - \qquad (193)$$
$$\frac{4\sqrt{2}\,e^b}{a}\int_{-\infty}^{\infty} 2e^{ay}\Phi(y\sqrt{2})\varphi(y\sqrt{2})dy.$$

Let $$z = y\sqrt{2},\ y = \frac{z}{\sqrt{2}},\ \frac{dz}{dy} = \sqrt{2},\ dy = \frac{dz}{\sqrt{2}} \qquad (194)$$

and $$I = \frac{8e^b}{a}\int_{-\infty}^{\infty} e^{az/\sqrt{2}}\varphi(z)dz - \frac{4e^b}{a}\int_{-\infty}^{\infty} 2e^{az/\sqrt{2}}\varphi(z)\Phi(z)dz. \qquad (195)$$

Now the moment generating function of a standard normal random variable is considered. In an exemplary embodiment, the definition and evaluation is:

$$M_X(t) = E[e^{tX}] = \frac{1}{\sqrt{2\pi}}\int_{-\infty}^{\infty} e^{tx}e^{-x^2/2}dx = e^{t^2/2}. \qquad (196)$$

If $t=a/\sqrt{2}$, then:

$$I = \frac{8e^b e^{a^2/4}}{a} - \frac{4e^b}{a}\int_{-\infty}^{\infty} 2e^{\frac{az}{\sqrt{2}}}\varphi(z)\Phi(z)dz. \qquad (197)$$

In an exemplary embodiment, the integrand now is similar to the probability density function of what is called a skew normal random variable. In an exemplary embodiment, the density function for a skew normal distribution with location parameter ε, scale parameter ω, and third parameter α is:

$$f(x) = \frac{2}{\omega}\varphi\!\left(\frac{x-\varepsilon}{\omega}\right)\Phi\!\left(\alpha\!\left(\frac{x-\varepsilon}{\omega}\right)\right). \qquad (198)$$

Consider the case with α=1, ε=0, ω=1. This yields:

$$f(x) = 2\varphi(x)\Phi(x). \qquad (199)$$

Now the integral is again of the moment generating type (also with $t=a/\sqrt{2}$). In an exemplary embodiment, the moment generating function of the skew normal is:

$$M_X(t) = E[e^{tX}] = \qquad (200)$$
$$\int_{-\infty}^{\infty} e^{tx} 2\varphi(x)\Phi(x)dx = 2\!\left(e^{\varepsilon t + \omega^2 t^2/2}\right)\!\Phi\!\left(\frac{\omega t}{\sqrt{2}}\right) = 2e^{t^2/2}\Phi\!\left(\frac{t}{\sqrt{2}}\right).$$

Using the same substitution of $t=a/\sqrt{2}$ as above, then:

$$\int_{-\infty}^{\infty} 2e^{az/\sqrt{2}}\varphi(z)\Phi(z)dz = 2e^{a^2/4}\Phi\!\left(\frac{a}{2}\right). \qquad (201)$$

Using the symmetry of the standard normal distribution, $$I = \frac{8e^b e^{a^2/4}}{a} - \frac{4e^b}{a} 2e^{\frac{a^2}{4}}\Phi\!\left(\frac{a}{2}\right) = \qquad (202)$$
$$\frac{8e^{b+\frac{a^2}{4}}}{a}\!\left[1-\Phi\!\left(\frac{a}{2}\right)\right] = \frac{8e^{b+\frac{a^2}{4}}}{a}\!\left[\Phi\!\left(-\frac{a}{2}\right)\right].$$

In an exemplary embodiment, $b=\mu$ and $a=\sqrt{2}\sigma$ so:

$$I = \frac{8e^{\mu+\sigma^2/2}}{\sqrt{2}\,\sigma}\!\left[\Phi\!\left(-\frac{\sqrt{2}\,\sigma}{2}\right)\right] \qquad (203)$$

and $$\int_0^\infty (P[L\geq x])^2 dx = \frac{\sqrt{2}\,\sigma}{4}\int_{-\infty}^{\infty} Erfc^2(y)e^{\mu+\sqrt{2}\,\sigma y}dy. \qquad (204)$$

So this yields:

$$\int_0^\infty (P[L\geq x])^2 dx = \qquad (205)$$
$$\frac{\sqrt{2}\,\sigma}{4}\!\left[\frac{8e^{\mu+\sigma^2/2}}{\sqrt{2}\,\sigma}\!\left[\Phi\!\left(-\frac{a}{2}\right)\right]\right] = 2e^{\mu+\sigma^2/2}\Phi\!\left(-\frac{\sqrt{2}\,\sigma}{2}\right).$$

In an exemplary embodiment, using Finally, the equation (38) is used to find the variance of R for lognormal distributed repair times to be:

$$\sigma_R^2 = DL - (D-\sigma_D^2)\!\left[2e^{\mu+\sigma^2/2}\Phi\!\left(-\frac{\sqrt{2}\,\sigma}{2}\right)\right]. \qquad (206)$$

For a lognormal random variable the expected value is:

$$E[L] = e^{\mu+\sigma^2/2}. \qquad (207)$$

This can be simplified to:

$$\sigma_R^2 = DL - (D - \sigma_D^2)\left[2L\Phi\left(-\frac{\sqrt{2}\,\sigma}{2}\right)\right]. \quad (208)$$

In an exemplary embodiment, the application also models a gamma distribution.

In an exemplary embodiment:

$$\int_0^\infty (P[L \geq x])^2 dx. \quad (209)$$

In an exemplary embodiment, the incomplete gamma function is:

$$\Gamma(\alpha, x) = \int_x^\infty t^{\alpha-1} e^{-t}. \quad (210)$$

In an exemplary embodiment, the integral is:

$$\int \Gamma(\alpha,x)dx = x\Gamma(\alpha,x) - \Gamma(\alpha+1,x). \quad (211)$$

In an exemplary embodiment, $$\frac{d}{dx}[\Gamma(a, x)] = -x^{a-1} e^{-x}. \quad (212)$$

Let $u = \Gamma(\alpha, x)$, $dv = \Gamma(\alpha, x)dx$:

$$\int_0^\infty \Gamma^2(\alpha, x)dx = \Gamma(\alpha, x)[x\Gamma(\alpha, x) - \Gamma(\alpha+1, x)]\Big|_0^\infty - \int_0^\infty -x^{\alpha-1} e^{-x}[x\Gamma(\alpha, x) - \Gamma(\alpha+1, x)]dx. \quad (213)$$

Using equation (129) and also that $\Gamma(\alpha, 0) = \Gamma(\alpha)$, then:

$$\int_0^\infty \Gamma^2(\alpha, x)dx = [0] - [-\Gamma(\alpha)]\Gamma(\alpha+1) + \int_0^\infty x^\alpha e^{-x} \Gamma(\alpha, x)dx - \int_0^\infty x^{\alpha-1} e^{-x} \Gamma(\alpha+1, x)dx. \quad (214)$$

In an exemplary embodiment, $$\int_0^\infty x^{\mu-1} e^{-x} \Gamma(v, x) dx = \frac{\Gamma(\mu+v)}{\mu 2^{\mu+v}} {}_2F_1\left(1, \mu+v, \mu+1, \frac{1}{2}\right), \quad (215)$$

where the $${}_2F_1\left(1, \mu+v, \mu+1, \frac{1}{2}\right)$$

function is called the hypergeometric function. In an exemplary embodiment, $$\int_0^\infty \Gamma^2(\alpha, x)dx = \quad (216)$$

$$\Gamma(\alpha)\Gamma(\alpha+1) + \frac{\Gamma(2\alpha+1)}{(\alpha+1)2^{2\alpha+1}} {}_2F_1\left(1, 2\alpha+1, \alpha+2, \frac{1}{2}\right) - \frac{\Gamma(2\alpha+1)}{(\alpha)2^{2\alpha+1}} {}_2F_1\left(1, 2\alpha+1, \alpha+1, \frac{1}{2}\right).$$

In an exemplary embodiment, the hypergeometric function is difficult to evaluate, but certain special cases simplify. In an exemplary embodiment, both of the functions above qualify for a form involving gamma functions. In an exemplary embodiment, $${}_2F_1\left(a, b, \frac{a+b}{2}+1, \frac{1}{2}\right) = \quad (217)$$

$$\frac{2\sqrt{\pi}\,\Gamma\left(\frac{a+b}{2}+1\right)}{a-b}\left(\frac{1}{\Gamma\left(\frac{a}{2}\right)\Gamma\left(\frac{b+1}{2}\right)} - \frac{1}{\Gamma\left(\frac{b}{2}\right)\Gamma\left(\frac{a+1}{2}\right)}\right)$$

and $${}_2F_1\left(a, b, \frac{a+b}{2}, \frac{1}{2}\right) = \quad (218)$$

$$\sqrt{\pi}\,\Gamma\left(\frac{a+b}{2}\right)\left(\frac{1}{\Gamma\left(\frac{a+1}{2}\right)\Gamma\left(\frac{b}{2}\right)} + \frac{1}{\Gamma\left(\frac{a}{2}\right)\Gamma\left(\frac{b+1}{2}\right)}\right)$$

and using $\Gamma(\alpha+1) = \alpha\Gamma(\alpha)$ (219)

and $$\Gamma(1/2) = \sqrt{\pi}, \quad (220)$$

then, $$\int_0^\infty \Gamma^2(\alpha, x)dx = \alpha\Gamma^2(\alpha) + \quad (221)$$

$$\frac{\Gamma(2\alpha+1)}{(\alpha+1)2^{2\alpha+1}} \frac{2\sqrt{\pi}\,\Gamma(\alpha+2)}{-2\alpha}\left(\frac{1}{\sqrt{\pi}\,\Gamma(\alpha+1)} - \frac{1}{\Gamma(\alpha+1/2)}\right) - \frac{\Gamma(2\alpha+1)}{(\alpha)2^{2\alpha+1}} \sqrt{\pi}\,\Gamma(\alpha+1)\left(\frac{1}{\Gamma\left(\alpha+\frac{1}{2}\right)} + \frac{1}{\sqrt{\pi}\,\Gamma(\alpha+1)}\right).$$

Recognizing the two terms in the large parentheses are the same individual terms (having the forms (B−A) and (A+B)):

$$\int_0^\infty \Gamma^2(\alpha, x)dx = \alpha\Gamma^2(\alpha) + \quad (222)$$

$$\frac{\Gamma(2\alpha+1)\sqrt{\pi}\,\Gamma(a+1)(B-A)}{-\alpha 2^{2\alpha+1}} - \frac{\Gamma(2\alpha+1)\sqrt{\pi}\,\Gamma(\alpha+1)(A+B)}{\alpha 2^{2\alpha+1}}$$

$$\int_0^\infty \Gamma^2(\alpha, x)dx = \alpha\Gamma^2(\alpha) - \frac{2\Gamma(2\alpha+1)\sqrt{\pi}\Gamma(\alpha+1)B}{\alpha 2^{2\alpha+1}} \quad (223)$$

and $$\int_0^\infty \Gamma^2(\alpha, x)dx = \alpha\Gamma^2(\alpha) - \frac{\Gamma(2\alpha+1)\sqrt{\pi}\Gamma(a+1)}{\alpha 2^{2\alpha+1}}\left(\frac{1}{\sqrt{\pi}\,\Gamma(\alpha+1)}\right) = \alpha\Gamma^2(\alpha) - \frac{\Gamma(2\alpha+1)}{\alpha 2^{2\alpha}}. \quad (224)$$

In an exemplary embodiment, it is divided through by the constant $\Gamma^2(\alpha)$ since the desired probability has the $\Gamma(\alpha)$ term in its denominator to get:

$$\int_0^\infty (P[L \geq x])^2 dx = \alpha - \frac{\Gamma(2\alpha+1)}{\alpha\Gamma^2(\alpha)2^{2\alpha}}. \quad (225)$$

Now the Legendre duplication formula is used:

$$\Gamma(2\alpha) = \frac{2^{2\alpha-1}\Gamma(\alpha)\Gamma\left(\alpha+\frac{1}{2}\right)}{\sqrt{\pi}}. \quad (226)$$

Thus, $$\int_0^\infty (P[L \geq x])^2 dx = \quad (227)$$

$$\alpha - \frac{2\alpha\Gamma(2\alpha)}{\alpha\Gamma^2(\alpha)2^{2\alpha}} = \alpha - \frac{2^{2\alpha}\Gamma(\alpha)\Gamma\left(\alpha+\frac{1}{2}\right)}{\alpha\sqrt{\pi}\,\Gamma^2(\alpha)2^{2\alpha}} = \alpha - \frac{\Gamma\left(\alpha+\frac{1}{2}\right)}{\Gamma(\alpha)\sqrt{\pi}}.$$

In an exemplary embodiment, equation (227) applies for a standard gamma $X \sim \text{Gamma}(\alpha,1)$. For the gamma random variable $Y=\beta X \sim \text{Gamma}(\alpha, \beta)$ with scale factor $\beta$, this becomes:

$$\int_0^\infty (P[L \geq x])^2 dx = \alpha\beta - \frac{\Gamma\left(\alpha+\frac{1}{2}\right)\beta}{\Gamma(\alpha)\sqrt{\pi}} = L - \frac{\Gamma\left(\alpha+\frac{1}{2}\right)\beta}{\Gamma(\alpha)\sqrt{\pi}}. \quad (228)$$

Now the variance can be found from equation (115) as:

$$\sigma_R^2 = \int_0^\infty sP[L \geq x]dx - s^2\int_0^\infty (P[L \geq x])^2 dx = \quad (229)$$

$$DL - D^2\left[L - \frac{\Gamma\left(\alpha+\frac{1}{2}\right)\beta}{\Gamma(\alpha)\sqrt{\pi}}\right]$$

and $$\sigma_R^2 = D(1-D)L + \frac{D^2\Gamma\left(\alpha+\frac{1}{2}\right)\beta}{\Gamma(\alpha)\sqrt{\pi}}. \quad (230)$$

In an exemplary embodiment, the equation (230) is the Gamma Variance. In an exemplary embodiment, a gamma distribution with $\alpha=1$ is an exponential distribution. So the above formula should simplify to the exponential case for $\alpha=1$. Since $\beta=L$ for this case, then:

$$\sigma_R^2 = DL - D^2 L + \frac{D^2\Gamma\left(1+\frac{1}{2}\right)L}{\Gamma(1)\sqrt{\pi}} = DL - D^2 L + \frac{D^2\left(\frac{1}{2}\right)\Gamma\left(\frac{1}{2}\right)L}{\sqrt{\pi}} \quad (231)$$

and $$\sigma_R^2 = DL - D^2 L + \frac{D^2 L}{2} = DL - \frac{D^2 L}{2} = DL\left(1 - \frac{D}{2}\right). \quad (232)$$

Thus, assuming that the spare engines follow a normal distribution, then the RSON for the Gamma-Normal model is:

$$\text{OWNERSHIP} \cong DL + k\sqrt{D(1-D)L + \frac{D^2\Gamma\left(\alpha+\frac{1}{2}\right)\beta}{\Gamma(\alpha)\sqrt{\pi}}}. \quad (233)$$

In an exemplary embodiment, the steps to use the gamma-normal formula includes 1. calculating a weighted mean repair time $\mu_W$ from the different types of engine visits and their engine removal or forecast counts;
2. finding the $E[X^2]$ for each of the engine visit types using the formula $E[X^2]=\sigma_X^2+\mu_X^2$;
3. calculating a weighted value of repair time squared $E[X_W^2]$ from the output of Step 2 using the engine or forecast counts;
4. calculating a weighted variance of repair time by using the output of steps 1 and 3 in the formula $\sigma_W^2=E[X_W^2]-\mu_W^2$;
5. fitting a gamma distribution by matching moments to the weighted mean and variance from steps 1 and 4 with the shape parameter estimator being:

$$\hat{\alpha} = \frac{\mu_W^2}{\sigma_W^2} \quad (234)$$

and the scale parameter estimate is:

$$\hat{\beta} = \frac{\sigma_W^2}{\mu_W} \quad (235)$$

6. finding the k factor (for service level of Z, where typically $0.90 \leq Z \leq 0.99$, calculate in Excel by using the NORM.INV function: k=NORM.INV(Z,0,1)); (7 calculating the variance of the offwing engines as:

$$\sigma_R^2 = D(1-D)L + \frac{D^2\Gamma\left(\hat{\alpha}+\frac{1}{2}\right)\hat{\beta}}{\Gamma(\hat{\alpha})\sqrt{\pi}};\quad(236)$$

and 7. calculating Ownership by:

$$\text{Ownership} = DL + k\sigma_R \quad (237)$$

with the MAP being:

$$\text{MAP} = k\sigma_R. \quad (238)$$

In an exemplary embodiment, the Spare Engine Model could be modeled with a gamma distribution instead of a normal distribution. In this example, the Gamma variance formula is used when doing the moment matching to find the shape and scale parameters. The ownership would be:

$$\text{OWNERSHIP} = \text{GAMMA.INV}(0.90,\alpha,\beta)\,[(\text{Gamma-Gamma Improved})] \quad (239)$$

In an exemplary embodiment, the application uses six different formulas for several commonly used probability distributions. In the table below is a summary of the variance formulas for those distributions:

TABLE 1

Variance Formulas for Bernoulli Demand

| Repair Time | Parameters/ Moments | Variance of R |
|---|---|---|
| Geometric | p = success probability | $DL\left(1 - \dfrac{DL^2}{\sigma_L^2 + L^2}\right)$ |
| Exponential | L = Mean | $DL\left(1 - \dfrac{D}{2}\right)$ |
| Weibull | α = Shape β = Scale | $D\left[\dfrac{\beta}{\alpha}\right]\left[\Gamma\left(\dfrac{1}{\alpha}\right)\right]\left(1 - \dfrac{D}{2^{(1/\alpha)}}\right) = DL\left(1 - \dfrac{D}{2^{(1/\alpha)}}\right)$ |
| Normal | L = Mean $\sigma_L^2$ = Variance | $D(1-D)L + \dfrac{D^2\sigma_L}{\sqrt{\pi}}$ |
| Gamma | α = Shape β = Scale | $D(1-D)L + \dfrac{D^2\Gamma\left(\alpha+\frac{1}{2}\right)\beta}{\Gamma(\alpha)\sqrt{\pi}}$ |
| Lognormal | μ = Log Scale σ = Shape | $D\left(L - D\left[2L\Phi\left(-\dfrac{\sqrt{2}\,\sigma}{2}\right)\right]\right)$ |

In an exemplary embodiment, the application includes a model for deterministic demand. If D→1 in Table 1, it corresponds to s=1 or a deterministic demand of one engine per day. There is then no variability in demand, and the terms simplify considerably. It is a simple extension of a single deterministic demand to a deterministic demand of n engines per day if it is assumed that the n engines are mutually independent. Then the variances add, and the general formulas for a deterministic demand of n engines per day are:

TABLE 2

Variance Formulas for Deterministic Demand of n Engines per Day

| Repair Time | Parameters/ Moments | Variance of R |
|---|---|---|
| Geometric | p = success probability | $nL\left(1 - \dfrac{L^2}{\sigma_L^2 + L^2}\right)$ |
| Exponential | L = Mean | $\dfrac{nL}{2}$ |
| Weibull | α = Shape β = Scale | $\left[\dfrac{\beta}{\alpha}\right]\left[\Gamma\left(\dfrac{1}{\alpha}\right)\right]\left(1 - \dfrac{1}{2^{(1/\alpha)}}\right) = nL\left(1 - \dfrac{1}{2^{(1/\alpha)}}\right)$ |
| Normal | L = Mean $\sigma_L^2$ = Variance | $\dfrac{n\sigma_L}{\sqrt{\pi}}$ |
| Gamma | α = Shape β = Scale | $\dfrac{n\Gamma\left(\alpha+\frac{1}{2}\right)\beta}{\Gamma(\alpha)\sqrt{\pi}}$ |
| Lognormal | μ = Log Scale σ = Shape | $nL\left(1 - 2\Phi\left(-\dfrac{\sqrt{2}\,\sigma}{2}\right)\right)$ |

In an exemplary embodiment, the application includes an extension of variance formulas for items in repair using a Binomial demand distribution. Suppose a set of n engines is considered as potential demand on a given day, and that each has probability s of actually being realized as demand. If it is assumed that the n engines are independent, then the total daily demand will be binomial with mean ns. Considering the engines are independent, the n variances are summed. Under this model, there will be a factor of n in front of each of the distribution-type formulas in Table 1 (after s is substituted for the demand D as the single-engine demand), and since the variance of a binomial distribution is given by ns(1−s), the variance formulas can be written as shown in Table 3 below.

TABLE 3

Variance Formulas for Binomial Demand

| Repair Time | Parameters/ Moments | Variance of R |
|---|---|---|
| Geometric | p = success probability | $nsL\left(1 - \dfrac{(sL)^2}{\sigma_L^2 + L^2}\right)$ |
| Exponential | L = Mean | $nsL\left(1 - \dfrac{s}{2}\right) = DL\left(1 - \dfrac{s}{2}\right)$ |
| Weibull | α = Shape β = Scale | $ns\left(\dfrac{\beta}{\alpha}\right)\Gamma\left(\dfrac{1}{\alpha}\right)\left(1 - \dfrac{s}{2^{(1/\alpha)}}\right) = DL\left(1 - \dfrac{s}{2^{(1/\alpha)}}\right)$ |
| Normal | L = Mean $\sigma_L^2$ = Variance | $\sigma_D^2 L + \dfrac{ns^2\sigma_L}{\sqrt{\pi}} = \sigma_D^2 L + \dfrac{Ds\sigma_L}{\sqrt{\pi}}$ |
| Gamma | α = Shape β = Scale | $\sigma_D^2 L + \dfrac{ns^2\Gamma\left(\alpha+\frac{1}{2}\right)\beta}{\Gamma(\alpha)\sqrt{\pi}} = \sigma_D^2 L + \dfrac{Ds\Gamma\left(\alpha+\frac{1}{2}\right)\beta}{\Gamma(\alpha)\sqrt{\pi}}$ |

TABLE 3-continued

Variance Formulas for Binomial Demand

| Repair Time | Parameters/ Moments | Variance of R |
|---|---|---|
| Lognormal | μ = Log Scale<br>σ = Shape | $ns\left(L - s\left[2L\Phi\left(-\dfrac{\sqrt{2}\,\sigma}{2}\right)\right]\right)$ |

In an exemplary embodiment, when α=1 the Weibull and Gamma cases simplify to the exponential. The normal formula above has been tested with simulation and found to be accurate for binomial demand with n=2 and p=0.6. In an exemplary embodiment, D and s should be distinguished in Table 3. In the Bernoulli demand models, these two parameters are identical. But in Table 3 the s represents the probability of a single engine arrival while D represents the total expected demand over all n potential engine demands. The relevant equations are:

$$D = ns \quad (240)$$

and $$\sigma_D^2 = ns(1-s). \quad (241)$$

In an exemplary embodiment, the binomial demand scenario is different from the model with Bernoulli demand where an engine has n parts that may need repair (Shop Pool Model or Shop Pool Calculator). So an engine with 10 parts that may each need repair with probability ½, for example, is different from a binomial model with n=10 and s=½. The engine will not even show up half the time so the probability of a zero demand is much higher in the Shop Pool Model or the Shop Pool Calculator than in the binomial case.

In an exemplary embodiment, the application also includes an extension of variance formulas for items in repair using general demand distributions. In an exemplary embodiment, the general formula for a continuous repair time distribution is given in the last row of the Table 4 below.

TABLE 4

Variance of R for any Demand Distribution

| Repair Time | Parameters/ Moments | Variance of R |
|---|---|---|
| Geometric | p = success probability | $\sigma_R^2 = DL - (D - \sigma_D^2)\left(\dfrac{L^3}{\sigma_L^2 + L^2}\right)$ |
| Exponential | L = Mean | $\sigma_R^2 = \dfrac{L}{2}(\sigma_D^2 + D)$ |
| Weibull | α = Shape<br>β = Scale | $\sigma_R^2 = DL - (D - \sigma_D^2)\left[\dfrac{L}{2\left(\frac{1}{\alpha}\right)}\right]$ |
| Normal | L = Mean<br>$\sigma_L^2$ = Variance | $\sigma_R^2 = \sigma_D^2 L + (D - \sigma_D^2)\dfrac{\sigma_L}{\sqrt{\pi}}$ |
| Gamma | α = Shape<br>β = Scale | $\sigma_R^2 = \sigma_D^2 L + (D - \sigma_D^2)\dfrac{\Gamma\left(\alpha + \frac{1}{2}\right)\beta}{\Gamma(\alpha)\sqrt{\pi}}$ |
| Lognormal | μ = Log Scale<br>σ = Shape | $\sigma_R^2 = DL - (D - \sigma_D^2)\left[2L\Phi\left(-\dfrac{\sqrt{2}\,\sigma}{2}\right)\right]$ |

TABLE 4-continued

Variance of R for any Demand Distribution

| Repair Time | Parameters/ Moments | Variance of R |
|---|---|---|
| Any Continuous Distribution | Finite Mean and Variance | $\sigma_R^2 = DL - (D - \sigma_D^2)\displaystyle\int_0^\infty [P \geq (x)]^2 dx$ |
| Any Discrete Distribution | Finite Mean and Variance | $\sigma_R^2 = DL - (D - \sigma_D^2)\displaystyle\sum_{i=1}^\infty [P(L \geq i)]^2$ |

In an exemplary embodiment, closed form mathematical formulas are used in the Shop Engine Calculator. In this exemplary embodiment, the parts arrive to the shop on a daily basis and enter into a repair process. In an exemplary embodiment, all parts are modeled as mutually independent. In an exemplary embodiment and after repair, the serviceable parts are added to the shop pool. In an exemplary embodiment, the ownership number is the sum of the parts in repair and those in the shop pool. In an exemplary embodiment, the shop pool inventory with general demand model focuses on the mean and variance of the probability distribution of the number of parts in repair. In an exemplary embodiment, the distribution is modeled as a normal random variable, although, as it is described below and conditional on the demand realizations of past days, it is a sum of binomial distributions with different success parameters. This is called a Poisson Binomial distribution. In an exemplary embodiment, the number of parts in repair today that arrived as demand yesterday. In an exemplary embodiment and if $n_1$ parts entered into repair yesterday, then each (independently) has probability $p_1$ of being in repair today. So the parts in repair today that came from yesterday follow a binomial($n_1$, $p_1$) distribution. For other days there is a similar relationship. The parts in repair today from a demand of $n_i$ occurring i days ago will follow a binomial($n_i$, $p_i$) distribution.

In an exemplary embodiment, the mean of $R_i$ is found by conditioning on the demand distribution:

$$E[R_i] = \Sigma_j E[R_i | D = d_j] P[D = d_j] \quad (242)$$

and $$E[R_i] = \Sigma_i d_j p_i f_j = p_i \Sigma_j d_j f_j = p_i D. \quad (243)$$

Now by summing over the demand on all previous days:

$$E[R] = \sum_{i=1}^\infty E[R_i] = D\sum_{i=1}^\infty p_i = DL, \quad (244)$$

where the last simplification is from the fact that for a nonnegative discrete random variable X (taking on integer values) the mean is given by $$E[X] = \sum_{i=1}^\infty P[X \geq i]. \quad (245)$$

In an exemplary embodiment and if the repair times have a continuous distribution the above summation for $E[R_i]$ is replaced by the integral over the positive real axis and the expected value of R is again the product of the expectations of the demand and the repair times. In an exemplary embodiment, the expectation of $R^2$:

$$E[R_i^2] = \Sigma_j E[R_i^2|D=d_j]P[D=d_j]. \quad (246)$$

In an exemplary embodiment, the conditional distribution of $R_i$ is binomial with success parameter $p_i$, and it is known that for a binomial(n, p) random variable B that:

$$E[B^2] = np(1-p) + n^2p^2 = np[1+(n-1)p]. \quad (247)$$

Therefore:

$$E[R_i^2] = \Sigma_j d_j p_i [1+(d_j-1)p_i] f_j \quad (248)$$

$$E[R_i^2] = p_i[\Sigma_j d_j f_j + p_i \Sigma_j d_j^2 f_j - p_i \Sigma_j d_j f_j] = p_i[E[D] + p_i E[D^2] - p_i E[D]] \quad (249)$$

and $$E[R_i^2] = p_i[(1-p_i)D + p_i E[D^2]] = p_i(1-p_i)D + p_i^2 E[D^2]. \quad (250)$$

Then the variance of $R_i$ is:

$$\sigma_{R_i}^2 = E[R_i^2] - (E[R_i])^2 = p_i(1-p_i)D + p_i^2 E[D^2] - p_i^2 D^2 \quad (251)$$

and $$\sigma_{R_i}^2 = p_i(1-p_i)D + p_i^2(E[D^2] - D^2) = p_i(1-p_i)D + p_i^2 \sigma_D^2. \quad (252)$$

In an exemplary embodiment, demands on different days are independent, so over all days are summed to get the variance of R:

$$\sigma_R^2 = \sum_{i=1}^{\infty} [p_i(1-p_i)D + p_i^2 \sigma_D^2] = D\sum_i p_i - D\sum_i p_i^2 + \sigma_D^2 \sum_i p_i^2 \quad (253)$$

and $$\sigma_R^2 = DL - (D - \sigma_D^2)\Sigma_i p_i^2. \quad (254)$$

Again, for continuous repair times the last sum will be replaced by an integral over the positive real line:

$$\sigma_R^2 = DL - (D - \sigma_D^2) \int_0^{\infty} [P(L \geq x)]^2 dx. \quad (255)$$

In an exemplary embodiment, the equation (255) is the variance of R for the shop pool general demand model. In an exemplary embodiment, the equation (255) can be evaluated for distributions that are realistic models of repair times. In an exemplary embodiment, since repair times are positive, the gamma and Weibull distributions are natural choices. In an exemplary embodiment and in the case of Poisson demand, the right hand term disappears and the variance of the number of parts in repair is given by DL. In an exemplary embodiment, the shop pool general demand model uses uniform repair times, Weibull repair times, gamma repair times, lognormal repair times, normal repair times, exponential repair times, beta repair times, geometric repair times, and discrete uniform repair times.

In an exemplary embodiment, the notation for the shop pool general demand model is:

D=expected daily number of parts that will need repair, also called daily raw demand or just demand. D is used interchangeably to be the random variable representing demand as well as its expected value. The proper interpretation should be apparent from the context;

$\sigma_D^2$=variance of the daily demand that needs repair (the demand is modeled as a discrete random variable taking on integer values where the probability mass function is $f_j = P[D=d_j]$;

L=Repair time (L as a shorthand for the expected repair time);

$\sigma_L^2$=variance of the repair time;

$p_i = P[L \geq i]$=probability that repair time is $\geq i$ days;

$R_i$=Number of parts in repair today that arrived i days ago;

$R = \Sigma_{i=0}^{\infty} R_i$=Number of parts in repair today;

$\sigma_R^2$=variance of the number of parts in repair today;

k=one-tailed standard normal distribution factor that varies depending on the target service level as follows:

| Service Level | k |
| --- | --- |
| 90% | 1.2816 |
| 92% | 1.4051 |
| 94% | 1.5548 |
| 95% | 1.6449 |
| 96% | 1.7507 |
| 98% | 2.0537 |
| 99% | 2.3263 | where k satisfies the equation $P[Z<k]$=Service Level, where Z is a standard normal random variable.

In an exemplary embodiment, the shop pool general demand model uses uniform repair times. In an exemplary embodiment, and if the repair time distribution is uniform on the interval [a, b], then the cumulative distribution function is:

$$P(L \leq x) = \begin{cases} 0, & x < a \\ \frac{x-a}{b-a}, & a \leq x \leq b \\ 1, & x > b \end{cases} \quad (256)$$

So $$[P(L \geq x)]^2 = \begin{cases} 1, & x < a \\ \left(1 - \frac{x-a}{b-a}\right)^2 = \left(\frac{b-x}{b-a}\right)^2, & a \leq x \leq b \\ 0, & x > b \end{cases} \quad (257)$$

$$\int_0^{\infty} [P(L \geq x)]^2 = \int_0^a 1^2 dx + \int_a^b \left(1 - \frac{x-a}{b-a}\right)^2 dx + \int_b^{\infty} 0^2 dx \quad (258)$$

$$\int_a^b \left(1 - \frac{x-a}{b-a}\right)^2 dx = \quad (260)$$

$$\int_a^b 1^2 dx - \frac{2}{b-a}\int_a^b (x-a)dx + \frac{1}{(b-a)^2}\int_a^b (x-a)^2 dx$$

$$\int_a^b \left(1 - \frac{x-a}{b-a}\right)^2 dx = \quad (261)$$

$$(b-a) - \frac{2}{b-a}\left[\frac{x^2}{2} - ax\right]_a^b + \left[\frac{1}{(b-a)^2}\right]\left[\frac{x^3}{3} - ax^2 + a^2 x\right]_a^b$$

$$\int_a^b \left(1 - \frac{x-a}{b-a}\right)^2 dx = \quad (262)$$

$$(b-a) - \frac{2}{b-a}\left[\frac{b^2}{2} - ab - \left(\frac{a^2}{2} - a^2\right)\right] + \left[\frac{1}{(b-a)^2}\right]\left[\frac{b^3}{3} - ab^2 + a^2 b - \left(\frac{a^3}{3} - a^3 + a^3\right)\right]$$

-continued $$\int_a^b \left(1 - \frac{x-a}{b-a}\right)^2 dx = \qquad (263)$$

$$(b-a) - \frac{b^2 - 2ab + a^2}{b-a} + \left[\frac{1}{(b-a)^2}\right]\left[\frac{b^3}{3} - ab^2 + a^2b - \frac{a^3}{3}\right]$$

$$\int_a^b \left(1 - \frac{x-a}{b-a}\right)^2 dx = \qquad (264)$$

$$(b-a) - \frac{(b-a)^2}{b-a} + \left[\frac{1}{(b-a)^2}\right]\frac{1}{3}[b^3 - 3ab^2 + 3a^2b - a^3]$$

and $$\int_a^b \left(1 - \frac{x-a}{b-a}\right)^2 dx = \frac{1}{3}\left[\frac{(b-a)^3}{(b-a)^2}\right] = \frac{b-a}{3}. \qquad (265)$$

Using:

$$\int_0^\infty [P(L \geq x)]^2 = \int_0^a 1^2 dx + \int_a^b \left(1 - \frac{x-a}{b-a}\right)^2 dx \qquad (266)$$

$$\int_0^\infty [P(L \geq x)]^2 = a + \frac{b-a}{3} = \frac{2a+b}{3} \qquad (267)$$

$$\int_0^\infty [P(L \geq x)]^2 = \int_0^a 1^2 dx + \int_a^b \left(\frac{b-x}{b-a}\right)^2 dx + \int_b^\infty 0^2 dx \qquad (268)$$

$$\int_0^\infty [P(L \geq x)]^2 = a + \int_a^b \left(\frac{b-x}{b-a}\right)^2 dx \qquad (269)$$

$$\int_0^\infty [P(L \geq x)]^2 = a + \frac{1}{(b-a)^2} \int_a^b (b^2 - 2bx + x^2) dx \qquad (270)$$

$$\int_0^\infty [P(L \geq x)]^2 = a + \frac{1}{(b-a)^2}\left[b^2 x - bx^2 + \frac{x^3}{3}\right]_a^b \qquad (271)$$

and $$\int_0^\infty [P(L \geq x)]^2 = a + \frac{1}{(b-a)^2}\left[\frac{b^3}{3} - b^2a + ba^2 - \frac{a^3}{3}\right], \qquad (272)$$

but $$\int_0^\infty [P(L \geq x)]^2 = a + \frac{b^3 - 3b^2a + 3ba^2 - a^3}{3(b-a)^2} = a + \frac{(b-a)^3}{3(b-a)^2} \qquad (273)$$

[Since $b^3 - 3b^2a + 3ba^2 - a^3 = (b-a)^3$] (274)

$$\int_0^\infty [P(L \geq x)]^2 = a + \frac{b-a}{3} = \frac{2a+b}{3}. \qquad (275)$$

In an exemplary embodiment, the shop pool general demand model uses Weibull repair times. Using the equations (255) with the equations (124)-(133), then:

$$\sigma_R^2 = DL - (D - \sigma_D^2)\int_0^\infty [P(L \geq x)]^2 dx = DL - (D - \sigma_D^2)\left[\frac{L}{2\left(\frac{1}{a}\right)}\right]. \qquad (276)$$

In an exemplary embodiment, the shop pool general demand model uses gamma repair times. In an exemplary embodiment and using the incomplete gamma function equation (210), $$P[L \geq x] = \frac{\Gamma(\alpha, x)}{\Gamma(\alpha)}. \qquad (277)$$

Using the equations (211)-(227) and with the cumulative distribution function is given by:

$$P[X \geq x] = \frac{\Gamma(\alpha, x/\beta)}{\Gamma(\alpha)}. \qquad (278)$$

Therefore for this random variable:

$$\int_0^\infty (P[L \geq x])^2 dx = \frac{1}{\Gamma^2(\alpha)}\int_0^\infty \Gamma^2(\alpha, x/\beta) dx. \qquad (279)$$

Let $q = x/\beta$, then:

$$\frac{dq}{dx} = \frac{1}{\beta} \Rightarrow dx = \beta dq, \qquad (280)$$

and from the result for the standard gamma, then:

$$\int_0^\infty (P[L \geq x])^2 dx = \frac{\beta}{\Gamma^2(\alpha)}\int_0^\infty \Gamma^2(\alpha, q) dq = \beta\left[\alpha - \frac{\Gamma(\alpha + 1/2)}{\Gamma(\alpha)\sqrt{\pi}}\right]. \qquad (281)$$

Then the scaling factor $\beta$ is just a multiplicative adjustment and:

$$\int_0^\infty (P[L \geq x])^2 dx = \alpha\beta - \frac{\Gamma\left(\alpha + \frac{1}{2}\right)\beta}{\Gamma(\alpha)\sqrt{\pi}} = L - \frac{\Gamma\left(\alpha + \frac{1}{2}\right)\beta}{\Gamma(\alpha)\sqrt{\pi}}. \qquad (282)$$

Using equation (255), the variance of R for gamma distributed repair times is:

$$\sigma_R^2 = \qquad (283)$$

$$DL - (D - \sigma_D^2)\left[L - \frac{\Gamma\left(\alpha + \frac{1}{2}\right)\beta}{\Gamma(\alpha)\sqrt{\pi}}\right] = \sigma_D^2 L + (D - \sigma_D^2)\frac{\Gamma\left(\alpha + \frac{1}{2}\right)\beta}{\Gamma(\alpha)\sqrt{\pi}}.$$

In an exemplary embodiment, the shop pool general demand model uses lognormal repair times. In an exemplary embodiment, and using equations (177)-(205), and (207), then:

$$\int_0^\infty (P[L \ge x])^2 dx = 2L\Phi\left(-\frac{\sqrt{2}\,\sigma}{2}\right). \tag{284}$$

Finally, using equation (255) the variance of R for lognormal distributed repair times is:

$$\sigma_R^2 = DL - (D - \sigma_D^2)\left[2L\Phi\left(-\frac{\sqrt{2}\,\sigma}{2}\right)\right]. \tag{285}$$

In an exemplary embodiment, the shop pool general demand model uses normal repair times. In an exemplary embodiment, and using equations (150)-(172) and equation (255), then the variance of R for normal distributed repair times is:

$$\sigma_R^2 = DL - (D - \sigma_D^2)\left(L - \frac{\sigma_L}{\sqrt{\pi}}\right) = \sigma_D^2 L + (D - \sigma_D^2)\frac{\sigma_L}{\sqrt{\pi}}. \tag{286}$$

In an exemplary embodiment, the equation (286) is generally valid when the standard deviation of repair times is much smaller than the mean repair time.

In an exemplary embodiment, the shop pool general demand model uses exponential repair times. For exponential repair times, either the Weibull or Gamma models with the constraint that $\alpha=1$ can be used, which gives:

$$\sigma_R^2 = \sigma_D^2 L + (D - \sigma_D^2)\frac{\Gamma\left(\frac{3}{2}\right)\beta}{\Gamma(1)\sqrt{\pi}} = \tag{287}$$

$$\sigma_D^2 \beta + (D - \sigma_D^2)\frac{\beta}{2} = \frac{\beta}{2}(\sigma_D^2 + D) = \frac{L}{2}(\sigma_D^2 + D).$$

In an exemplary embodiment, because the mean is equal to the standard deviation for an exponential random variable, this is also written as:

$$\sigma_R^2 = \frac{\sigma_L}{2}(\sigma_D^2 + D). \tag{288}$$

In an exemplary embodiment, the shop pool general demand model also uses beta repair times. In an exemplary embodiment, the cumulative distribution function for a beta random variable defined on [0,1] is known as the regularized incomplete beta function. It is defined as:

$$P[X \le x] = I_x(\alpha, \beta) = \frac{1}{B(\alpha, \beta)}\int_0^x t^{\alpha-1}(1-t)^{\beta-1} dt, \tag{289}$$

where B ($\alpha$, $\beta$) is the beta function calculated as:

$$B(\alpha, \beta) = \frac{\Gamma(\alpha)\Gamma(\beta)}{\Gamma(\alpha+\beta)} \tag{290}$$

and $$I_0(\alpha,\beta)=0,\ I_1(\alpha,\beta)=1. \tag{291}$$

In an exemplary embodiment, with:

$$P[X \ge x]=1-I_x(\alpha,\beta) \tag{292}$$

and $$(P[X \ge x])^2=1-2I_x(\alpha,\beta)+(I_x(\alpha,\beta))^2. \tag{293}$$

In an exemplary embodiment, the equation (293) is integrated from 0 to 1. In an exemplary embodiment, $$\int I_x(\alpha, \beta) dx = x I_x(\alpha, \beta) - \left(\frac{\alpha}{\alpha+\beta}\right) I_x(\alpha+1, \beta). \tag{294}$$

Evaluating at 1 and 0 yields:

$$\int_0^1 I_x(\alpha, \beta) dx = 1 - \left(\frac{\alpha}{\alpha+\beta}\right) = \frac{\beta}{\alpha+\beta}. \tag{295}$$

Now:

$$I = \int_0^1 (P[X \ge x])^2 dx = 1 - \frac{2\beta}{\alpha+\beta} + \int_0^1 (I_x(\alpha, \beta))^2 dx. \tag{296}$$

Let the last term on the right be called A. Find A using integration by parts, where:

$$u=I_x(\alpha,\beta),\ dv=I_x(\alpha,\beta). \tag{297}$$

The derivative is:

$$\frac{d}{dx}[I_x(\alpha, \beta)] = \frac{x^{\alpha-1}(1-x)^{\beta-1}}{B(\alpha, \beta)}. \tag{298}$$

So:

$$A = \int_0^1 (I_x(\alpha, \beta))^2 dx = \tag{299}$$

$$I_x(\alpha, \beta)\left[x I_x(\alpha, \beta) - \left(\frac{\alpha}{\alpha+\beta}\right) I_x(\alpha+1, \beta)\right]\Big|_0^1 -$$

$$\int_0^1 \left[x I_x(\alpha, \beta) - \left(\frac{\alpha}{\alpha+\beta}\right) I_x(\alpha+1, \beta)\right]\left[\frac{x^{\alpha-1}(1-x)^{\beta-1}}{B(\alpha, \beta)}\right] dx$$

and $$\int_0^1 (I_x(\alpha, \beta))^2 dx = \left(\frac{\beta}{\alpha+\beta}\right) - \int_0^1 \left[\frac{x^\alpha (1-x)^{\beta-1}}{B(\alpha, \beta)}\right] I_x(\alpha, \beta) dx + \tag{300}$$

$$\int_0^1 \frac{\alpha x^{\alpha-1}(1-x)^{\beta-1}}{(\alpha+\beta)B(\alpha, \beta)} I_x(\alpha+1, \beta) dx$$

Letting Q be the first integral on the right hand side and Z be the second, then:

$$A = \left(\frac{\beta}{\alpha+\beta}\right) - Q + Z. \tag{301}$$

In an exemplary embodiment, $$I_x(\alpha, \beta) = I_x(\alpha+1, \beta) + \frac{x^\alpha(1-x)^{\beta-1}}{\alpha B(\alpha, \beta)}. \quad (302)$$

This leads to:

$$Q = \frac{1}{B(\alpha, \beta)}\int_0^1 x^\alpha(1-x)^{\beta-1}I_x(\alpha+1, \beta)dx + \frac{1}{B(\alpha, \beta)}\int_0^1 \frac{x^{2\alpha}(1-x)^{2\beta-1}}{\alpha B(\alpha, \beta)}dx. \quad (303)$$

In the first integral, the substitution $u = I_x(\alpha+1, \beta)$ leads to:

$$\frac{du}{dx} = \frac{x^\alpha(1-x)^{\beta-1}}{B(\alpha+1, \beta)}, \; du = \frac{x^\alpha(1-x)^{\beta-1}}{B(\alpha+1, \beta)}dx. \quad (304)$$

Then:

$$\frac{1}{B(\alpha, \beta)}\int_0^1 x^\alpha(1-x)^{\beta-1}I_x(\alpha+1, \beta)dx = \frac{B(\alpha+1, \beta)}{B(\alpha, \beta)}\int_0^1 u\,du = \left[\frac{u^2}{2}\right]\Big|_0^1 = \frac{1}{2}\left(\frac{\alpha}{\alpha+\beta}\right), \quad (305)$$

where:

$$\frac{B(\alpha+1, \beta)}{B(\alpha, \beta)} = \frac{\Gamma(\alpha+1)\Gamma(\beta)\Gamma(\alpha+\beta)}{\Gamma(\alpha+\beta+1)\Gamma(\alpha)\Gamma(\beta)} = \frac{\alpha\Gamma(\alpha)\Gamma(\alpha+\beta)}{(\alpha+\beta)\Gamma(\alpha+\beta)\Gamma(\alpha)} = \frac{\alpha}{\alpha+\beta}. \quad (306)$$

Regarding the second integral of Q:

$$\frac{1}{\alpha B^2(\alpha, \beta)}\int_0^1 x^{2\alpha}(1-x)^{2\beta-1}dx. \quad (307)$$

Another definition of the beta function B is:

$$B(x, y) = \int_0^1 t^{x-1}(1-t)^{y-1}dt, \quad (308)$$

so then:

$$\frac{1}{\alpha B^2(\alpha, \beta)}\int_0^1 x^{2\alpha}(1-x)^{2\beta-1}dx = \frac{B(2\alpha+1, 2\beta)}{\alpha B^2(\alpha, \beta)}. \quad (309)$$

Therefore, $$Q = \frac{1}{2}\left(\frac{\alpha}{\alpha+\beta}\right) + \frac{B(2\alpha+1, 2\beta)}{\alpha B^2(\alpha, \beta)}. \quad (310)$$

Regarding Z:

$$Z = \frac{\alpha}{\alpha+\beta}\int_0^1 \frac{I_x(\alpha+1, \beta)x^{\alpha-1}(1-x)^{\beta-1}}{B(\alpha, \beta)}dx. \quad (311)$$

Using the equation (302):

$$Z = \frac{\alpha}{\alpha+\beta}\int_0^1 \frac{x^{\alpha-1}(1-x)^{\beta-1}I_x(\alpha, \beta)}{B(\alpha, \beta)}dx - \frac{\alpha}{\alpha+\beta}\int_0^1 \frac{x^{2\alpha-1}(1-x)^{2\beta-1}}{\alpha B^2(\alpha, \beta)}dx. \quad (312)$$

Making the substitution $u = I_x(\alpha, \beta)$, then:

$$\frac{du}{dx} = \frac{x^\alpha(1-x)^{\beta-1}}{B(\alpha, \beta)}, \; du = \frac{x^\alpha(1-x)^{\beta-1}}{B(\alpha, \beta)}dx \quad (313)$$

$$Z = \frac{\alpha}{\alpha+\beta}\int_0^1 u\,du - \frac{1}{(\alpha+\beta)B^2(\alpha, \beta)}B(2\alpha\cdot 2\beta) \quad (314)$$

and $$Z = \left(\frac{1}{2}\right)\frac{\alpha}{\alpha+\beta} - \frac{B(2\alpha\cdot 2\beta)}{(\alpha+\beta)B^2(\alpha, \beta)}. \quad (315)$$

Regarding A:

$$A = \frac{\beta}{\alpha+\beta} - Q + Z = \frac{\beta}{\alpha+\beta} - \left(\frac{1}{2}\left(\frac{\alpha}{\alpha+\beta}\right) + \frac{B(2\alpha+1, 2\beta)}{\alpha B^2(\alpha, \beta)}\right) + \left(\left(\frac{1}{2}\right)\frac{\alpha}{\alpha+\beta} - \frac{B(2\alpha\cdot 2\beta)}{(\alpha+\beta)B^2(\alpha, \beta)}\right) \quad (316)$$

and $$A = \frac{\beta}{\alpha+\beta} - \frac{B(2\alpha+1, 2\beta)}{\alpha B^2(\alpha, \beta)} - \frac{B(2\alpha\cdot 2\beta)}{(\alpha+\beta)B^2(\alpha, \beta)}. \quad (317)$$

When simplified using gamma functions:

$$A = \frac{\beta}{\alpha+\beta} - \frac{\Gamma(2\alpha+1)\Gamma(2\beta)}{\Gamma(2\alpha+2\beta+1)\alpha B^2(\alpha, \beta)} - \frac{\Gamma(2\alpha)\Gamma(2\beta)}{(\alpha+\beta)B^2(\alpha, \beta)\Gamma(2\alpha+2\beta)} \quad (318)$$

$$A = \frac{\beta}{\alpha+\beta} - \frac{2\alpha\Gamma(2\alpha)\Gamma(2\beta)}{2(\alpha+\beta)\Gamma(2\alpha+2\beta)\alpha B^2(\alpha, \beta)} - \frac{\Gamma(2\alpha)\Gamma(2\beta)}{(\alpha+\beta)B^2(\alpha, \beta)\Gamma(2\alpha+2\beta)} \quad (319)$$

-continued $$A = \frac{\beta}{\alpha+\beta} - \frac{\Gamma(2\alpha)\Gamma(2\beta)}{(\alpha+\beta)\Gamma(2\alpha+2\beta)B^2(\alpha,\beta)} - \frac{\Gamma(2\alpha)\Gamma(2\beta)}{(\alpha+\beta)B^2(\alpha,\beta)\Gamma(2\alpha+2\beta)} \quad (320)$$

and $$A = \frac{\beta}{\alpha+\beta} - \frac{2\Gamma(2\alpha)\Gamma(2\beta)}{(\alpha+\beta)\Gamma(2\alpha+2\beta)B^2(\alpha,\beta)} = \frac{\beta}{\alpha+\beta} - \frac{2B(2\alpha,2\beta)}{(\alpha+\beta)B^2(\alpha,\beta)}. \quad (321)$$

Regarding I:

$$I = \int_0^1 (P[X \geq x])^2 dx = 1 - \frac{2\beta}{\alpha+\beta} + A \quad (322)$$

$$I = 1 - \frac{2B}{\alpha+\beta} + \frac{\beta}{\alpha+\beta} - \frac{2B(2\alpha,2\beta)}{(\alpha+\beta)B^2(\alpha,\beta)} \quad (323)$$

and $$I = \int_0^1 (P[X \geq x])^2 dx = \frac{\alpha}{\alpha+\beta} - \frac{2B(2\alpha,2\beta)}{(\alpha+\beta)B^2(\alpha,\beta)}. \quad (324)$$

In an exemplary embodiment, this is for what might be referenced a "standard" beta variable X defined on [0,1]. In an exemplary embodiment, and for the more general beta distribution in the interval [a,b], let Y be the random variable, which is defined by:

$$Y = (b-a)X + a. \quad (325)$$

Then:

$$P[Y \leq y] = P[(b-a)X + a \leq y] = P\left[X \leq \frac{y-a}{b-a}\right] = I_{\frac{y-a}{b-a}}(\alpha,\beta), \quad (326)$$

so:

$$P[Y \geq y] = 1 - P[Y \leq y] = 1 - I_{\frac{y-a}{b-a}}(\alpha,\beta) \quad (327)$$

and $$(P[Y \geq y])^2 = 1 - 2I_{\frac{y-a}{b-a}}(\alpha,\beta) + I^2_{\frac{y-a}{b-a}}(\alpha,\beta). \quad (328)$$

Regarding integral J for the more general beta random variable:

$$J = \int_a^b (P[Y \geq y])^2 dy = \int_a^b \left(1 - 2I_{\frac{y-a}{b-a}}(\alpha,\beta) + I^2_{\frac{y-a}{b-a}}(\alpha,\beta)\right) dy. \quad (329)$$

In an exemplary embodiment, and for either equations (324) or (329) the evaluation is identical when using the substitution $$= \frac{y-a}{b-a}.$$

Then $$dq = \left(\frac{1}{b-a}\right) dy, \text{ or } dy = (b-a)dq.$$

Then $$\int_a^b I^2_{\frac{y-a}{b-a}}(\alpha,\beta) dy = (b-a) \int_0^1 I^2_q(\alpha,\beta) dq. \quad (330)$$

Thus, a factor of (b−a) is in the result. The same occurs for the other two terms of J. Now for the interval from 0 to a, P[Y≥y]=1 since the minimum value of y is a. So, $$\int_0^a (P[Y \geq y])^2 dy = \int_0^a 1^2 dy = a. \quad (331)$$

Therefore for the general beta random variable Y defined on the interval [a, b], $$J = \int_a^b (P[Y \geq y])^2 dy = a + (b-a) \int_0^1 (P[X \geq x])^2 dx \quad (332)$$

or $$J = \int_a^b (P[Y \geq y])^2 dy = a + (b-a)\left[\frac{\alpha}{\alpha+\beta} - \frac{2B(2\alpha,2\beta)}{(\alpha+\beta)B^2(\alpha,\beta)}\right]. \quad (333)$$

Note that for $\alpha=\beta=1$ this simplifies to the continuous uniform distribution result, which of course it must.

In an exemplary embodiment, the shop pool general demand model also uses geometric repair times. As an example of discrete repair times, it is assumed that the repair distribution is geometric. A geometric random variable L with success probability p and domain i=1, 2, 3, ... , is described by the probability mass function:

$$P[L=i]=(1-p)^{i-1}p. \quad (334)$$

The cumulative distribution function is:

$$P[L \leq i]=1-(1-p)^i. \quad (335)$$

From this the complement of the cumulative distribution function is found to be:

$$P[L \geq i]=(1-p)^{i-1}. \quad (336)$$

Key moments of this distribution are:

$$E[L] = \frac{1}{p},\ E[L^2] = \frac{2-p}{p^2},\ \sigma_L^2 = \frac{1-p}{p^2}. \quad (337)$$

Now from the formula for the complement of the cdf:

$$\sum_{i=1}^{\infty} (P[L \geq i])^2 = \sum_{i=1}^{\infty} (1-p)^{2(i-1)} \qquad (338)$$

and $$\sum_{i=1}^{\infty} (P[L \geq i])^2 = [1 + (1-p)^2 + (1-p)^4 + \ldots]. \qquad (339)$$

The terms in the brackets are a geometric series, so:

$$\sum_{i=1}^{\infty} (P[L \geq i])^2 = \frac{1}{(1-(1-p)^2)} = \frac{1}{p(2-p)}. \qquad (340)$$

In an exemplary embodiment, $$\frac{(E[L])^3}{E[L^2]} = \frac{(1/p^3)}{\frac{2-p}{p^2}} = \frac{1}{p(2-p)}. \qquad (341)$$

Considering:
$$E[L^2] = \sigma_L^2 + (E[L])^2 \qquad (342)$$

and using the shorthand $E[L]=L$, then $$\sigma_R^2 = DL = (D - \sigma_D^2)\left(\frac{1}{p(2-p)}\right) = DL - (D - \sigma_D^2)\left(\frac{L^3}{\sigma_L^2 + L^2}\right). \qquad (343)$$

Note that as the variance of the repair times tends to zero, the far right term tends to L and the variance of the number of items in repair tends to $\sigma_D^2 L$. This is also true for normal repair times, and although not obvious, for gamma repair times as well. In an exemplary embodiment, for gamma repair times, the expression $$\frac{\Gamma\left(\alpha + \frac{1}{2}\right)\beta}{\Gamma(\alpha)} \qquad (344)$$

approximates the standard deviation of the repair times, especially as $\alpha$ gets large ($\alpha=2$ has about 6% error, $\alpha \geq 13$ has less than 1% error for comparing the above expression to the true standard deviation). So as $\sigma_L$ goes to zero, the overall variance of the number of items in repair tends to $\sigma_D^2 L$.

In an exemplary embodiment, the Shop Pool Calculator also uses discrete uniform repair times. Considering the repair times take on integer values in the interval [a, b] with a discrete uniform distribution, then the probability mass function is:

$$P[L = i] = \frac{1}{b-a+1}, i = a, a+1, \ldots, b. \qquad (345)$$

Let $n = b-a+1$ and then the cumulative distribution function is:

$$P[L \leq i] = \frac{\lfloor i \rfloor - a + i}{n}, \qquad (346)$$

where the special brackets represent the floor function, which is only relevant if i is not an integer. From this the complement of the cumulative distribution function (for integer i) is found to be:

$$p_i = P[L \geq i] = 1 - P[L \leq i-1] = 1 - \frac{\lfloor i-1 \rfloor - a + 1}{n} \qquad (347)$$

and $$p_i = \frac{b-a+1-i+1+a-1}{n} = \frac{b+1-i}{n}. \qquad (348)$$

Now $p_i = 1$ for $i < a$ and $p_i = 0$ for $i > b$ so:

$$\sum_{i=1}^{\infty} p_i^2 = \sum_{i=1}^{a-1} 1^2 + \sum_{i=a}^{b}\left(\frac{b+1-i}{n}\right)^2 + \sum_{i=b+1}^{\infty} 0^2 \qquad (349)$$

and $$\sum_{i=1}^{\infty} p_i^2 = a - 1 + \frac{1}{n^2}[(b+1-a)^2 + (b+1-(a+1))^2 + \ldots + 1^2] + 0. \qquad (350)$$

Reordering the sequence, $$\sum_{i=1}^{\infty} p_i^2 = a - 1 + \frac{1}{n^2}[1^2 + 2^2 + \ldots + (b+1-a)^2]. \qquad (351)$$

In an exemplary embodiment, $$1^2 + 2^2 + \ldots + k^2 = \frac{k(k+1)(2k+1)}{6}. \qquad (352)$$

Therefore:

$$\sum_{i=1}^{\infty} p_i^2 = a - 1 + \frac{1}{n^2}\left[\frac{(b+1-a)(b+2-a)(2b+2-2a+1)}{6}\right]. \qquad (353)$$

Since n=b−a+1, then:

$$\sum_{i=1}^{\infty} p_i^2 = a - 1 + \frac{1}{n^2}\left[\frac{n(n+1)(2n+1)}{6}\right] = (a-1) + \left[\frac{(n+1)(2n+1)}{6n}\right] \quad (354)$$

and $$\sum_{i=1}^{\infty} p_i^2 == a + \left[\frac{(n+1)(2n+1) - 6n}{6n}\right] = a + \left[\frac{2n^3 - 3n + 1}{6n}\right] = a + \left[\frac{(2n-1)(n-1)}{6n}\right]. \quad (355)$$

For the special case of the interval [1, b], then n=b and this further simplifies to:

$$\sum_{i=1}^{\infty} p_i^2 = 1 + \left[\frac{(2b-1)(b-1)}{6b}\right] = \frac{2b^2 + 3b + 1}{6b} = \frac{(2b+1)(b+1)}{6b}. \quad (356)$$

For the general case of the interval [a, b]:

$$\sigma_R^2 = DL - (D - \sigma_D^2)\left(a + \frac{(2n-1)(n-1)}{6n}\right). \quad (357)$$

And for the interval [1, b], $$\sigma_R^2 = DL - (D - \sigma_D^2)\left[\frac{(2b+1)(b+1)}{6b}\right]. \quad (358)$$

Variance equations for discrete repair distributions are summarized below in Table 5.

TABLE 5

Variance of R for Discrete Repair Time Modeling Distributions

| Repair Time | Parameters/Moments | Variance of R |
|---|---|---|
| Geometric | p = success probability for repair | $\delta_R^2 = DL - (D - \sigma_D^2)\left(\dfrac{L^3}{\sigma_L^2 + L^2}\right)$ |
| Discrete Uniform | b > a > 0, integers | $\sigma_R^2 = DL - (D - \sigma_D^2)\left(a + \dfrac{(2n-1)(n-1)}{6n}\right)$ |
| Any Discrete Distribution | Finite Mean and Variance | $\sigma_R^2 = DL - (D - \sigma_D^2)\sum_{i=1}^{\infty}[P(L \geq i)]^2$ |

For continuous repair distributions, the results are summarized in Table 6.

TABLE 6

Variance of R for Continuous Repair Time Modeling Distributions

| Repair Time | Parameters/Moments | Variance of R |
|---|---|---|
| Uniform | b > a > 0, integers | $\sigma_R^2 = DL - (D - \sigma_D^2)\left(\dfrac{2a+b}{3}\right)$ |
| Exponential | L = Mean | $\sigma_R^2 = \dfrac{L}{2}(\sigma_D^2 + D)$ |
| Weibull | $\alpha$ = Shape, $\beta$ = Scale | $\sigma_R^2 = DL - (D - \sigma_D^2)\left[\dfrac{L}{2^{(\frac{1}{\alpha})}}\right]$ |
| Normal | L = Mean, $\sigma_L^2$ = Variance, L > 4$\sigma_L$ | $\sigma_R^2 \approx \sigma_D^2 L + (D - \sigma_D^2)\dfrac{\sigma_L}{\sqrt{\pi}}$ |
| Gamma | $\alpha$ = Shape, $\beta$ = Scale | $\sigma_R^2 = \sigma_D^2 L + (D - \sigma_D^2)\dfrac{\Gamma\left(\alpha + \frac{1}{2}\right)\beta}{\Gamma(\alpha)\sqrt{\pi}}$ |
| Beta | $\alpha, \beta$ Shape, a < b, endpoints | $\sigma_R^2 = DL - (D - \sigma_D^2)\left[(b-a)\left(\dfrac{\alpha}{\alpha+\beta} - \dfrac{2B(2\alpha, 2\beta)}{(\alpha+\beta)B^2(\alpha, \beta)}\right) + \alpha\right]$ |
| Lognormal | $\mu$ = Log Scale, $\sigma$ = Shape | $\sigma_R^2 = DL - (D - \sigma_D^2)\left[2L\Phi\left(-\dfrac{\sqrt{2}\,\sigma}{2}\right)\right]$ |
| Any Continuous Distribution | Finite Mean and Variance | $\sigma_R^2 = DL - (D - \sigma_D^2)\displaystyle\int_0^{\infty}[P(L \geq x)]^2\,dx$ |

In an exemplary embodiment, if the mean and variance of R is known, then the required number of spares that should be owned to meet a specified service level may be determined using one assumption: the number in repair has a normal distribution. In practice and in simulations, the distribution varies from a normal, but the approximation is close for many realistic scenarios. The effect of Target Time T is listed below in Table 7.

TABLE 7

Variance of R or S for Target Time Models

| Repair Time | Parameters/ Moments | Variance of R |
|---|---|---|
| Geometric | p = success probability | $\sigma_R^2 = D(L-T) - (D-\sigma_D^2)\left(\dfrac{L^3}{\sigma_L^2 + L^2}\right)$ |
| Exponetnial | L = Mean | $\sigma_R^2 = \dfrac{(L-T)}{2}(\sigma_D^2 + D)$ |
| Weibull | α = Shape β = Scale | $\sigma_R^2 = D(L-T) - (D-\sigma_D^2)\left[\dfrac{L-T}{2^{(\frac{1}{\alpha})}}\right]$ |
| Normal | L = Mean $\sigma_L^2$ = Variance | $\sigma_R^2 = \sigma_D^2(L-T) + (D-\sigma_D^2)\dfrac{\sigma_L}{\sqrt{\pi}}$ |
| Gamma | α = Shape β = Scale | $\sigma_R^2 = \sigma_D^2(L-T) + (D-\sigma_D^2)\dfrac{\Gamma\left(\alpha+\frac{1}{2}\right)\beta}{\Gamma(\alpha)\sqrt{\pi}}$ |
| Lognormal | μ = Log Scale σ = Shape | $\sigma_R^2 = D(L-T) - (D-\sigma_D^2)\left[2L\Phi\left(-\dfrac{\sqrt{2}\sigma}{2}\right)\right]$ |
| Any Continuous Distribution | Finite Mean and Variance | $\sigma_R^2 = D(L-T) - (D-\sigma_D^2)\int_0^\infty [P(L \geq x)]^2 dx$ |
| Any Discrete Distribution | Finite Mean and Variance | $\sigma_R^2 = D(L-T) - (D-\sigma_D^2)\sum_{i=1}^\infty [P(L \geq i)]^2$ |

In an exemplary embodiment, the Shop Pool Calculator may use a variety of equations to generate the RSON. For example and in one exemplary embodiment, the equation (148) is used to generate the RSON for the Weibull model. However, and in another exemplary embodiment, the equations (121) and (123) are used to generate the RSON for the gamma model, with the parameters α and β for the equations (121) for repair times and are computed using the method of moments on a weighted mean repair time and a weighted standard deviation of repair time (because there are multiple types of repairs) and new and different parameters α and β are used for the distribution of the number of engines in repair using the method of moments. In an exemplary embodiment, the equation (123) is used to estimate the RSON.

In an exemplary embodiment and once the variance in repair is calculated, the analytic formula for the RSON for Spare Engine Calculator can then be determined using the formulas:

$$\sigma_R^2 = DL - (D - \sigma_D^2)\int_0^\infty [P(L \geq x)]^2 dx \qquad (359)$$

$$\sigma_R^2 = DL - (D - \sigma_D^2)\sum_{i=1}^\infty [P(L \geq i)]^2 \qquad (360)$$

and $$\text{Ownership} = DL + k\sigma_R. \qquad (358)$$

where k is a point determined from the standard normal distribution depending on the desired service level. However, as noted above, the variance formula is not limited to the Bernoulli demand or gamma repair times mentioned above. It is valid for any continuous realistic demand or repair distribution commonly used in applied stochastic modeling. It can also be modified for discrete distributions or to handle empirical distribution functions created from removal and repair time data by replacing the integral by a summation.

Figure 13:
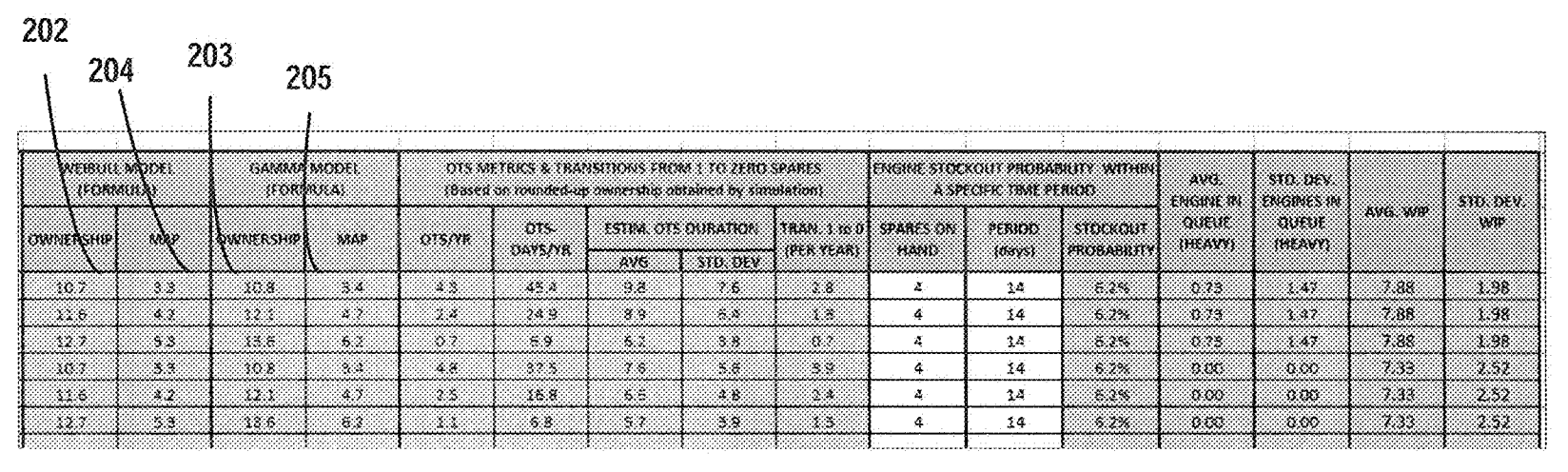

In an exemplary embodiment, and returning back to FIG. 3, the system 10 displays the RSON using the computer 15 at the step 125. In an exemplary embodiment, the system 10 uses the output device 50 and/or the input device 45 display the RSON as illustrated in FIG. 13. In an exemplary embodiment, multiple RSONs will be displayed at the step 125. In an exemplary embodiment, the RSON for the Weibull distribution may be displayed by the text boxes in the column 202 while the RSON for the Gamma distribution may be displayed in the text boxes in the column 203. In an exemplary embodiment, the RSON from the simulation model(s) will be displayed at the step 125. In an exemplary embodiment, each text box is associated with a scenario created by a user using the component parameters at the step 105. In an exemplary embodiment, information other than RSONs will be displayed at the step 125. For example, the MAP for each scenario and for each model may be displayed in the columns 204 and 205. Additionally, the harvesting parameters, other parameters, may be displayed along with the RSONs. In an exemplary embodiment, a plurality of RSONs are displayed using the computer 15 at step 125 with each RSON from the plurality of RSONs associated with a different service level. For example, seven RSONs may be provided, one RSON for each of the service levels of 50%, 60%, 70%, 80&, 90%, 95%, and 98%.

In an exemplary embodiment, the system 10 uses the corresponding simulation models and mathematical formulas to calculate the RSON. In an exemplary embodiment, the application also monitors metrics such as the average number of spares the company will have on hand in the long run, and the probability of a stockout (no spare available when there is a demand for one) in a specified period of time.

In several exemplary embodiments, the system 10 and/or the method 100 according to respective exemplary embodiments of the present disclosure consider the variability of both demand and repair times, multiple probability distributions for demand and repair times, and important operational processes specific to repairable parts/components.

In several exemplary embodiments, the system 10 and/or the method 100 according to respective exemplary embodiments of the present disclosure consider the typical repair procedure conducted by the company where several parts/components are under repair simultaneously.

In several exemplary embodiments, the system 10 and/or the method 100 according to respective exemplary embodiments of the present disclosure allow the use of different repair time distributions and are not limited to using the exponential. That is, the simulation process provides flexibility to use any probability distribution, even an empirical (from observed data) one, to better model the actual repair process.

In several exemplary embodiments, the system 10 and/or the method 100 according to respective exemplary embodiments of the present disclosure give insight as to how the demand and repair processes affect the variance of the number of parts/components in repair, the variance of the parts/components on the shelf (spares), and the total required ownership number.

In several exemplary embodiments, the system 10 and/or the method 100 according to respective exemplary embodiments of the present disclosure use formulas to calculate: the approximate number of needed spare parts/components, the expected number of on hand spare parts/components, and a stockout probability for a specified time frame and number of spare parts/components on hand.

In several exemplary embodiments, the system 10 and/or the method 100 according to respective exemplary embodiments of the present disclosure provide insight into the simple borrowing case in terms of parts needed from the shelf.

In several exemplary embodiments, due to the modeling flexibility provided by the simulation process, the system 10 and/or the method 100 according to respective exemplary embodiments of the present disclosure include consideration of several specific component repair procedures in order to obtain a closer representation of the actual process and, therefore; to generate more accurate ownership calculations. These include the ability to borrow serviceable parts/components from other eligible (upstream) assemblies in the shop, the ability to scrap parts/components that are deemed beyond repair, the ability to purchase new parts/components to replace the scrapped ones, and the ability to limit the shop capacity.

In several exemplary embodiments, the system 10 and/or the method 100 according to respective exemplary embodiments of the present disclosure allow users to easily modify model inputs such as demand patterns, repair time parameters (mean and standard deviation), the scrap rate, or the shop capacity to understand the effects these inputs have on the number of spares that should be owned. In addition, system 10 and/or the method 100 offers automation to gathering many of the required parameters utilized in the calculation while in the past such procedure was manual.

In an exemplary embodiment, the one or more computers 15 sends the component parameters or user parameters, among other parameters, to the one or more severs 20 via the network 26. In an exemplary embodiment, and in response to the receipt of the user parameters, the one or more servers 20 processes the historical data (stored within the one or more databases or relational database management systems 25) using SAS code to generate component data (e.g., repair time statistics, repair probabilities, scrap rates, Authorized Shop Pool Levels, Booked Quantities, etc.), which is then sent to the one or more computers 15 using a CSV Format file. However, the one or more servers 20 may send the component data to the one or more computers 15 using any type of file format. In an exemplary embodiment, the component data is then used by the application to generate the RSON.

In several exemplary embodiments, the system 10 and/or the method 100 according to respective exemplary embodiments of the present disclosure provide fast and accurate calculations. That is, the software applications run fast across multiple scenarios. For instance, the calculation of the shop pool for one part takes in average less than one second. Moreover, the calculation of the shop pool uses a very fast simulation model built in Java that runs 500 replications of 14 years each in order to provide highly accurate calculations. In an exemplary embodiment, the system 10 can perform any number of the steps simultaneously. For example, the Weibull, Gamma, Lognormal, Geometric and Normal distributions, among others, may be generated and calculated simultaneously.

In several exemplary embodiments, the system 10 and/or the method 100 according to respective exemplary embodiments of the present disclosure provide a high level of automation, the ability to handle a changing fleet size, and cost savings provided by better planning (avoiding manual computations or emergency purchasing decisions, for example) and better use of capital (finding the right number of spares/engines and not having to make as many operational adjustments to inventory).

In several exemplary embodiments, the system 10 and/or the method 100 according to respective exemplary embodiments of the present disclosure solve the Single Echelon Part Inventory Problem for Repairable Components. This problem is described by the question: How many parts/components does the company need to own in order to support the completion of the promised flying schedule? This problem is important because repairable components or assemblies are expensive.

In several exemplary embodiments, the system 10 and/or the method 100 according to respective exemplary embodiments of the present disclosure address non-Poisson demand and non-exponential repair time distributions. Moreover, in several exemplary embodiments, users can change the inputs to the tool to determine business information such as (1) the number of spares to own, (2) the expected number of parts in the repair shop, (3) the expected number of available spares, (4) when to change spare ownership, and (5) when the company is at risk of having a grounded aircraft due to stockout of serviceable spares. The tools can be used to adjust the shop pool of parts used in the repair of engines along with the implementation of process improvements, demand forecast adjustments, outsourcing impact evaluations, and specific outsourcing contract rules. The tool can calculate when these values change based on inputs about part demand, repair time distributions, shop capacity, spares on hand, relevant time window, scrap rate, and desired service or reliability level. The tool also allows the user to easily perform extensive what-if analyses and update calculation parameters with just a few commands within the GUI.

Figure 14:
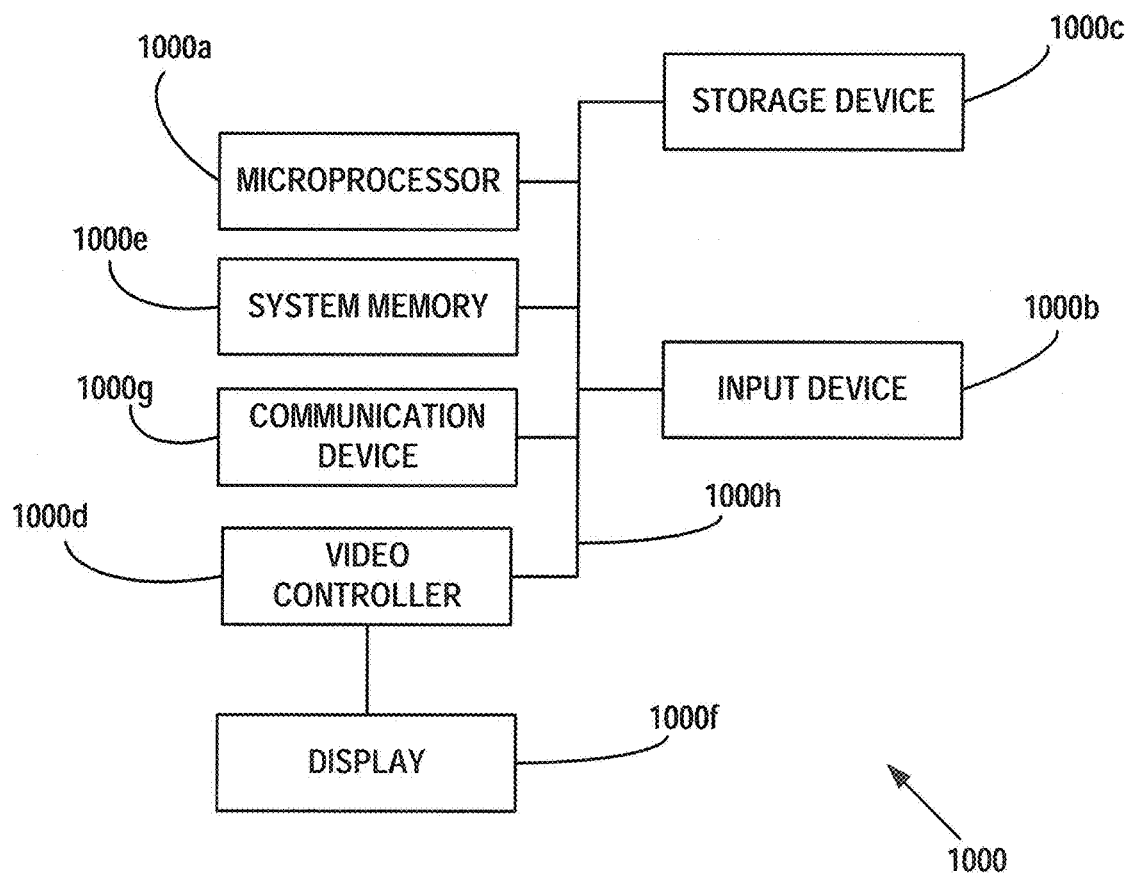
FIG. 14 is a diagrammatic illustration of a node for implementing one or more exemplary embodiments of the present disclosure, according to an exemplary embodiment.

In an exemplary embodiment, as illustrated in FIG. 14 with continuing reference to FIGS. 1, 2, 3, 4, 5, 6, 7a 7b, 8a, 8b, 9a, 9b, 10, 11, 12, and 13, an illustrative computing device 1000 for implementing one or more embodiments of one or more of the above-described networks, elements, methods and/or steps, and/or any combination thereof, is depicted. The computing device 1000 includes a processor 1000a, an input device 1000b, a storage device 1000c, a video controller 1000d, a system memory 1000e, a display 1000f, and a communication device 1000g, all of which are interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer readable medium that may contain executable instructions. In an exemplary embodiment, the computer readable medium is a non-transitory tangible media. In several exemplary embodiments, the communication device 1000g may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, one or more computers 15, one or more servers 20, and one or more databases or relational database management systems 25, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, one or more computers 15, one or more servers 20, and one or more databases or relational database management systems 25 and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 26, and/or one or more portions thereof, may be designed to work on any specific architecture. In an exemplary embodiment, one or more portions of the network 26 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a computer program, such as a plurality of instructions stored on a computer readable medium, such as the computer readable medium 35, the system memory 1000e, and/or any combination thereof, may be executed by a processor to cause the processor to carry out or implement in whole or in part the operation of the system 10, the methods 100, and/or any combination thereof. In several exemplary embodiments, such a processor may include one or more of the computer processor 30, the processor 1000a, and/or any combination thereof. In several exemplary embodiments, such a processor may execute the plurality of instructions in connection with a virtual computer system.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 104a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method of generating a recommended quantity for a spare engine component that is used in aircraft maintenance operations, the spare engine component being either a component part or an engine assembly, the method including accessing, using at least one computer, historical data associated with the spare engine component; generating, using the at least one computer, the recommended quantity, wherein generating the recommended quantity includes calculating a variance of a historical repair time for the spare engine component using the historical data; and executing at least one of a first closed-form mathematical formula and a simulation model, each of the first closed-form mathematical formula and the simulation model being based on: the variance of the historical repair time; and an ideal service level that is the percent of time the spare engine component will be available when there is a demand for the spare engine component; and outputting, using the at least one computer, the recommended quantity for the spare engine component; wherein the recommended quantity is a number of available spare engine components that supports the aircraft maintenance operations but avoids excess spare engine components in inventory. In an exemplary embodiment, the component part is either a first part type or a second part type; and generating, using the at least one computer, the recommended quantity further includes executing the first closed-form mathematical formula when the spare engine component is a component part that is a first part type; executing the simulation model when the spare engine component is a component part that is a second part type; and executing a second closed-form mathematical formula and another simulation model when the spare engine component is an engine assembly. In an exemplary embodiment, executing the simulation model when the spare engine component is a component part that is a second part type includes simulating a spare engine component repair process. In yet another exemplary embodiment, executing the second closed-form mathematical formula and the another simulation model includes simulating an engine assembly repair process. In an exemplary embodiment, executing the second closed-form mathematical formula and the another simulation model includes simulating a multi-location repair process. In an exemplary embodiment, calculating the variance of the historical repair time for the spare engine component includes calculating a variance of a historical demand for the spare engine component using the historical data. In an exemplary embodiment, the recommended quantity is one of a plurality of recommended quantities; and the method further includes generating, using the at least one computer, the plurality of recommended quantities, wherein generating the plurality of recommended quantities includes executing at least one of the first closed-form mathematical formula and the simulation model, each of the first closed-form mathematical formula and the simulation model being based on: the variance of the historical repair time; and a plurality of ideal service levels; and outputting, using the at least one computer, the plurality of recommended quantities, with each recommended quantity associated with one ideal service level from the plurality of ideal service levels. In an exemplary embodiment, calculating the variance of the historical repair time for the spare engine component includes generating a plurality of distributions. In an exemplary embodiment, the plurality of distributions includes a Weibull distribution and a gamma distribution. In an exemplary embodiment, the plurality of distribution are generated simultaneously.

The present disclosure also an apparatus including a non-transitory computer readable medium; and a plurality of instructions stored on the non-transitory computer readable medium and executable by one or more processors, the plurality of instructions including: instructions that cause the one or more processors to access historical data associated with a spare engine component that is either a component part or an engine assembly, instructions that cause the one or more processors to generate a recommended quantity that is a number of available spare engine components that supports aircraft maintenance operations but avoids excess spare engine components in inventory, wherein the instructions that cause the one or more processors to generate the recommended quantity further include: instructions that cause the one or more processors to calculate a variance of a historical repair time for the spare engine component using the historical data; and instructions that cause the one or more processors to execute at least one of a first closed-form mathematical formula and a simulation model, each of the first closed-form mathematical formula and the simulation model being based on: the variance of the historical repair time; and an ideal service level that is the percent of time the spare engine component will be available when there is a demand for the spare engine component; and instructions that cause the one or more processors to output the recommended quantity for the spare engine component. In an exemplary embodiment, the component part is either a first part type or a second part type; and wherein the instructions that cause the one or more processors to generate the recommended quantity further include: instructions that cause the one or more processors to execute the first closed-form mathematical formula when the spare engine component is a component part that is a first part type; instructions that cause the one or more processors to execute the simulation model when the spare engine component is a component part that is a second part type; and instructions that cause the one or more processors to execute a second closed-form mathematical formula and another simulation model when the spare engine component is an engine assembly. In an exemplary embodiment, the instructions that cause the one or more processors to execute the simulation model when the spare engine component is a component part that is a second part type include instructions that cause the one or more processors to simulate a spare engine component repair process. In an exemplary embodiment, the instructions that cause the one or more processors to execute the second closed-form mathematical formula and the another simulation model include instructions that cause the one or more processors to simulate an engine assembly repair process. In an exemplary embodiment, the instructions that cause the one or more processors to execute the second closed-form mathematical formula and the another simulation model include instructions that cause the one or more processors to simulate a multi-location repair process. In an exemplary embodiment, the instructions that cause the one or more processors to calculate the variance of the historical repair time for the spare engine component include instructions that cause the one or more processors to calculate a variance of a historical demand for the spare engine component using the historical data. In an exemplary embodiment, the recommended quantity is one of a plurality of recommended quantities; and the plurality of instructions further include: instructions that cause the one or more processors to generate the plurality of recommended quantities, wherein the instructions that cause the one or more processors to generate the plurality of recommended quantities include instructions that cause the one or more processors to execute at least one of the first closed-form mathematical formula and the simulation model, each of the first closed-form mathematical formula and the simulation model being based on: the variance of the historical repair time; and a plurality of ideal service levels; and instructions that cause the one or more processors to output the plurality of recommended quantities, with each recommended quantity associated with one ideal service level from the plurality of ideal service levels. In an exemplary embodiment, the instructions that cause the one or more processors to calculate the variance of the historical repair time for the spare engine component include instructions that cause the one or more processors to generate a plurality of distributions. In an exemplary embodiment, the plurality of distributions include a Weibull distribution and a gamma distribution. In an exemplary embodiment, the plurality of distribution are generated simultaneously.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method of controlling the quantity of spare engine components that are on-hand by generating a recommended quantity for the spare engine component that is used in aircraft maintenance operations, the spare engine component being a component part of an engine assembly, the method comprising:

accessing, using at least one computer, historical data associated with the spare engine component;

generating, using the at least one computer, the recommended quantity, wherein generating the recommended quantity comprises:

calculating, using the historical data, a variance of a historical repair time for the spare engine component when more than one spare engine component is simultaneously under repair, wherein calculating the variance of the historical repair time comprises calculating, using the historical data, a variance of a historical demand for the spare engine component;

executing a simulation model that simulates over a number of days the quantity of spare engine components that are on-hand during a repair process, wherein executing the simulation model comprises:

calculating a number of engine assemblies that are designated for repair for each day in the number of days;

for each day in the number of days and for each engine in the number of engine assemblies that are designated for repair for the each day, simulating:

removing, on the each day, a first spare engine component from each engine assembly designated for repair for the each day, wherein the first spare engine component is to be repaired, scrapped, or borrowed;

installing a second spare engine component that is identical to the first spare engine component on the each engine assembly and reducing the quantity of spare engine components that are on-hand on the each day by one;

if the first spare engine component is to be repaired, then increasing the quantity of spare engine components that are on hand by one after a first delay, wherein the first delay is based on the variance of the historical repair time;

if the first spare engine component is to be borrowed, then increasing the quantity of spare engine components that are on-hand on the each day by one; and if the first spare engine component is to be scrapped, then generating a purchase order for a new spare engine component and increasing the quantity of spare engine components that are on-hand by one after a second delay, wherein the second delay is associated with a calculated lead-time of the new spare engine component;

calculating average percentiles of variations of the quantity of spare engine components that are on-hand on each day in the number of days; and calculating the recommended quantity using the average percentiles and an ideal service level that is the percent of time the spare engine component will be available when there is a demand for the spare engine component;

outputting, using the at least one computer, the recommended quantity for the spare engine component; and generating, using the at least one computer, the purchasing order thereby controlling the quantity of spare engine components that are on-hand;

wherein the recommended quantity is a number of available spare engine components that supports the aircraft maintenance operations but avoids excess spare engine components in inventory.

2. The method of claim 1, wherein calculating the variance of the historical repair time for the spare engine component comprises generating a plurality of distributions.

3. The method of claim 2, wherein the plurality of distributions comprises a Weibull distribution and a gamma distribution.

4. The method of claim 2, wherein the plurality of distribution are generated simultaneously.

5. An apparatus comprising:

a non-transitory computer readable medium; and a plurality of instructions stored on the non-transitory computer readable medium and executable by one or more processors, the plurality of instructions comprising:

instructions that cause the one or more processors to access historical data associated with a spare engine component that is a component part of an engine assembly, instructions that cause the one or more processors to generate a recommended quantity that is a number of available spare engine components that supports aircraft maintenance operations but avoids excess spare engine components in inventory, wherein the instructions that cause the one or more processors to generate the recommended quantity further comprise:

instructions that cause the one or more processors to calculate, using the historical data, a variance of a historical repair time for the spare engine component when more than one spare engine component is simultaneously under repair, wherein the instructions that cause the one or more processors to calculate the variance of the historical repair time comprises instructions that cause the one or more processors to calculate, using the historical data, a variance of a historical demand for the spare engine component;

instructions that cause the one or more processors to execute a simulation model that simulates over a number of days the quantity of spare engine components that are on-hand during a repair process, wherein the instructions that cause the one or more processor to execute the simulation model further comprises:

instructions that cause the one or more processors to calculate a number of engine assemblies that are designated for repair for each day in the number of days;

instructions that cause the one or more processors to simulate, for each day in the number of days and for each engine in the number of engine assemblies that are designated for repair for the each day:

removing, on the each day, a first spare engine component from each engine assembly designated for repair for the each day, wherein the first spare engine component is to be repaired, scrapped, or borrowed;

installing a second spare engine component that is identical to the first spare engine component on the each engine assembly and reducing the quantity of spare engine components that are on-hand on the each day by one;

if the first spare engine component is to be repaired, then increasing the quantity of spare engine components that are on hand by one after a first delay, wherein the first delay is based on the variance of the historical repair time;

if the first spare engine component is to be borrowed, then increasing the quantity of spare engine components that are on-hand on the each day by one; and if the first spare engine component is to be scrapped, then generating a purchase order for a new spare engine component and increasing the quantity of spare engine components that are on-hand by one after a second delay, wherein the second delay is associated with a calculated lead-time of the new spare engine component;

instructions that cause the one or more processors to calculate average percentiles of variations of the quantity of spare engine components that are on-hand on each day in the number of days; and instructions that cause the one or more processors to calculate the recommended quantity using the average percentiles and an ideal service level that is the percent of time the spare engine component will be available when there is a demand for the spare engine component;

instructions that cause the one or more processors to output the recommended quantity for the spare engine component; and instructions that cause the one or more processors to generate the purchasing order, thereby controlling the quantity of spare engine components that are on-hand.

6. The apparatus of claim 5, wherein the instructions that cause the one or more processors to calculate the variance of the historical repair time for the spare engine component comprise instructions that cause the one or more processors to generate a plurality of distributions.

7. The apparatus of claim 6, wherein the plurality of distributions comprises a Weibull distribution and a gamma distribution.

8. The apparatus of claim 6, wherein the plurality of distribution are generated simultaneously.

* * * * *